US008000289B2

(12) United States Patent
Nobukiyo et al.

(10) Patent No.: US 8,000,289 B2
(45) Date of Patent: Aug. 16, 2011

(54) MOBILE COMMUNICATION SYSTEM, BASE STATION, RADIO NETWORK CONTROLLER, AND RESOURCE ALLOCATION CONTROL METHOD USED THEREFOR

(75) Inventors: Takahiro Nobukiyo, Tokyo (JP); Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 1407 days.

(21) Appl. No.: 10/773,233

(22) Filed: Feb. 9, 2004

(65) Prior Publication Data
US 2004/0160923 A1    Aug. 19, 2004

(30) Foreign Application Priority Data

Feb. 10, 2003    (JP) ................................. 2003-031928

(51) Int. Cl.
*H04W 4/00* (2009.01)
*H04W 72/00* (2009.01)
(52) U.S. Cl. ...................... 370/329; 455/452.1; 455/509
(58) Field of Classification Search .................. 370/310, 370/329, 335, 342, 343; 455/450, 451, 452.1, 455/452.2, 509, 512, 513
See application file for complete search history.

(56) References Cited

U.S. PATENT DOCUMENTS

| | | | |
|---|---|---|---|
| 6,330,429 B1 * | 12/2001 | He | 455/67.11 |
| 6,347,091 B1 | 2/2002 | Wallentin et al. | |
| 6,728,228 B1 * | 4/2004 | Ostman et al. | 370/332 |
| 2003/0002472 A1 | 1/2003 | Choi et al. | |
| 2003/0189915 A1 * | 10/2003 | Miller | 370/343 |
| 2003/0202490 A1 * | 10/2003 | Gunnarsson et al. | 370/332 |
| 2003/0210660 A1 * | 11/2003 | Wiberg et al. | 370/320 |
| 2004/0090934 A1 * | 5/2004 | Cha et al. | 370/329 |

FOREIGN PATENT DOCUMENTS

| | | |
|---|---|---|
| JP | 2002-518958 | 6/2002 |
| WO | WO 03/071723 A1 | 8/2003 |
| WO | WO 03/107707 A1 | 12/2003 |

OTHER PUBLICATIONS

3rd Generation Partnership Project (3GPP); Technical Specification Group Radio Access Networks; UTRAN lub Interface NBAP Signaling (Release 5); TS25.433 V5.1.0 (Jun. 2002).
3rd Generation Partnership Project (3GPP); Technical Specification Group Radio Access Networks; Requirements for Support of Radio Resource Management (FDD) (Release 5); TS25.133 V5.2.0 (Mar. 2002).

* cited by examiner

*Primary Examiner* — Nguyen Vo
(74) *Attorney, Agent, or Firm* — Dickstein Shapiro LLP

(57) ABSTRACT

A mobile communication system is provided which is capable of improving efficiency of use of allocated codes and allocated power of an HS-PDSCH to improve a throughput of the HS-PDSCH. A resource allocation update unit is connected to an RNC functional unit and a base station functional unit, performs allocation control of resources such as the number of codes and power, which are allocated or notified from the RNC functional unit to the base station functional unit, and stores allocation information of the resources in a resource allocation information storage unit. A resource use information detection unit detects a state of use of resources on the basis of a state of use of resources from the base station functional unit and a timing information from a timer, and informs a resource allocation judgment unit of the information on a state of use of resources. The resource allocation judgment unit judges whether or not allocation of resources has been updated on the basis of the information on a state of use of resources.

17 Claims, 37 Drawing Sheets

MOBILE COMMUNICATION SYSTEM, BASE STATION, RADIO NETWORK CONTROLLER, AND RESOURCE ALLOCATION CONTROL METHOD USED THEREFOR

BACKGROUND OF THE INVENTION

1. Field of the Invention

The present invention relates to a mobile communication system, a base station, a radio network controller, and a resource allocation control method used therefor. In particular, the present invention relates to allocation of resources such as codes from a radio network controller to a base station in HSDPA (High Speed Downlink Packet Access).

2. Description of the Prior Art

A mobile communication system such as the W-CDMA (Wideband-Code Division Multiple Access) system uses HSDPA which is a high speed downlink transmission system. In the case in which the HSDPA is provided, it is necessary to set an HS-PDSCH (High Speed-Physical Downlink Shared Channel) and a DPCH (Dedicated Physical Channel) in a downstream.

Here, the DPCH is an individual channel for sending control data. In particular, the DPCH, which is set in controlling the HS-PDSCH, is called an Associated DPCH. It is possible to set the DPCH independently, and user data can be sent on the DPCH. The HS-PDSCH is a channel for sending user data as a packet and is shared by a plurality of users in a time multiplex manner.

An RNC (Radio Network Controller) allocates codes to an HS-PDSCH and DPCHs of a base station (e.g., see 3GPP TS25.433 V5.1.0 (2002-06), Chapter 8.2.18"). A code indicates a channelization code which is used for identification of each physical channel in a downlink.

The base station controls transmission power of the HS-PDSCH and the DPCHs on the basis of transmission power value of the HS-PDSCH notified from the RNC and sets the HS-PDSCH between the base station and mobile stations using codes allocated by the RNC (hereinafter referred to as allocated codes) and the above-described transmission power (hereinafter referred to as allocated power). The DPCHs are used for the setting of the HS-PDSCH.

However, although the base station cannot use the codes allocated to the HS-PDSCH for the DPCHs, the power allocated to the HS-PDSCH can also be used for the DPCHs in the above-described transmission power control. In the case in which the DPCHs use the power allocated to the HS-PDSCH, transmission power of the HS-PDSCH is decreased such that a sum of transmission power of the HS-PDSCH and transmission power of the DPCHs does not exceed a maximum transmission power of the base station.

Closed loop transmission power control is applied to transmission power of respective DPCHs such that reception qualities of the DPCHs in the mobile stations are uniform. The mobile stations measure a channel quality using a down channel [CPICH (Common Pilot Channel), etc.] and inform the base station of channel quality information (CQI: Channel Quality Indication).

The base station performs control of an AMCS (Adaptive Modulation and Coding Scheme), the number of codes, and the like on the basis of the channel quality information from the mobile stations. In addition, the base station performs scheduling in sending data on the HS-PDSCH.

The number of allocated codes in the above-described HS-PDSCH indicates the maximum number of codes which the base station can use for the HS-PDSCH. The allocated power of the HS-PDSCH indicates a maximum power which the base station can use for the HS-PDSCH in the transmission power control.

By limiting the number of codes and power allocated to the HS-PDSCH, a TBS (Transport Block Size), that is, OTA (Over the Air) throughput is limited. The TBS indicates an available transfer data amount which is found from the above-described number of codes, the transmission power, and the channel quality information. The OTA throughput indicates the number of bits which can be sent in a unit time (transmission speed).

If the channel quality information, the number of codes, a modulation system, and a coding rate are determined, the base station can estimate transmission power which is required for satisfying a predetermined PER (Packet Error Rate). For example, in the case in which a channel quality is defined as a reception CINR (Carrier to Interference and Noise Ratio) of the CPICH, transmission power $P_{HS-PDSCH}$ required by the HS-PDSCH is represented by an expression described below.

$$P_{HS-PDSCH} = P_{CPICH} \times [\text{requiredSINR/SF}]_{HS-PDSCH} / [\text{CINR}]_{CPICH}$$

Here, [requiredSINR] is an SINR (Signal to Interference and Noise Ratio) required for satisfying the predetermined PER and varies depending upon a combination of the number of codes, the modulation system, and the coding rate.

In the conventional transmission power control, the base station allocates the power to the DPCHs on the basis of the power of the HS-PDSCH which is notified from the RNC. Since the power of the HS-PDSCH can also be used for the DPCHs, it is unclear for the RNC to which degree the base station actually uses the power of the HS-PDSCH, which has been notified from the RNC.

Similarly, it is unclear for the RNC which degree of power the base station actually uses for the DPCHs. In other words, the RNC cannot learn to which degree the base station actually uses the power of the HS-PDSCH unless the RNC is informed from the base station.

In the transmission power control of the base station, if the power of the HS-PDSCH is increased, the power is not used efficiently, and power to be allocated to the DPCHs becomes insufficient. In the case in which the power to be allocated to the DPCHs is insufficient, since the number of mobile stations in which the Associated DPCH can be set decreases, the HS-PDSCH cannot be used effectively, and a system capacity of the base station decreases.

Conversely, in the case in which the power of the HS-PDSCH is too small, regardless of the fact that the capacity of the HS-PDSCH is small, since power to be allocated to the Associated DPCH increases, the number of mobile stations, which can receive an HSPDA service, increases, and convergence occurs in the HSPDA service.

In the case in which power is distributed to the HS-PDSCH and the DPCHs appropriately, the RNC is required to grasp a state of use of the power in the base station. As a method therefor, there is a method with which the base station calculate the average amount of use of power and inform the RNC of the calculated value. For example, in 3GPP (3$^{rd}$ Generation Partnership Project), Transmitted Carrier Power for measuring a total value of transmission power of all channels in average is defined as Common Measurement (e.g., see 3GPP TS25.133 V5.2.0 (2002-03), Chapter 9.2.4).

The above-described code allocation method also has the same problem as the distribution of power. The RNC allocates codes to the HS-PDSCH of the base station and also allocates codes to the DPCHs. However, the RNC cannot learn to which degree the base station actually uses the codes allocated to the HS-PDSCH unless the RNC is informed from the base station.

In this code allocation, in the case in which codes to be allocated to the HS-PDSCH are too many, the codes are not used effectively, and codes to be allocated to the DPCHs become insufficient. Thus, the Associated DPCH for controlling the HS-PDSCH cannot be set. Since the number of mobile stations which can receive an HSPDA service decreases, the HS-PDSCH cannot be used effectively, and the system capacity of the base station decreases.

In addition, in the case in which codes to be allocated to the HS-PDSCH is too few, regardless of the fact that a transmission speed of the HS-PDSCH is low, since the number of users, for which the Associated DPCH can be set, increases, the number of mobile stations which can received an HSPDA service increases, and convergence occurs in the HSPDA service.

Therefore, in the case in which codes are allocated to the HS-PDSCH and the DPCHs appropriately, the RNC is required to grasp a state of use of codes in the base station. A method with which the base station calculates the average number of use of codes and which informs the RNC of the calculated value is possible.

In the above-described conventional resource allocation control method, in the case in which codes are distributed to the HS-PDSCH and the DPCHs appropriately, it is conceivable to calculate the average number of use of codes and inform the calculated value from the base station to the RNC. However, if an average value is informed including the number of use of codes at the time when a packet is not sent or a time when data to be sent is little, the informed value varies significantly depending upon a ratio of the time when a packet is not sent.

In addition, in the case in which data is little, since the number of codes to be allocated in the RNC decreases, the base station cannot grasp the number of available codes, which is limited by the maximum transmission power of the HS-PDSCH.

Moreover, a scheduling method varies depending upon a base station, and it is possible that a base station, which allocates all codes to a transmission packet, and a base station, which uses fewer codes in order to control a variation range of transmission power when convergence does not occur, are mixed. In the case in which these base stations are mixed, even if the average value is the same, the RNC cannot grasp whether a packet is sent using all the allocated number of codes or intentionally using the fewer number of codes if the RNC does not know the scheduling method of the base station.

Furthermore, in the case in which a system capacity of the base station is small compared with the number of HSDPA users, it is unclear for the RNC how many allocated codes should be increased. Therefore, in order to distribute codes appropriately to the HS-PDSCH and the DPCHs, the RNC is required to grasp information on a state of use of allocated codes.

Similarly, in order to notify an appropriate value in notifying power, which should be used for the HS-PDSCH, to the base station, the RNC is required to grasp information on a state of use of allocated power in the base station.

On the other hand, in the case in which codes and power to be allocated to the HS-PDSCH are too little, since convergence occurs in the HSPDA service, in order to distribute codes appropriately to the HS-PDSCH and the DPCHs, the RNC is required to grasp information on a state of use of an HS-PDSCH channel.

BRIEF SUMMARY OF THE INVENTION

Therefor, it is an object of the present invention to solve the above-described problems and provide a mobile communication system, a base station, a radio network controller, and a resource allocation control method used therefor which can improve throughput of an HS-PDSCH.

A first mobile communication system according to the present invention is a mobile communication system for performing resource management including allocation of codes to form a high speed data transfer path for a mobile station, the mobile communication system including: means which measures a state of use of the codes; and means which performs the resource management on the basis of a result of the measurement.

A second mobile communication system according to the present invention is a mobile communication system for performing a resource management including transmission power control to form a high speed data transfer path for mobile stations, the mobile communication system including: means which measures a state of use of the transmission power; and means which performs the resource management on the basis of a result of the measurement.

A third mobile communication system according to the present invention is a mobile communication system for forming a high speed data transfer path for a mobile station and performing resource management on the high speed data transfer path, the mobile communication system including: means which measures a time rate at which data is sent on the data transfer path; and means which performs the resource management on the basis of a result of the measurement.

A fourth mobile communication system according to the present invention is a mobile communication system for performing resource management including allocation of codes and transmission power control to form a high speed data transfer path for mobile stations, the mobile communication system including: calculation means which calculates averages values with respect to the number of use of the codes and an amount of use of the transmission power on the basis of a data transfer time to the data transfer path; and control means which performs the resource management on the basis of the average values.

A fifth mobile communication system according to the present invention is a mobile communication system, including: a base station; a mobile station for which a shared channel shared with other mobile stations is set in order to perform data transmission with the base station; and a radio network controller which notifies the base station of at least the number of allocated codes which is a maximum value of the number of codes of the shared channel, wherein means, which measures an average number of use of the codes in a data transmission time on the shared channel, is provided in the base station.

A sixth mobile communication system according to the present invention is a mobile communication system, including: a base station; a mobile station for which a shared channel shared with other mobile stations is set in order to perform data transmission with the base station; and a radio network controller which notifies the base station of at least allocated power which is a maximum value of power of the shared channel, wherein means, which measures an average amount of use of the power in a data transmission time on the shared channel, is provided in the base station.

A seventh mobile communication system according to the present invention is a mobile communication system, including: a base station; a mobile station for which a shared channel shared with other mobile stations is set in order to perform data transmission with the base station; and a radio network controller which notifies the base station of at least resource allocation information of the shared channel, wherein means, which measures a time rate at which data is sent on the shared channel, is provided in the base station.

An eighth mobile communication system according to the present invention is a mobile communication system, including: a base station; a mobile station for which a shared channel shared with other mobile stations is set in order to perform data transmission with the base station; and a radio network controller which notifies the base station of the number of allocated codes which is a maximum value of the number of codes of the shared channel and allocated power which is a maximum value of power of the shared channel, wherein means, which measures an average number of use of the codes in a data transmission time on the shared channel, means, which measures an average amount of use of the power in a data transmission time on the shared channel, and means, which measures a time rate at which data is sent on the shared channel, are provided in the base station.

A first base station according to the present invention is a base station which sets a shared channel shared with other mobile stations in order to perform data transmission with a mobile station at least on the basis of the number of allocated codes which is notified from a radio network controller and is a maximum value of the number of codes of the shared channel, the base station including means which measures an average number of use of the codes in a data transmission time on the shared channel.

A second base station according to the present invention is a base station which sets a shared channel shared with other mobile stations in order to perform data transmission with a mobile station at least on the basis of allocated power which is notified from a radio network controller and is a maximum value of power of the shared channel, the base station including means which measures an average amount of use of the power in a data transmission time on the shared channel.

A third base station according to the present invention is a base station which sets a shared channel shared with other mobile stations in order to perform data transmission with a mobile station at least on the basis of resource allocation information which is notified from a radio network controller, the base station including means which measures a time rate at which data is sent on the shared channel.

A fourth base station according to the present invention is a base station which sets a shared channel shared with other mobile stations in order to perform data transmission with a mobile station on the basis of the number of allocated codes which is notified from a radio network controller and is a maximum value of the number of codes of the shared channel and allocated power which is a maximum value of power of the shared channel, the base station including means which measures an average number of use of the codes in a data transmission time on the shared channel, means which measures an average value of use of the power in a data transmission time on the shared channel, and means which measures a time rate at which data is sent on the shared channel.

A first radio network controller according to the present invention is a radio network controller which, when a shared channel shared with other mobile stations is set in order to perform data transmission between a base station and a mobile station, notifies the base station of at least the number of allocated codes which is a maximum value of the number of codes of the shared channel, the radio network controller including means which updates the number of allocated codes on the basis of the average number of use of the codes in a data transmission time on the shared channel which is measured in the base station.

A second radio network controller according to the present invention is a radio network controller which, when a shared channel shared with other mobile stations is set in order to perform data transmission between a base station and a mobile station, notifies the base station of at least allocated power which is a maximum value of power of the shared channel, the radio network controller including means which updates the allocated power on the basis of the average value of use of the power in a data transmission time on the shared channel which is measured in the base station.

A third radio network controller according to the present invention is a radio network controller which, when a shared channel shared with other mobile stations is set in order to perform data transmission between a base station and a mobile station, notifies the base station of at least resource allocation information of the shared channel, the radio network controller including means which updates the resource allocation on the basis of a time rate at which data is sent on the shared channel which is measured in the base station.

A fourth radio network controller according to the present invention is a radio network controller which, when a shared channel shared with other mobile stations is set in order to perform data transmission between a base station and a mobile station, notifies the base station of the number of allocated codes which is a maximum value of the number of codes of the shared channel and allocated power which is a maximum value of power of the shared channel, the radio network controller including means which updates the number of allocated codes and the allocated power on the basis of the average number of use of the codes in a data transmission time on the shared channel which is measured in the base station, an average value of use of the power in a data transmission time on the shared channel, and a time rate at which data is sent on the shared channel.

A first resource allocation control method according to the present invention is a resource allocation control method for a mobile communication system which performs resource management including allocation of codes to form a high speed data transfer path for a mobile station, the resource allocation control method including, on a management side performing the resource management: processing for measuring a state of use of the codes; and processing for performing the resource management on the basis of a result of the measurement.

A second resource allocation control method according to the present invention is a resource allocation control method for a mobile communication system which performs resource management including transmission power control to form a high speed data transfer path for a mobile station, the resource allocation control method including, on a management side performing the resource management: processing for measuring a state of use of the transmission power; and processing for performing the resource management on the basis of a result of the measurement.

A third resource allocation control method according to the present invention is a resource allocation control method for a mobile communication system which forms a high speed data transfer path for a mobile station and performs resource management in the high speed data transfer path, the resource allocation control method including, on a management side performing the resource management: processing for measuring a time rate at which data is sent on the data transfer path; and processing for performing the resource management on the basis of a result of the measurement.

A fourth resource allocation control method according to the present invention is a resource allocation control method for a mobile communication system which performs resource management including allocation of codes and transmission power control to form a high speed data transfer path for a mobile station, the resource allocation control method including, on a management side performing the resource management: processing for calculating averages values with respect to the number of use of the codes and an amount of use of the transmission power on the basis of a data transfer time to the data transfer path; and processing for performing the resource management on the basis of the average values.

A fifth resource allocation control method according to the present invention is a resource allocation control method for a mobile communication system which includes: a base station; a mobile station for which a shared channel shared with other mobile stations is set in order to perform data transmission with the base station; and a radio network controller which notifies the base station of at least the number of allocated codes which is a maximum value of the number of codes of the shared channel, the resource allocation control methods including, on the base station side: a step of measuring an average number of use of the codes in a data transmission time on the shared channel.

A sixth resource allocation control method according to the present invention is a resource allocation control method for a mobile communication system which includes: a base station; a mobile station for which a shared channel shared with other mobile stations is set in order to perform data transmission with the base station; and a radio network controller which notifies the base station of at least allocated power which is a maximum value of power of the shared channel, the resource allocation control methods including, on the base station side: a step of measuring an average value of use of the power in a data transmission time on the shared channel.

A seventh resource allocation control method according to the present invention is a resource allocation control method for a mobile communication system which includes: a base station; a mobile station for which a shared channel shared with other mobile stations is set in order to perform data transmission with the base station; and a radio network controller which notifies the base station of at least resource allocation information of the shared channel, the resource allocation control method including, on the base station side: a step of measuring a time rate at which data is sent on the shared channel.

An eighth resource allocation control method according to the present invention is a resource allocation control method for a mobile communication system which includes: a base station; a mobile station for which a shared channel shared with other mobile stations is set in order to perform data transmission with the base station; and a radio network controller which notifies the base station of the number of allocated codes which is a maximum value of the number of codes of the shared channel and allocated power which is a maximum value of power of the shared channel, the resource allocation control method including, on the base station side: a step of measuring an average number of use of the codes in a data transmission time on the shared channel; a step of measuring an average amount of use of the power in a data transmission time on the shared channel, and a step of measuring a time rate at which data is sent on the shared channel.

In other words, the mobile communication system of the present invention performs measurement of a state of use of codes to be allocated from the RNC to the base station, measurement of a state of use of power to be notified form the RNC to the base station, and measurement of a channel congestion state, respectively, in the base station with only a transmission time of a transmission packet, that is, a transmission time when an available transfer data amount found from the number of codes, transmission power, and channel quality information is substantially the maximum, as an object, and performs allocation of resources on the basis of the measurement to thereby make it possible to improve throughput of the HS-PDSCH.

In the mobile communication system of the present invention, in the measurement of a state of use of codes, a state of use of the codes is confirmed to increase allocated codes appropriately, whereby it is made possible to increase an average TBS of a transmission packet without deteriorating efficiency of use of the allocated code. Thus, it becomes possible to improve throughput of the HS-PDSCH.

In the mobile communication system of the present invention, a state of use of codes is confirmed to decrease allocated codes appropriately, whereby it becomes possible to improve efficiency of use with respect to the allocated codes without deteriorating throughput of the base station.

In the mobile communication system of the present invention, since the number of codes which can be allocated to channels other than the HS-PDSCH increases, it becomes possible to increase users of the Associated DPCH, and it becomes possible to improve throughput of the HS-PDSCH. At the same time, since it becomes possible to allocate codes to the channels other than the Associated DPCH, improvement of throughput of the entire base station is expected.

In the mobile communication system of the present invention, a state of use of power is confirmed to increase allocated power appropriately in measurement of a state of use of power, whereby it becomes possible to increase an average TBS of a transmission packet without deteriorating efficiency of use of the allocated power. Thus, it becomes possible to improve throughput of the HS-PDSCH.

In addition, in the mobile communication system of the present invention, a state of use of power is confirmed to decrease allocated power appropriately, whereby it becomes possible to improve efficiency of use with respect to the allocated power without deteriorating throughput of the base station. In addition, since power which can be allocated to channels other than the HS-PDSCH increases, it becomes possible to increase users of the Associated DPCH, and it becomes possible to improve throughput of the HS-PDSCH. At the same time, since it becomes possible to allocate power to channels other than the Associated DPCH, improvement of throughput of the entire base station is expected.

Further, in the mobile communication system of the present invention, in the case in which a state of congestion of the system is measured in measurement of a state of channel congestion and it is judged that a system capacity is limited due to a code or power, since an allocated code or allocated power is added on the basis of a result of measurement concerning states of use of codes and power, it becomes possible to prevent occurrence of convergence.

DETAILED DESCRIPTION OF THE PREFERRED EMBODIMENTS

Figure 1:
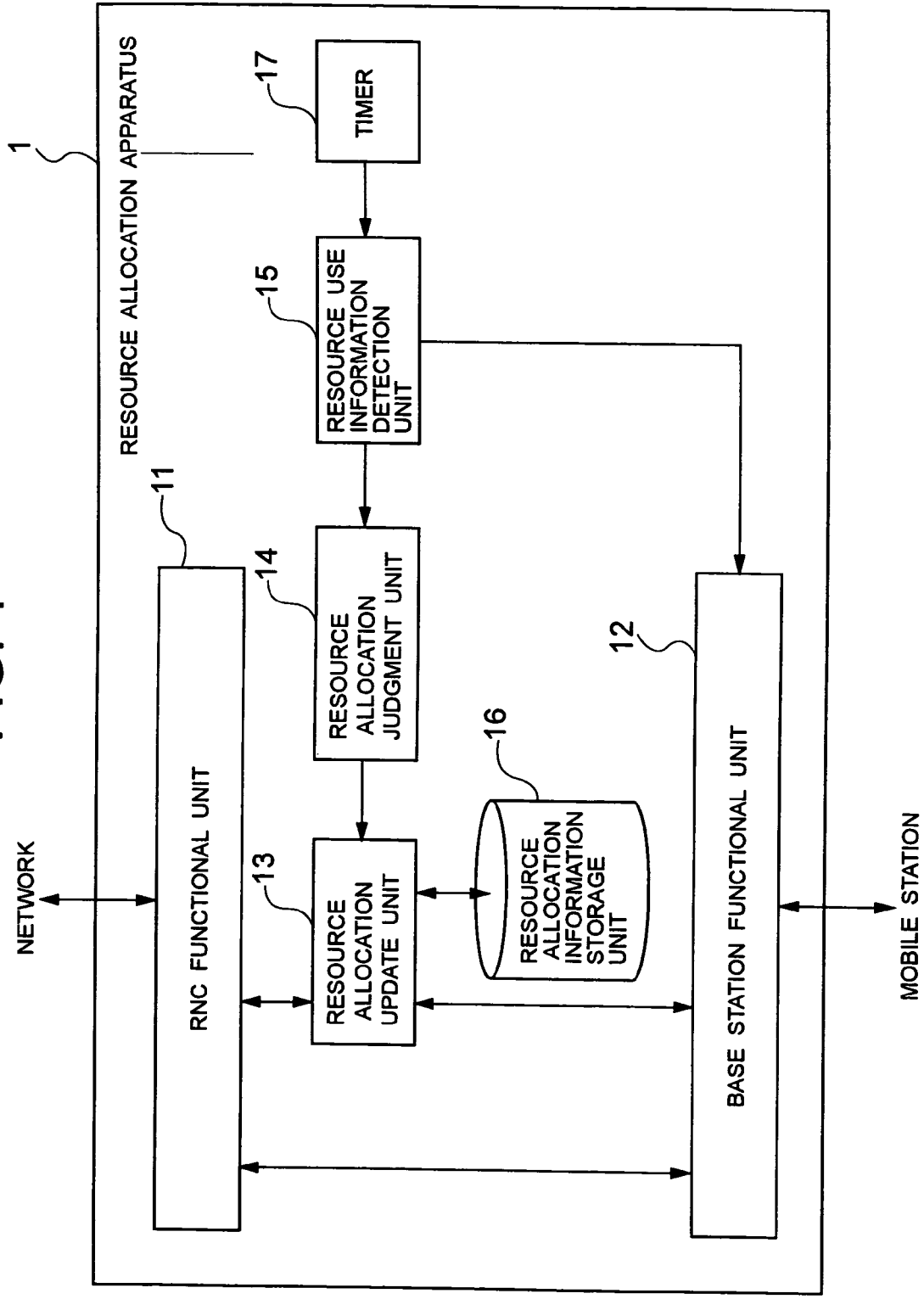
FIG. 1 is a block diagram showing a structure of a resource allocation apparatus according to an embodiment mode of the present invention.

Next, an embodiment mode of the present invention will be described with reference to the accompanying drawings. FIG. 1 is a block diagram showing a structure of a resource allocation apparatus according to the embodiment mode of the present invention. In FIG. 1, a resource allocation apparatus 1 includes: an RNC (Radio Network Controller) functional unit 11 which is connected to a not-shown network; a base station functional unit 12 which is connected to a not-shown mobile station; a resource allocation update unit 13; a resource allocation judgment unit 14; a resource use information detection unit 15; a resource allocation information storage unit 16; and a timer 17.

Since the RNC functional unit 11 and the base station functional unit 12 have the same functions as an RNC and a base station which are used in a mobile communication system of the W-CDMA (Wideband-Code Division Multiple Access) system or the like, and structures and operations thereof are well known, description thereof will be omitted.

The resource allocation update unit 13 is connected to the RNC functional unit 11 and the base station functional unit 12. The resource allocation update unit 13 performs allocation control of resources (update of allocation of resources) such as the number of codes [Channelization codes] to be allocated from the RNC functional unit 11 to the base station functional unit 12 and power to be notified and stores allocation information of the resources in the resource allocation information storage unit 16.

The resource use information detection unit 15 detects information on a state of use of resources on the basis of a state of use of resources from the base station functional unit 12 and timing information from the timer 17 and notifies the resource allocation judgment unit 14 of the information on the state of use of the resources. The resource allocation judgment unit 14 judges on whether or not to perform update of allocation of the resources on the basis of the information on the state of use of the resources from the resource use information detection unit 15 and notifies the resource allocation update unit 13 of a result of the judgment.

Note that, in FIG. 1, the resource allocation update unit 13, the resource allocation judgment unit 14, the resource use information detection unit 15, the resource allocation information storage unit 16, and the timer 17 are illustrated independently from the RNC functional unit 11 and the base station functional unit 12, respectively. However, it is also possible to assign these units to the RNC functional unit 11 and the base station functional unit 12. Structures and operations in that case will be described later.

Figure 2:
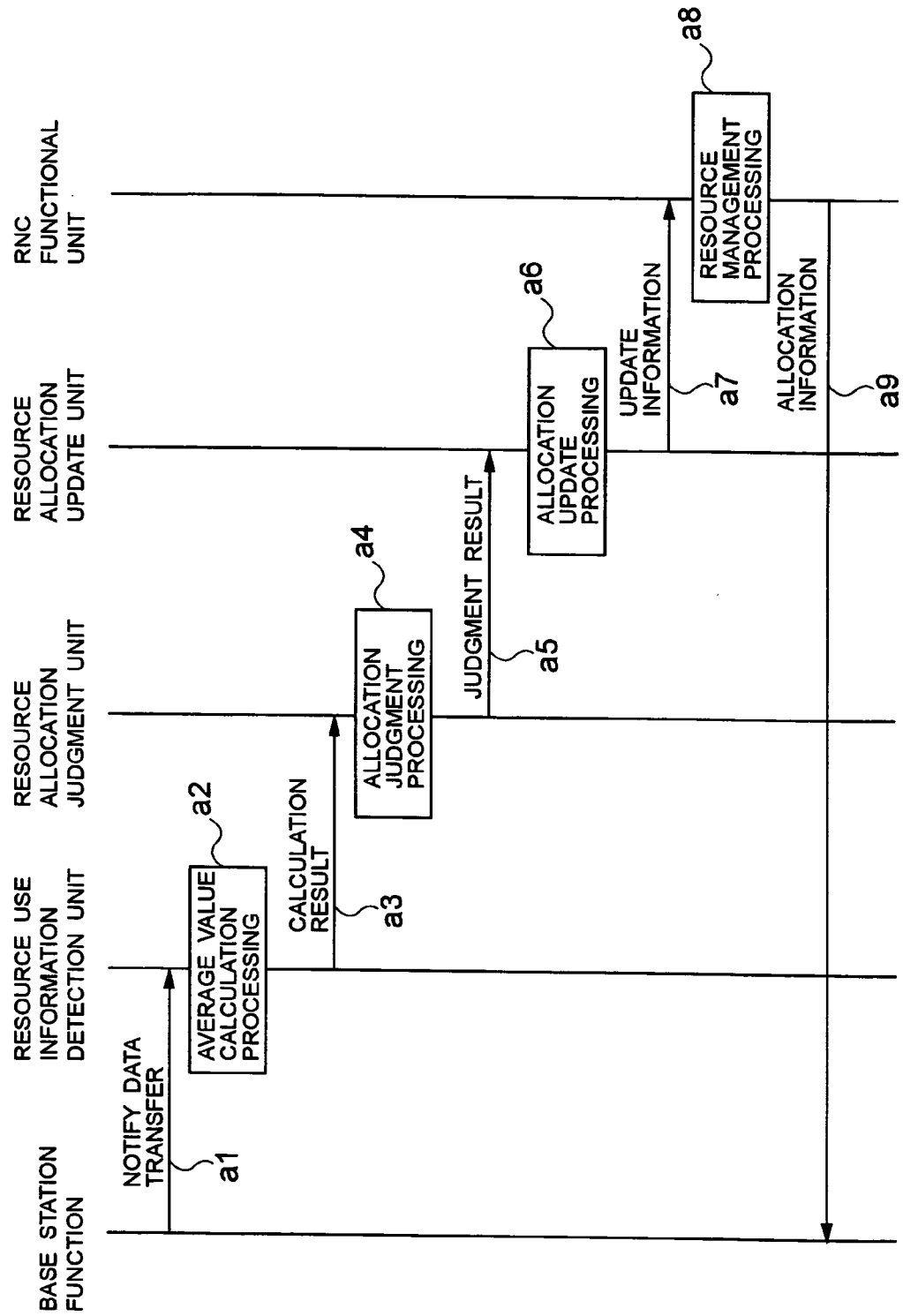
FIG. 2 is a sequence chart showing an operation of the resource allocation apparatus according to the embodiment mode of the present invention.

FIG. 2 is a sequence chart showing an operation of a resource allocation apparatus according to the embodiment mode of the present invention. An operation of the resource allocation apparatus 1 will be described with reference to FIGS. 1 and 2.

When a data transfer notification is received from the base station functional unit 12 (a1 in FIG. 2), the resource use information detection unit 15 detects information on a state of use of resources (the number of codes, transmission power, a data transfer time, etc.), calculates an average value of use of the resources (average value calculation processing) (a2 in FIG. 2), and sends a result of the calculation to the resource allocation judgment unit 14 (a3 in FIG. 2).

The resource allocation judgment unit 14 judges whether or not to perform update of allocation of resources on the basis of the result of the calculation from the resource use information detection unit 15 (allocation judgment processing) (a4 in FIG. 2) and sends a result of the judgment to the resource allocation update unit 13 (a5 in FIG. 2). The resource allocation update unit 13 performs update of the allocation of the resources on the basis of the result of the judgment from the resource allocation judgment unit 14 (allocation update processing) (a6 in FIG. 2) and sends update information to the RNC functional unit 11 (a7 in FIG. 2).

The RNC functional unit 11 performs management of resources on the basis of the update information from the resource allocation update unit 13 (resource management processing) (a8 in FIG. 2) and sends allocation information to the base station functional unit 12 (a9 in FIG. 2). The base station functional unit 12 performs allocation of the resources on the basis of the allocation information from the RNC functional unit 11.

FIGS. 3A and 3B to FIGS. 14A and 14B are diagrams for explaining a detection method of resource use information by the resource use information detection unit 15 of FIG. 1. A detection (measurement) method of resource use information by the resource use information detection unit 15 will be described with reference to FIG. 1 to FIGS. 14A and 14B.

First, the resource use information detection unit 15 performs measurement described below in order to perform appropriate code allocation of the HS-PDSCH (High Speed-Physical Downlink Shared Channel).

Figure 3A:
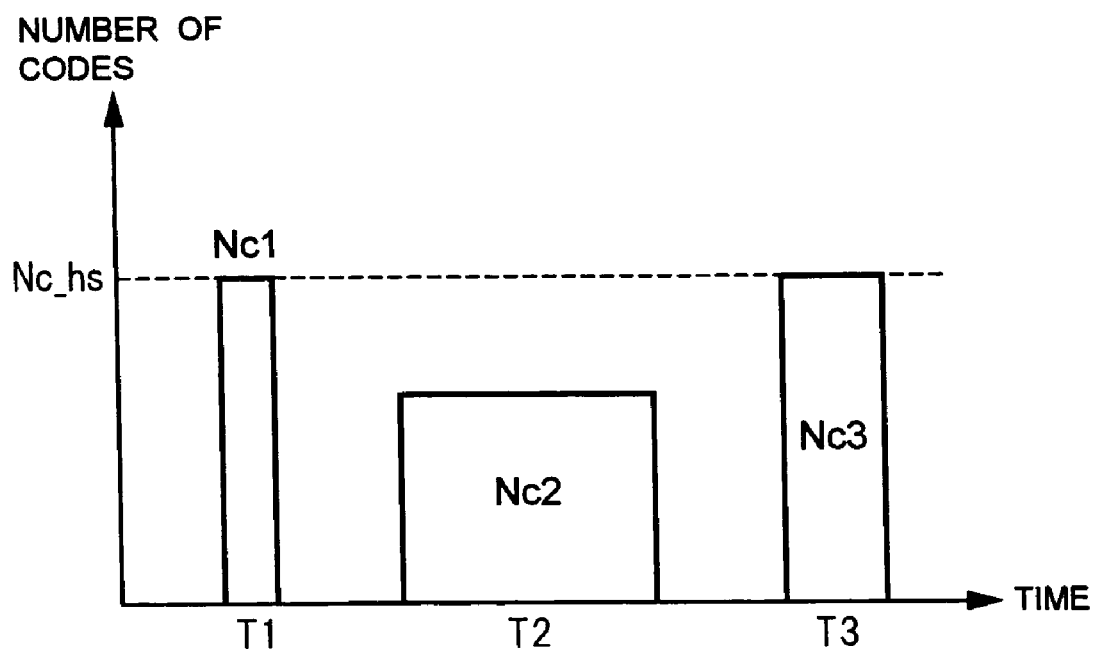
FIGS. 3A and 3B are diagrams for explaining a detection method of resource use information by a resource use information detection unit of FIG. 1.
Figure 3B:
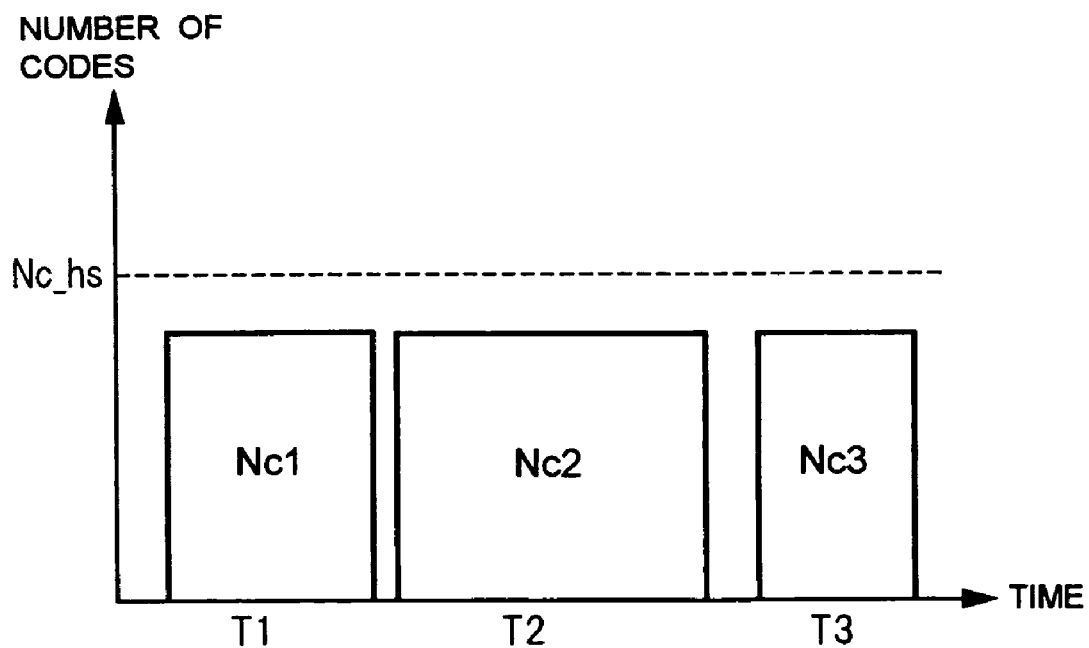

In a first code measurement method, as shown in FIGS. 3A and 3B, in the case in which the numbers of used codes are Nc1, Nc2, and Nc3, transmission times of the codes are T1, T2, and T3, and the number of allocated codes from the resource allocation control unit 13 is Nc_hs, an average use rate Cu (Code Utilization) is calculated by an expression shown below.

$$Cu=(Nc1*T1+Nc2*T2+Nc3*T3)/Nc\_hs*(T1+T2+T3)$$

As described above, the resource use information detection unit 15 calculates the average number of use of codes or the average use rate Cu except at time when data is not sent (to the maximum) and informs the resource allocation judgment unit 14 of a result of the calculation.

With this first code measurement method, since the average number of use (or average use rate) is found, it can be seen if a present number of allocated codes does not limit a system capacity (throughput), that is, OTA (Over the Air) throughput.

For example, in the case in which two reference values (reference value 1>reference value 2) of the average use rate Cu are set, a basic algorithm of code allocation with respect to the HS-PDSCH is processing for increasing allocated codes if the average use rate Cu is larger than the predetermined reference value 1 and decreasing allocated codes if the average use rate Cu is smaller than the predetermined reference value 2.

In the case in which the average use rate Cu of FIG. 3A and the average use rate Cu of FIG. 3B are the same, the resource allocation judgment unit 14 has only the average use rate Cu and cannot distinguish a state shown in FIG. 3A from a state shown in FIG. 3B. In this case, the resource allocation judgment unit 14 combines the average use rate Cu with information on "a convergence state of channels" to be described later to thereby distinguish the state shown in FIG. 3A from the state shown in FIG. 3B.

Figure 4A:
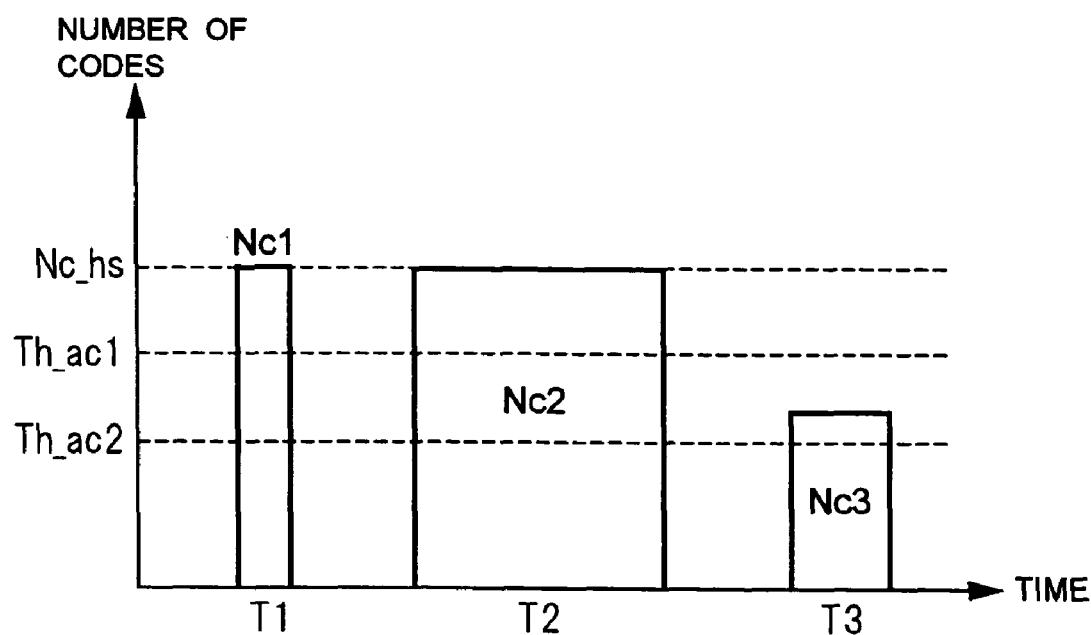
FIGS. 4A and 4B are diagrams for explaining the detection method of resource use information by the resource use information detection unit of FIG. 1.
Figure 4B:
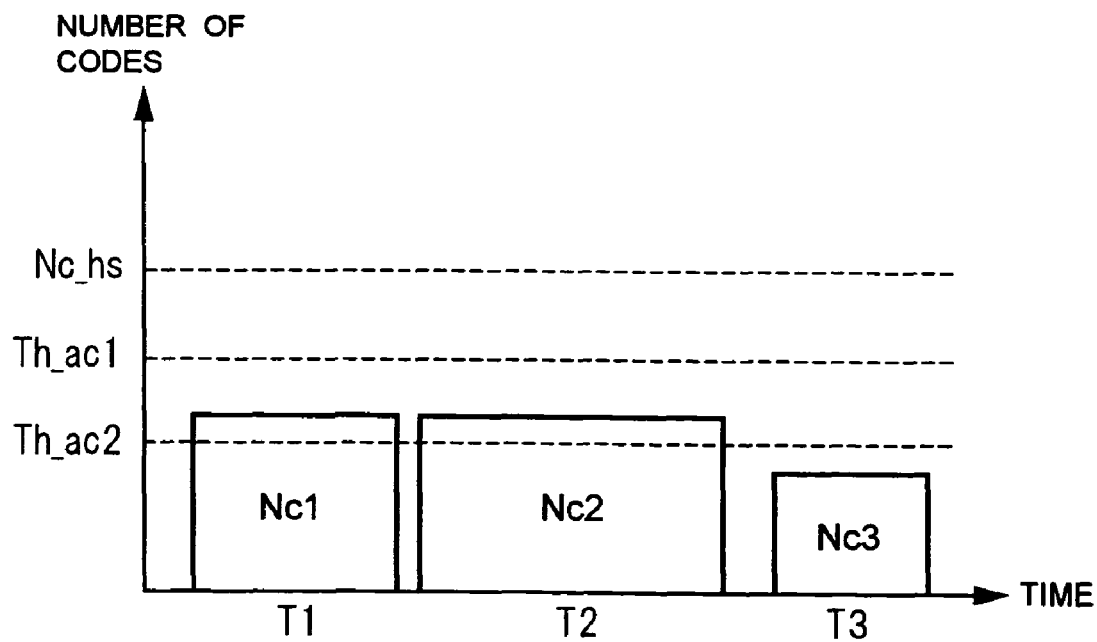

In a second code measurement method, as shown in FIGS. 4A and 4B, in the case in which the numbers of used codes are Nc1, Nc2, and Nc3, transmission times of the codes are T1, T2, and T3, the number of allocated codes is Nc_hs, and code threshold values are Th_ac1 and Th_ac2, a ratio Ac (Actual Code Utilized Duration) 1 of used codes equal to or higher than the code threshold value Th_ac1 of the codes used in FIG. 4A is Ac1=(T1+T2)/(T1+T2+T3). A ratio Ac2 of used codes equal to or higher than the code threshold value Th_ac2 is "Ac2=1" because all the numbers of used codes Nc1, Nc2, and Nc3 exceed the code threshold value Th_ac2.

In addition, the radio Ac1 of used codes equal to or higher than the code threshold value Th_ac1 of the codes used in FIG. 4B is "Ac1=0" because all the numbers of used codes Nc1, Nc2, and Nc3 do not exceed the code threshold value Th_ac1, and the ratio Ac2 of used codes equal to or higher than the code threshold value Th_ac2 is Ac2=(T1+T2)/(T1+T2+T3).

As described above, with a time in which data is sent (to the maximum) [a transmission time at the time when a transfer data amount, which is sent when a TBS (Transport Block Size) being a transferred data amount found from the number of allocation of codes, transmission power, and channel quality information (CQI: Channel Quality Indication) is substantially the maximum, is substantially the same as the TBS] as an object, the resource use information detection unit 15 calculates a ratio of using the number of codes equal to or higher than the set threshold value or a time when the number of codes equal to or higher than the set threshold value is used, and informs the resource allocation judgment unit 14 of a result of the calculation. In the above-described example, the ratios Ac1 and Ac2 of using the number of codes equal to or higher than the set code threshold values Th_ac1 and Th_ac2 are indicated.

With this second code measurement method, since a probability distribution (or time) of used codes is found, it can be seen if a present number of allocated codes does not limit a system capacity (throughput), that is, OTA throughput.

In addition, if a plurality of threshold values are set to calculate an Ac of the respective threshold values, with the second code measurement method, since a probability distribution (or time) of used codes corresponding to the respective threshold values is found, it can be seen how many codes of the number of allocated codes should be opened.

For example, a basic algorithm of code allocation with respect to the HS-PDSCH is as described below in the case in which two code threshold values (Th_ac1>Th_ac2) are set so as to be equal to or lower than the number of allocated codes Nc_hs, results of calculation of an Ac for Th_ac1 and Th_ac2 are set as Ac1 and Ac2, and reference values for Ac1 and Ac2 are set as Sv_ac1 and Sv_ac2.

In this algorithm, allocated codes are increased in the case in which the calculation result Ac1 is larger than the predetermined reference value Sv_ac1, and allocated codes are decreased in the case in which the calculation result Ac2 is smaller than the predetermined reference value Sv_ac2.

In the case of a state shown in FIG. 4A, the resource allocation judgment unit 14 can determine that, since the calculation result Ac1 is not larger than the predetermined reference value Sv_ac1, the allocated codes may be decreased to the code threshold value Th_ac1 if convergence does not occur.

In addition, in the case of a state shown in FIG. 4B, the resource allocation judgment unit 14 can determine that the allocated codes may be decreased to the code threshold value Th_ac1. Moreover, the resource allocation judgment unit 14 can determine that, since the calculation result Ac2 is not larger than the predetermined reference value Sv_ac2, the allocated codes may be decreased to the code threshold value Th_ac2 if convergence does not occur.

Figure 5A:
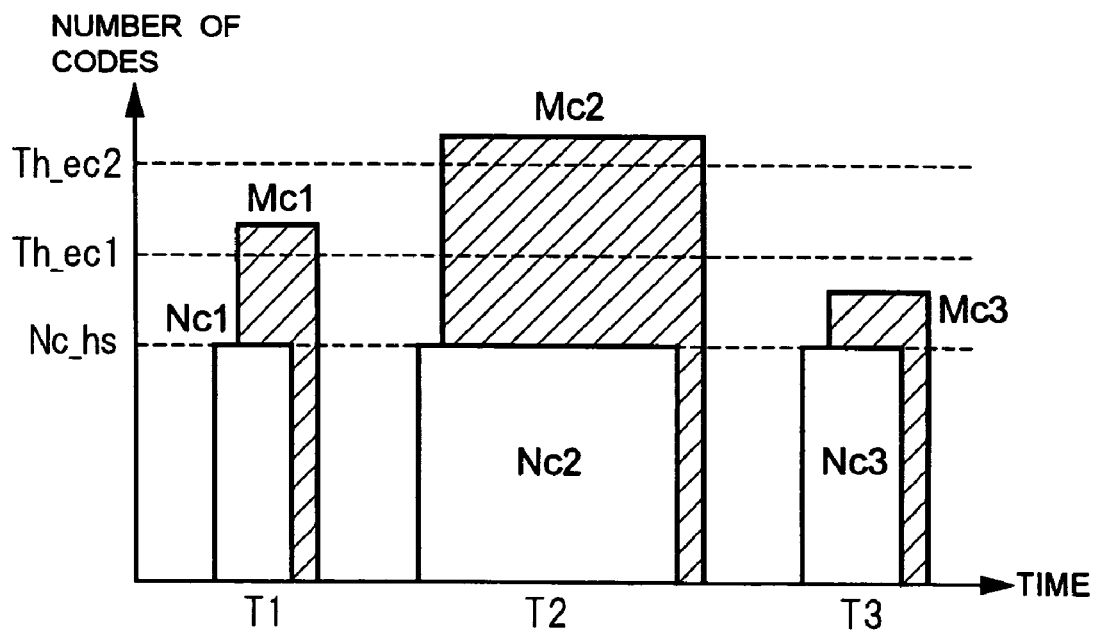
FIGS. 5A and 5B are diagrams for explaining the detection method of resource use information by the resource use information detection unit of FIG. 1.
Figure 5B:
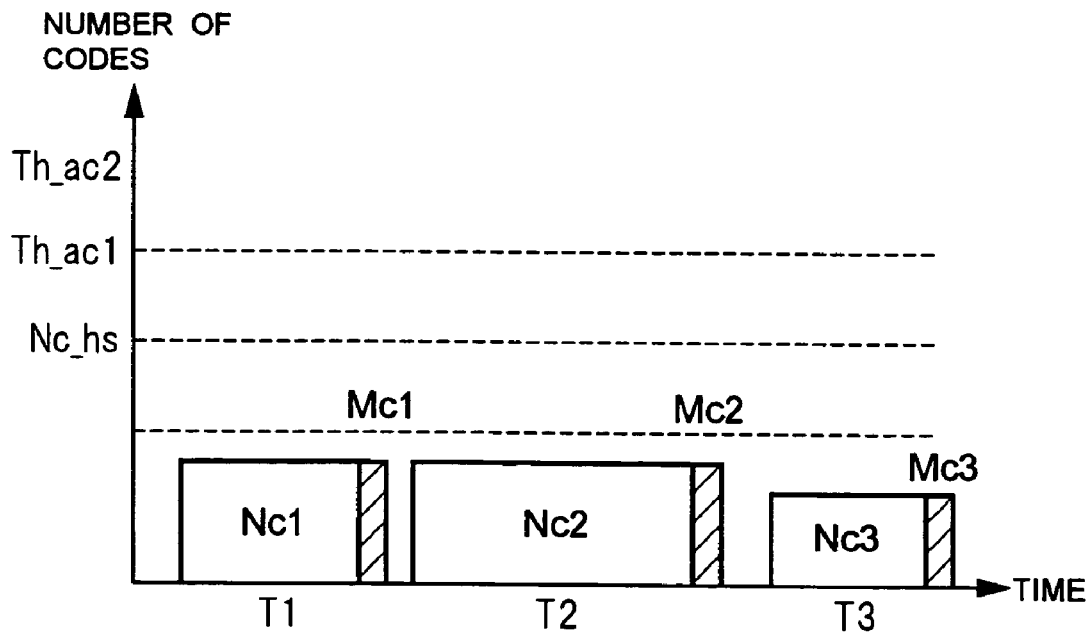

In a third code measurement method, as shown in FIGS. 5A and 5B, in the case in which the numbers of used codes are Nc1, Nc2, and Nc3, transmission times of the codes are T1, T2, and T3, the number of allocated codes is Nc_hs, the numbers of codes available in using entire allocated power are Mc1, Mc2, and Mc3 (shaded portions in FIGS. 5A and 5B), and code threshold values are Th_ec1 and Th_ec2, a ratio Ec (Estimated Code Utilized Duration) 1 of the numbers of available codes Mc1, Mc2, and Mc3 being the number of codes equal to or higher than the set code threshold value Th_ec1 in FIG. 5A is Ec1=(T1+T2)/(T1+T2+T3).

In addition, a ratio Ec2 of the number of available codes Mc1, Mc2, and Mc3 being the number of codes equal to or higher than the code threshold value Th_ec2 is Ec2=T2/(T1+T2+T3).

In FIG. 5B, since the number of available codes Mc1, Mc2, and Mc3 are not the number of codes equal to or higher than the set code threshold values Th_ec1 and Th_ec2, the ratios Ec1 and Ec2 of the number of codes equal to or higher than the code threshold value Th_ec1 and Th_ec2 are "Ec1=0" and "Ec2=0", respectively.

As described above, with a time in which data is sent (to the maximum) as an object, the resource use information detection unit 15 calculates the number of codes which is necessary in the case in which the entire allocated power is used, calculates a ratio of the calculated number of codes being the number of codes equal to or higher than the set threshold value or a time when the calculated number of codes is the number of codes equal to or higher than the set threshold value, and informs the resource allocation judgment unit 14 of a result of the calculation.

With this third code measurement method, since the resource allocation judgment unit 14 can find the number of codes necessary for an increase in a capacity of the base station functional unit 12, it can be seen if a present number of allocated codes does not limit a system capacity (throughput), that is, OTA (Over the Air) throughput.

If a plurality of threshold values are set to calculate a ratio Ec with respect to the respective threshold values, with the third code measurement method, since a probability distribution (or time) of the number of codes necessary for an increase in a capacity of the base station functional unit 12 corresponding to the respective threshold values is found, it can be seen how many allocated codes should be added.

However, with only the third code measurement method, since an operation for reducing allocated codes cannot be carried out, it is necessary to use the first code measurement method or the second code measurement method as well.

For example, a basic algorithm of code allocation with respect to the HS-PDSCH is as described below in the case in which two code threshold values (Th_ec1<Th_ec2) are set so as to be equal to or lower than the number of allocated codes Nc_hs, results of calculation of an Ec for Th_ec1 and Th_ec2 are set as Ec1 and Ec2, and reference values for Ec1 and Ec2 are set as Sv_ec1 and Sv_ec2.

In this algorithm, allocated codes are increased in the case in which the calculation result Ec1 is larger than the predetermined reference value Sv_ec1, and allocated codes are increased to be larger than those in the case of the calculation result Ec1 in the case in which the calculation result Ec2 is larger than the predetermined reference value Sv_ec2.

In the case of a state shown in FIG. 5A, the resource allocation judgment unit 14 can determine that, when allocated codes are added to the code threshold value Th_ac1, improvement of throughput of the base station functional unit 12 can be expected but an increase of allocated codes to the code threshold value Th_ac2 is excessive.

Figure 6A:
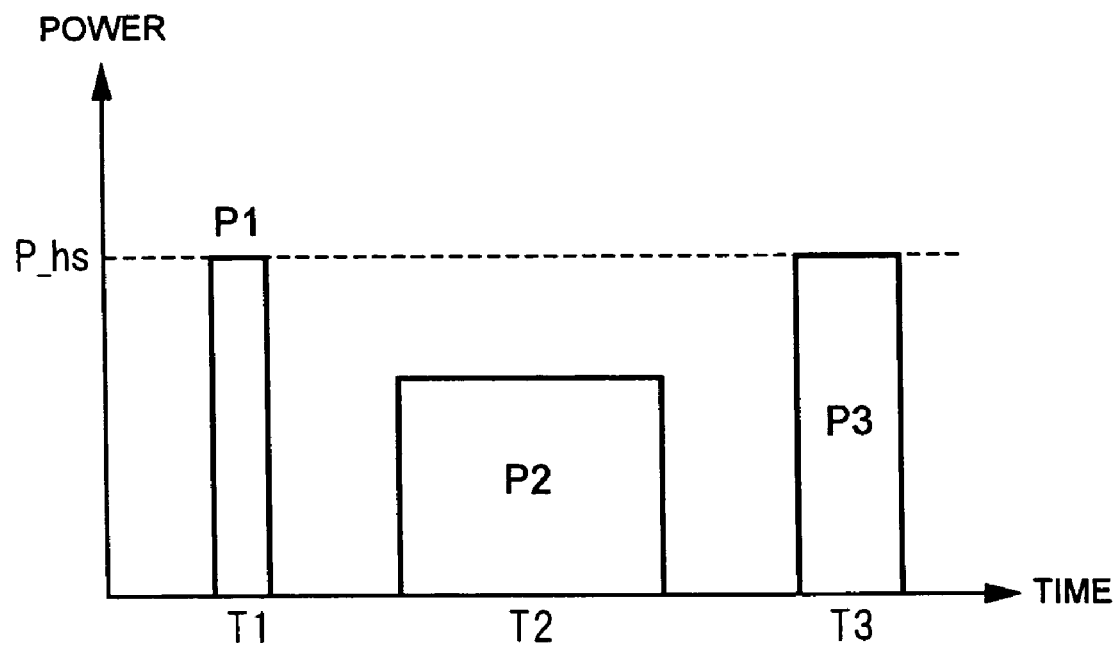
FIGS. 6A and 6B are diagrams for explaining the detection method of resource use information by the resource use information detection unit of FIG. 1.
Figure 6B:
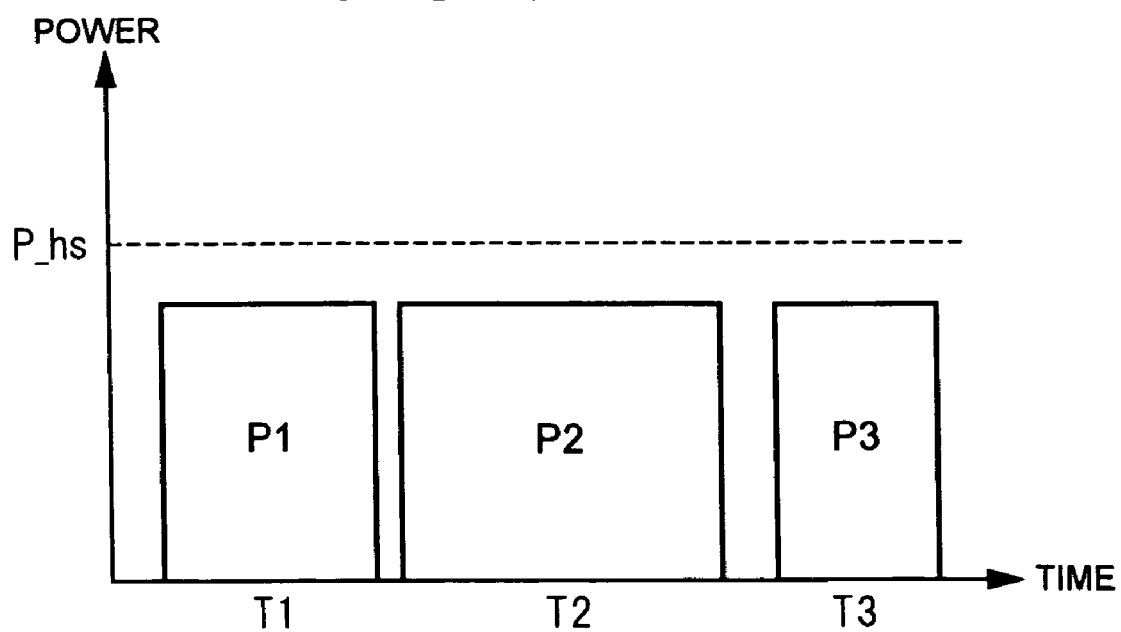

Next, the resource use information detection unit 15 performs measurement described below in order to perform appropriate power allocation for the HS-PDSCH. In a first power measurement method, as shown in FIGS. 6A and 6B, in the case in which amounts of used power is P1, P2, and P3, transmission times thereof are T1, T2, and T3, and power notified from the RNC functional unit 11 to the base station functional unit 12 (hereinafter referred to as allocated power) is P_hs, an average use rate Pu (Power Utilization) is calculated by an expression shown below.

$$Pu=(P1*T1+P2*T2+P3*T3)/P\_hs*(T1+T2+T3)$$

As described above, the resource use information detection unit 15 calculates an average amount of use of power ([W] or [dBm]) or an average use rate except at the time when data is not sent (to the maximum) and informs the resource allocation judgment unit 14 of a result of the calculation. In examples shown in FIGS. 6A and 6B, the average use rate is shown.

In this case, since transmission power of a DPCH (Dedicated Physical Channel) has increased, the resource use information detection unit 15 calculates an average amount of use of power or an average use rate except at time when transmission power of the HS-PDSCH is smaller than allocated power P_hs of the HS-PDSCH.

With this first power measurement method, since an average amount of use (or average use rate) is found, it can be seen if a present allocated power does not limit a system capacity (throughput), that is, OTA (Over the Air) throughput.

For example, in the case in which two reference values (reference value 1>reference value 2) of the average use rate Pu are set, a basic algorithm of power allocation with respect to the HS-PDSCH is processing for increasing allocated power if the average use rate Pu is larger than the predetermined reference value 1 and decreasing allocated power if the average use rate Pu is smaller than the predetermined reference value 2.

In the case in which the average use rate Pu of FIG. 6A and the average use rate Pu of FIG. 6B are the same, the resource allocation judgment unit 14 has only the average use rate Pu and cannot distinguish a state shown in FIG. 6A from a state shown in FIG. 6B. In this case, the resource allocation judgment unit 14 combines the average use rate Pu with information on "a convergence state of channels" to be described later to thereby distinguish the state shown in FIG. 6A from the state shown in FIG. 6B.

Figure 7A:
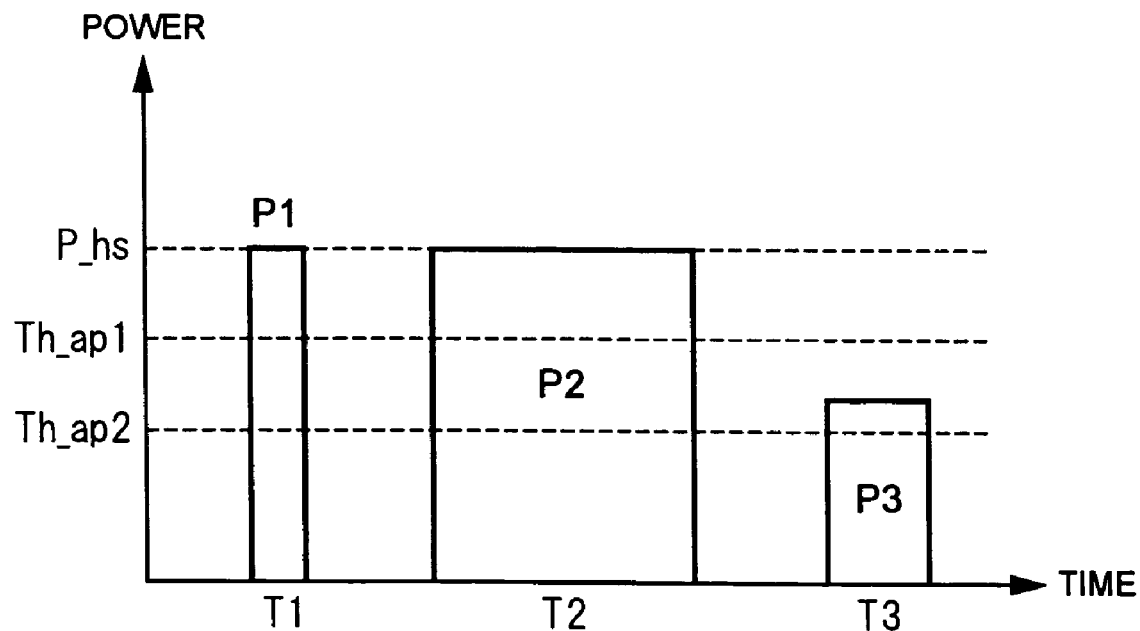
FIGS. 7A and 7B are diagrams for explaining the detection method of resource use information by the resource use information detection unit of FIG. 1.
Figure 7B:
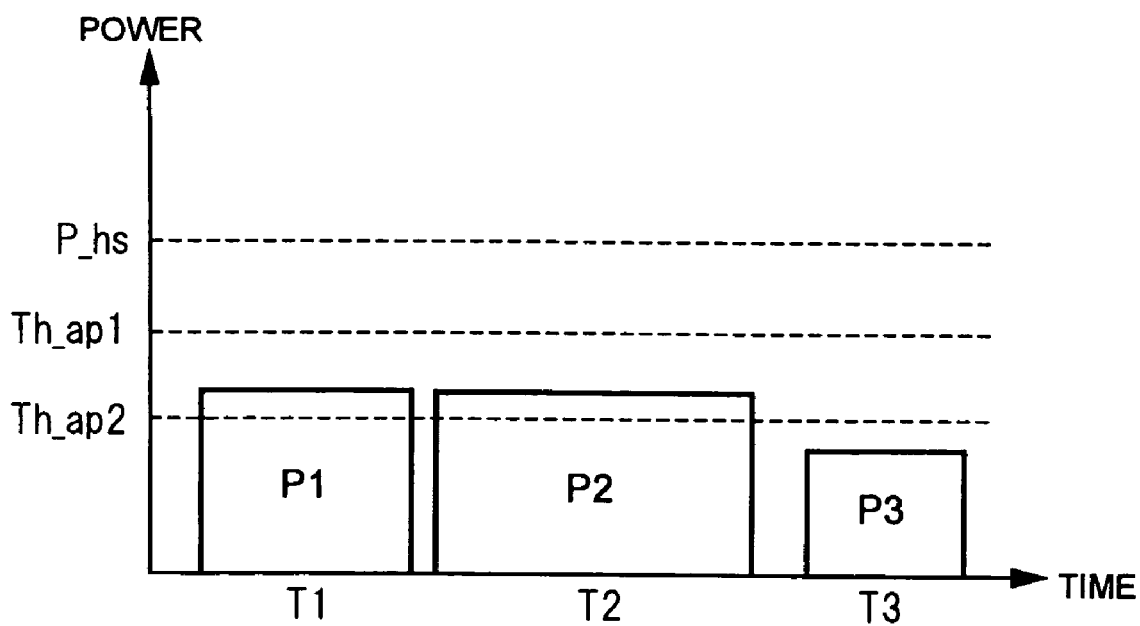

In a second power measurement method, as shown in FIGS. 7A and 7B, in the case in which amounts of used power is P1, P2, and P3, transmission times thereof are T1, T2, and T3, allocated power is P_hs, and power threshold values are Th_ap1 and Th_ap2, a ratio Ap (Actual Power Utilized Duration) 1 of used power equal to or higher than the code threshold value Th_ap1 of the power used in FIG. 7A is Ap1=(T1+T2)/(T1+T2+T3). A ratio Ac2 of used power equal to or higher than the power threshold value Th_ap2 is "Ap2=1" because all the amounts of used power P1, P2, and P3 exceed the power threshold value Th_ac2.

In addition, the radio Ap1 of used power equal to or higher than the power threshold value Th_ap1 of the power used in FIG. 7B is "Ap1=0" because all the amounts of used power P1, P2, and P3 do not exceed the power threshold value Th_ap1, and the ratio Ap2 of used codes equal to or higher than the power threshold value Th_ap2 is Ap2=(T1+T2)/(T1+T2+T3).

As described above, with a time in which data is sent (to the maximum) as an object, the resource use information detection unit 15 calculates a ratio of using power equal to or higher than the set threshold value or a time when power equal to or higher than the set threshold value is used, and informs the resource allocation judgment unit 14 of a result of the calculation. In the above-described example, the ratios Ap1 and Ap2 of using power equal to or higher than the set threshold values are indicated.

In this second power measurement method, since transmission power of a DPCH has increased, the resource use information detection unit 15 calculates a ratio of using power equal to or higher than the set threshold value or a time when power equal to or higher than the set threshold value is used except at time when transmission power of the HS-PDSCH is smaller than allocated power of the HS-PDSCH.

Therefore, with this second power measurement method, since a probability distribution (or time) of used power is found, it can be seen if present allocated power does not limit a system capacity (throughput), that is, OTA throughput.

In addition, if a plurality of threshold values are set to calculate an Ap of the respective threshold values, with the second power measurement method, since a probability distribution (or time) of used power corresponding to the respective threshold values is found, it can be seen how much of the allocated power should be opened.

For example, a basic algorithm of power allocation with respect to the HS-PDSCH is as described below in the case in which two power threshold values (Th_ap1>Th_ap2) are set so as to be equal to or lower than the allocated power P_hs, results of calculation of an Ap for Th_ap1 and Th_ap2 are set as Ap1 and Ap2, and reference values for Ap1 and Ap2 are set as Sv_ap1 and Sv_ap2.

In this algorithm, allocated power is increased in the case in which the calculation result Ap1 is larger than the predetermined reference value Sv_ap1, and allocated power is decreased in the case in which the calculation result Ap2 is smaller than the predetermined reference value Sv_ap2.

In the case of a state shown in FIG. 7A, the resource allocation control unit 13 can determine that, since the calculation result Ap1 is not larger than the predetermined reference value Sv_ap1, the allocated power may be decreased to the power threshold value Th_ap1 if convergence does not occur.

In the case of a state shown in FIG. 7B, the resource allocation control unit 13 can determine that the allocated power may be decreased to the power threshold value Th_ap1. Moreover, the resource allocation control unit 13 can determine that, since the calculation result Ap2 is not larger than the predetermined reference value Sv_ap2, the allocated power may be decreased to the power threshold value Th_ap2 if convergence does not occur.

Figure 8A:
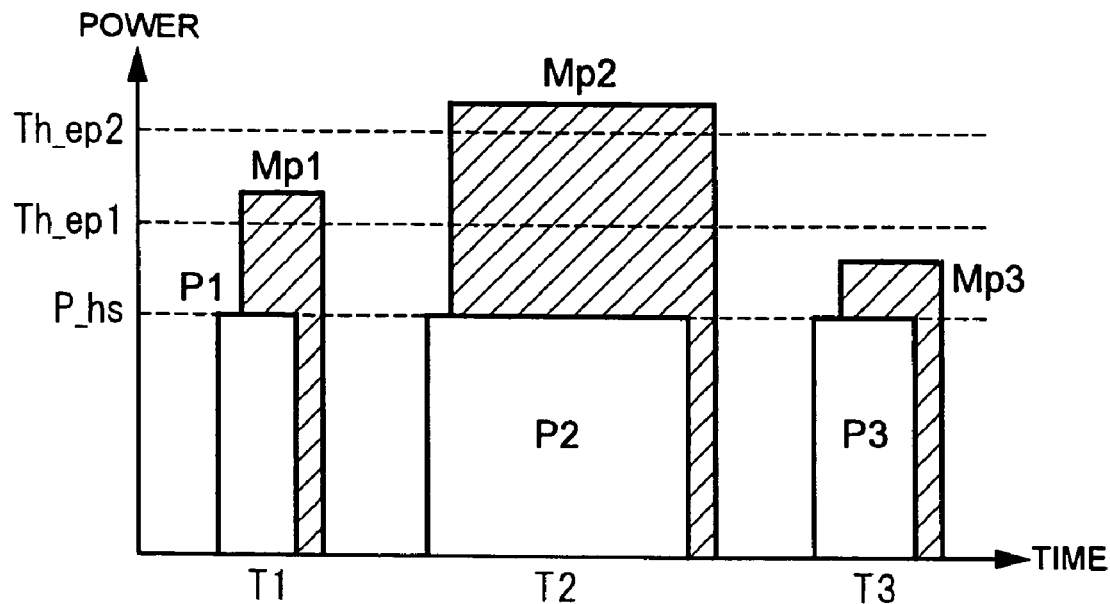
FIGS. 8A and 8B are diagrams for explaining the detection method of resource use information by the resource use information detection unit of FIG. 1.
Figure 8B:
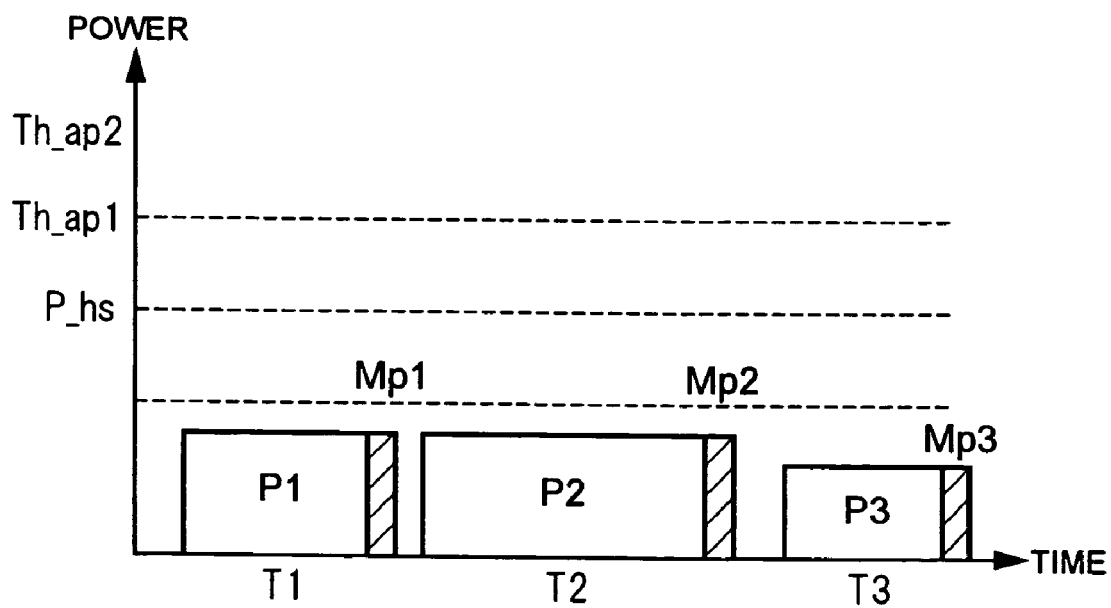

In a third code measurement method, as shown in FIGS. 8A and 8B, in the case in which amounts of used power are P1, P2, and P3, transmission times of the power are T1, T2, and T3, allocated power is P_hs, values of power available in using all allocated codes are Mp1, Mp2, and Mp3 (shaded portions in FIGS. 8A and 8B), and power threshold values are Th_ep1 and Th_ep2, a ratio Ec (Estimated Power Utilized Duration) 1 of the values of available power Mp1, Mp2, and Mp3 being the power equal to or higher than the set power threshold value Th_ep1 in FIG. 8A is Ep1=(T1+T2)/(T1+T2+T3).

In addition, a ratio Ep2 of the values of available power Mp1, Mp2, and Mp3 being the power equal to or higher than the power threshold value Th_ep2 is Ep2=T2/(T1+T2+T3).

In FIG. 8B, since the values of available power Mp1, Mp2, and Mp3 are not the power equal to or higher than the set power threshold values Th_ep1 and Th_ep2, the ratios Ep1 and Ep2 of the power equal to or higher than the power threshold value Th_ep1 and Th_ep2 are "Ep1=0" and "Ep2=0", respectively.

As described above, with a time in which data is sent (to the maximum) as an object, the resource use information detection unit 15 calculates power which is necessary in the case in which all the allocated codes are used, calculates a ratio of the calculated power being power equal to or higher than the set threshold value or a time when the calculated power is power equal to or higher than the set threshold value, and informs the resource allocation judgment unit 14 of a result of the calculation.

With this third power measurement method, since transmission power of the DPCH has increased, the resource allocation judgment unit 14 calculates a ratio of the transmission power being power equal to or higher than the set threshold value or a time when the transmission power is power equal to or higher than the set threshold value except at the time when the transmission power of the HS-PDSCH is smaller than the allocated power of the HS-PDSCH.

Consequently, since the resource allocation judgment unit 14 can find power necessary for an increase in a capacity of the base station functional unit 12, it can be seen if present allocated power does not limit a system capacity (throughput), that is, OTA (Over the Air) throughput.

If a plurality of threshold values are set to calculate a ratio Ep with respect to the respective threshold values, with the third power measurement method, since a probability distribution (or time) of the power necessary for an increase in a capacity of the base station functional unit 12 corresponding to the respective threshold values is found, it can be seen how much allocated power should be added.

However, with only the third power measurement method, since an operation for reducing allocated power cannot be carried out, it is necessary to use the first power measurement method or the second power measurement method as well.

For example, a basic algorithm of power allocation with respect to the HS-PDSCH is as described below in the case in which two power threshold values (Th_ep1<Th_ep2) are set so as to be equal to or lower than the allocated power P_hs, results of calculation of an Ep for Th_ep1 and Th_ep2 are set as Ep1 and Ep2, and reference values for Ep1 and Ep2 are set as Sv_ep1 and Sv_ep2.

In this algorithm, allocated power is increased in the case in which the calculation result Ep1 is larger than the predetermined reference value Sv_ep1, and allocated power is increased to be larger than that in the case of the calculation result Ep1 in the case in which the calculation result Ep2 is larger than the predetermined reference value Sv_ep2.

In the case of a state shown in FIG. 8A, the resource allocation judgment unit 14 can determine that, when allocated power is added to the power threshold value Th_ap1, improvement of throughput of the base station functional unit 12 can be expected but an increase of allocated power to the power threshold value Th_ap2 is excessive.

Moreover, the resource use information detection unit 15 performs measurement described below in order to prevent convergence of the HS-PDSCH. In a first transmission time measurement method, as shown in FIGS. 9A and 9B and FIGS. 10A and 10B, in the case in which the numbers of used codes are Nc1, Nc2, and Nc3, transmission times thereof are T1, T2, and T3, the number of allocated codes from the RNC functional unit 11 to the base station functional unit 12 is Nc_hs, amounts of used power are P1, P2, and P3, transmission times thereof are T1, T2, and T3, allocated power notified from the RNC functional unit 11 to the base station functional unit 12 is P_hs, and a measurement time is T, a time rate Tu (Time Utilization) at which data is sent on the HS-PDSCH is calculated by an expression shown below.

$$Tu=(T1+T2+T3)/T$$

As described above, the resource use information detection unit 15 calculates a time rate at which data is sent on the HS-PDSCH or a time in which data is sent, and informs the resource allocation judgment unit 14 of a result of the calculation. In examples shown in FIGS. 9A and 9B and FIGS. 10A and 10B, the time rate is shown.

It is seen that the HS-PDSCH is completely used in this first transmission time measurement method. For example, in the case of examples shown in FIGS. 10A and 10B, although resources of codes and power are not completely used, the time rate Tu is a value close to 100%.

Figure 9A:
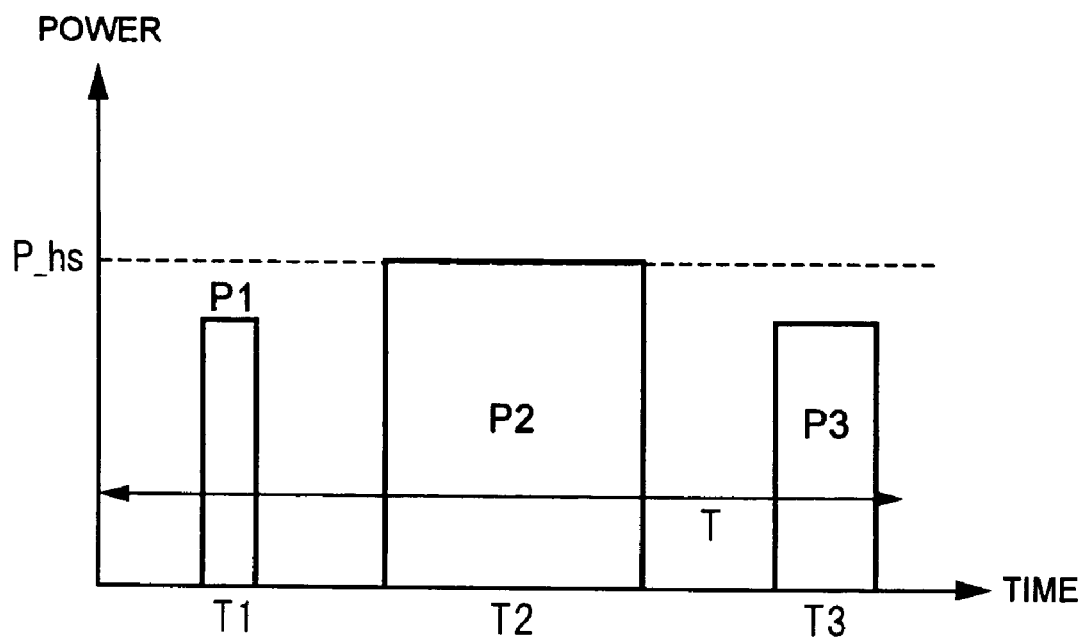
FIGS. 9A and 9B are diagrams for explaining the detection method of resource use information by the resource use information detection unit of FIG. 1.
Figure 9B:
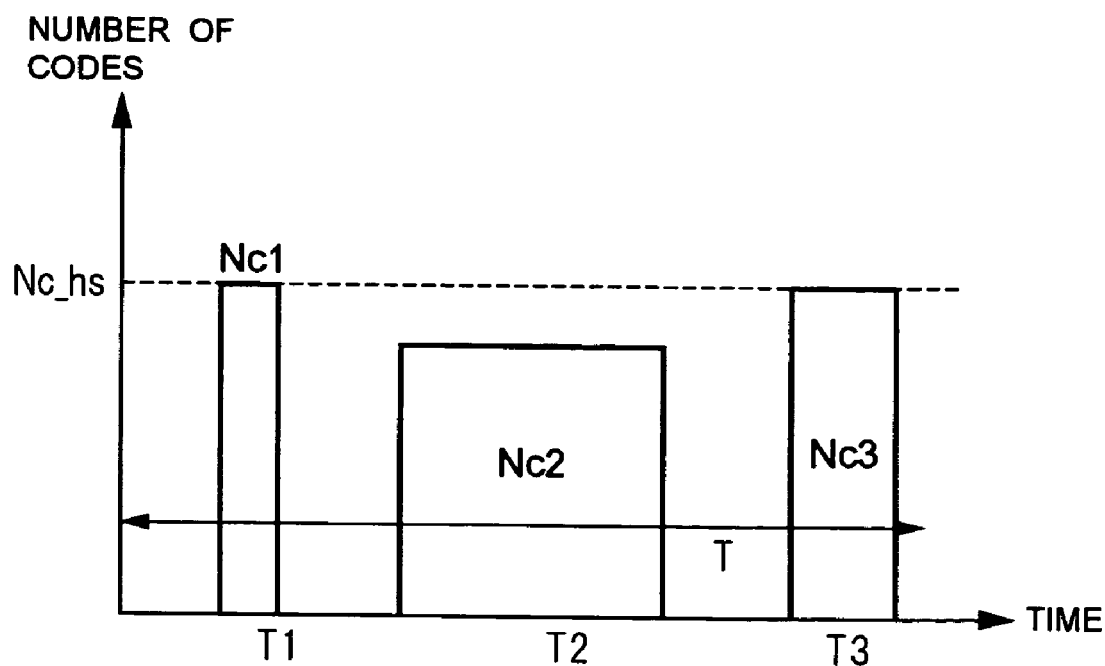
Figure 10A:
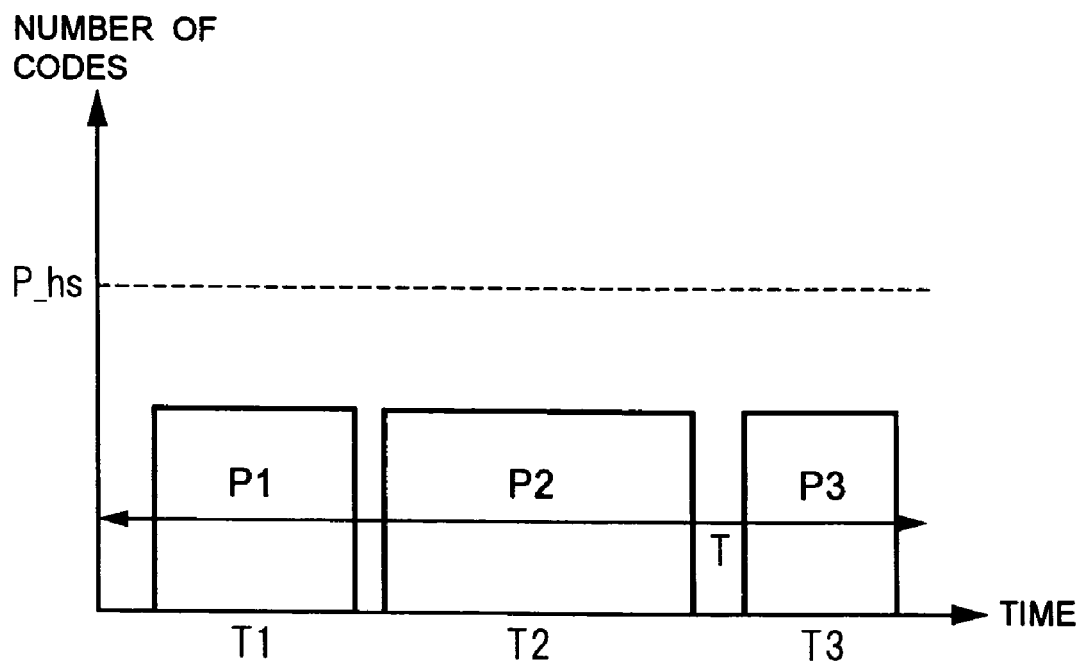
FIGS. 10A and 10B are diagrams for explaining the detection method of resource use information by the resource use information detection unit of FIG. 1.
Figure 10B:
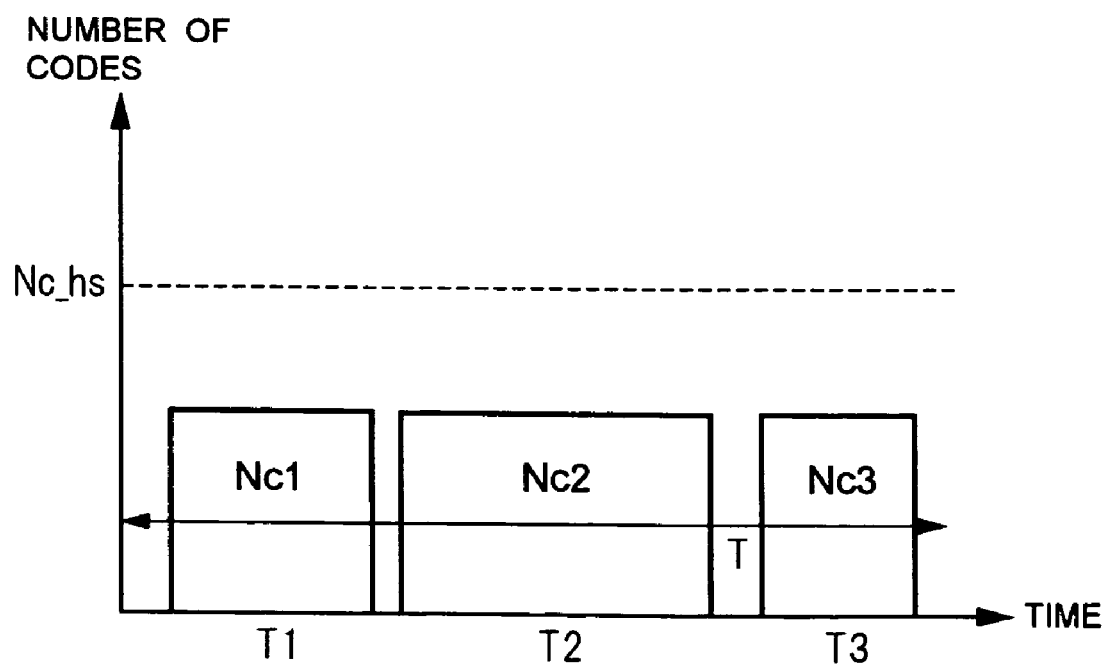

The hours rate Tu shown in FIGS. 10A and 10B is larger than the time rate Tu shown in FIGS. 9A and 9B. This does not necessarily mean that channels are more congested in the example shown in FIGS. 9A and 9B. Therefore, the resource allocation judgment unit 14 combines the time rate Tu with measurement values relating to the first to the third code measurement methods and the first to the third power measurement methods to determine a degree of congestion of the base station functional unit 12.

Figure 11A:
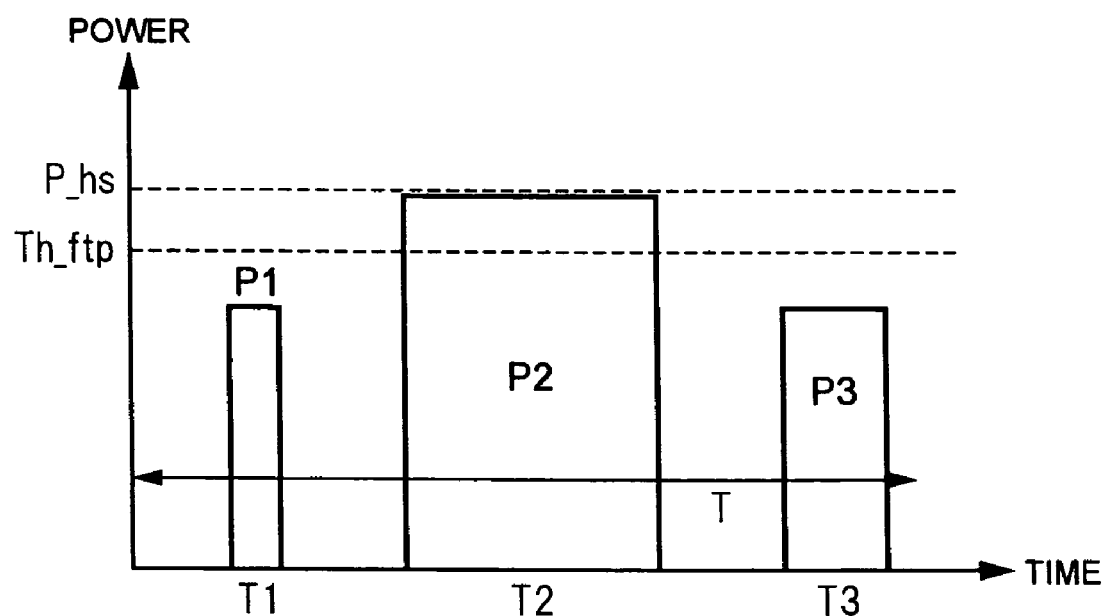
FIGS. 11A and 11B are diagrams for explaining the detection method of resource use information by the resource use information detection unit of FIG. 1.
Figure 11B:
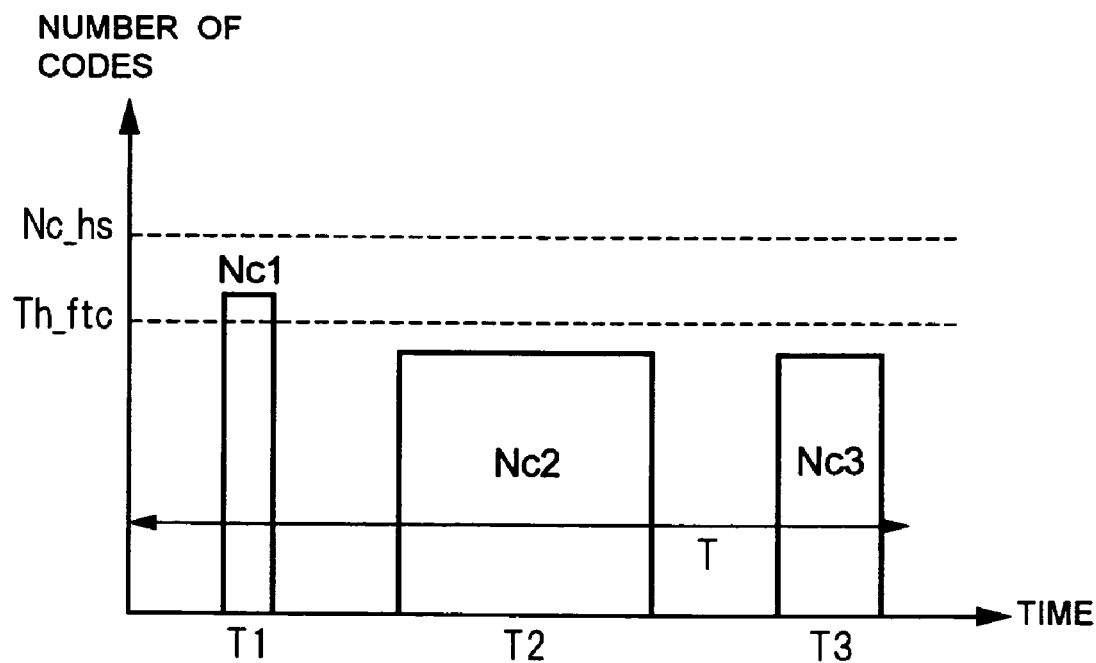
Figure 12A:
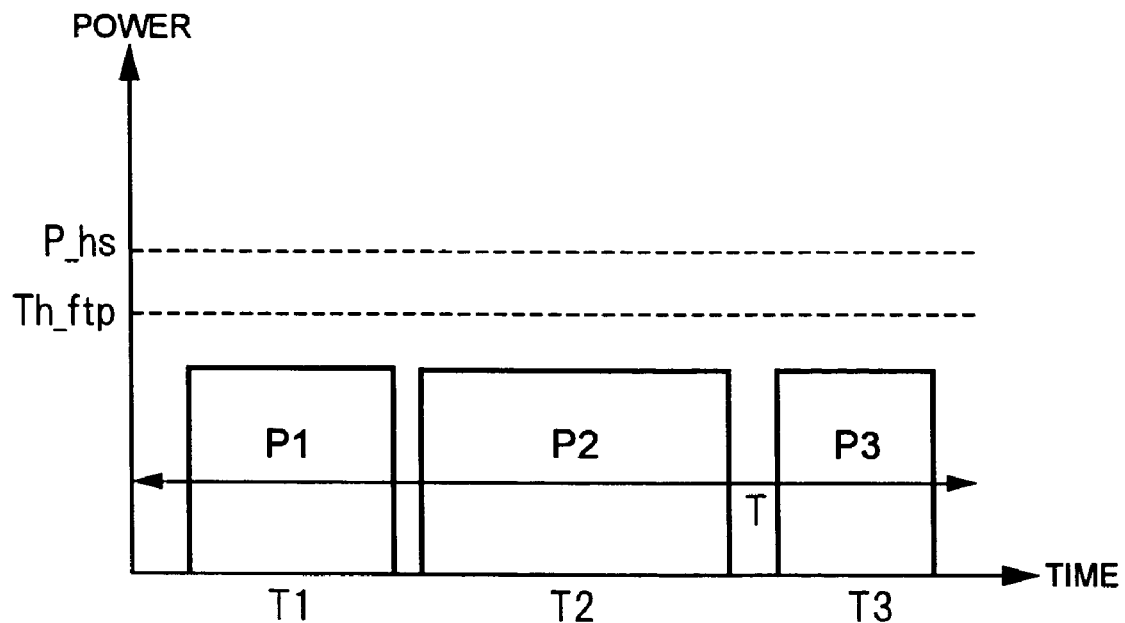
FIGS. 12A and 12B are diagrams for explaining the detection method of resource use information by the resource use information detection unit of FIG. 1.
Figure 12B:
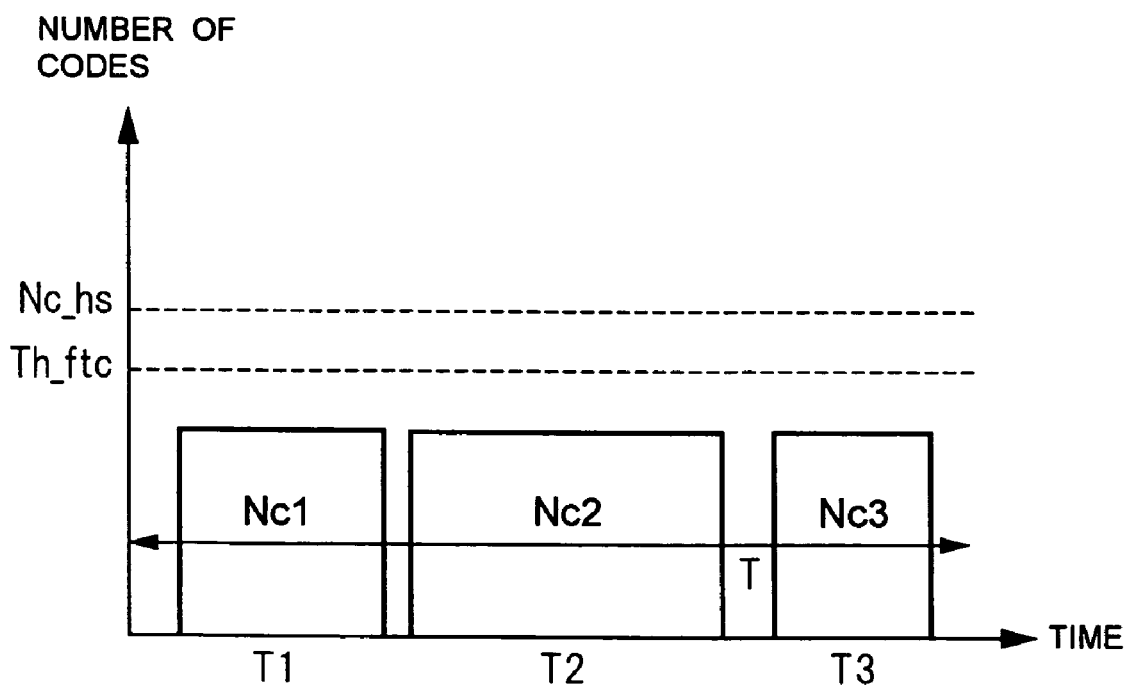
Figure 13A:
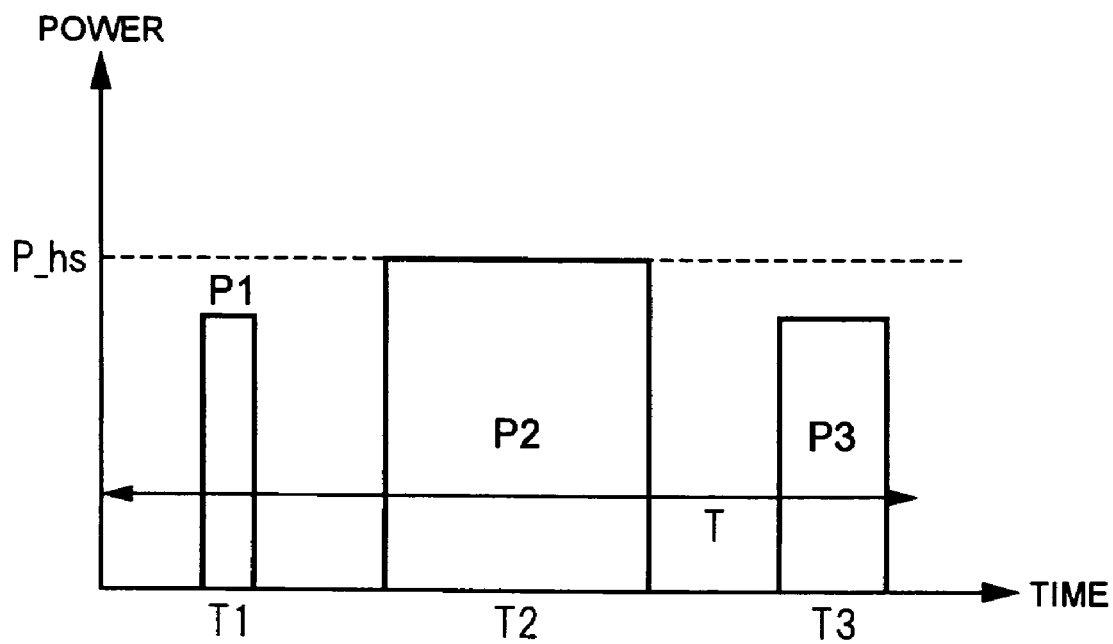
FIGS. 13A and 13B are diagrams for explaining the detection method of resource use information by the resource use information detection unit of FIG. 1.
Figure 13B:
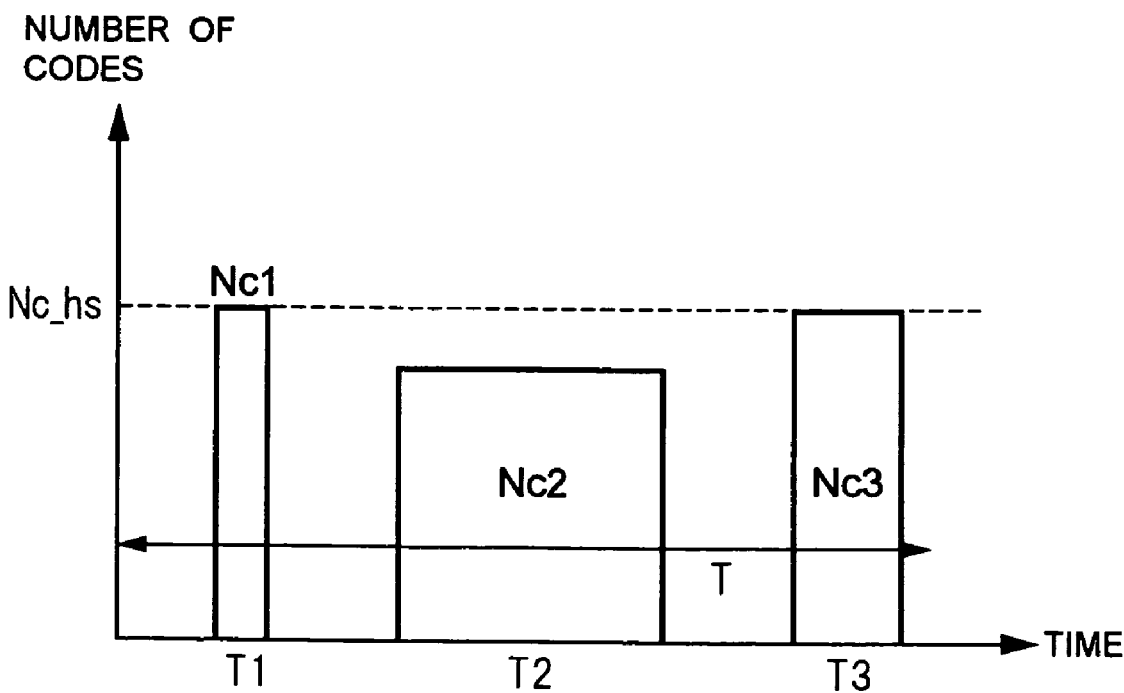
Figure 14A:
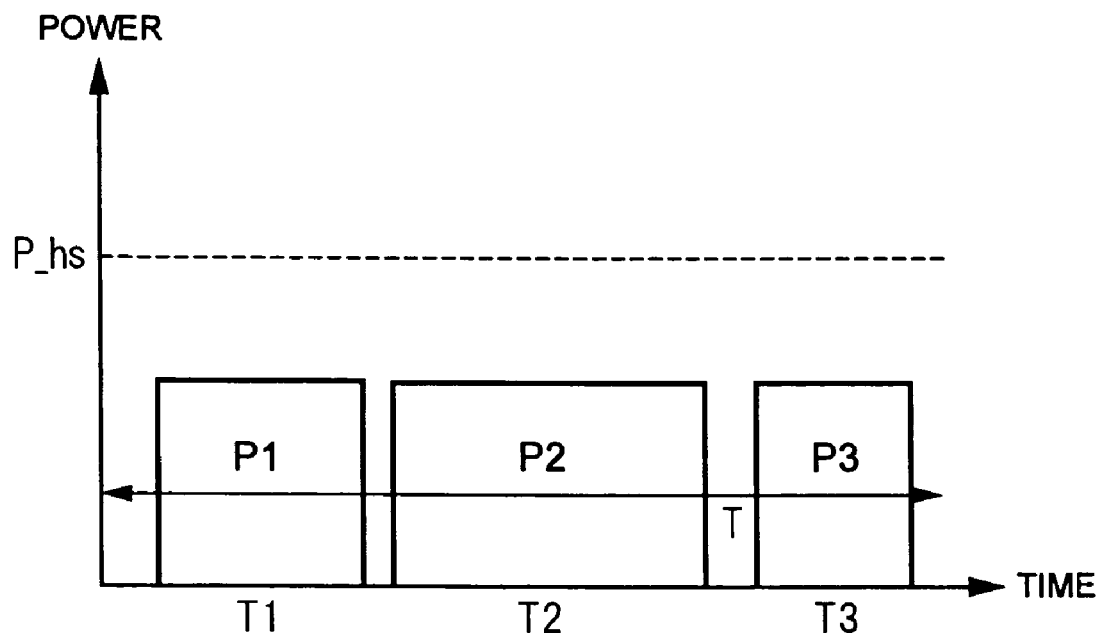
FIGS. 14A and 14B are diagrams for explaining the detection method of resource use information by the resource use information detection unit of FIG. 1.
Figure 14B:
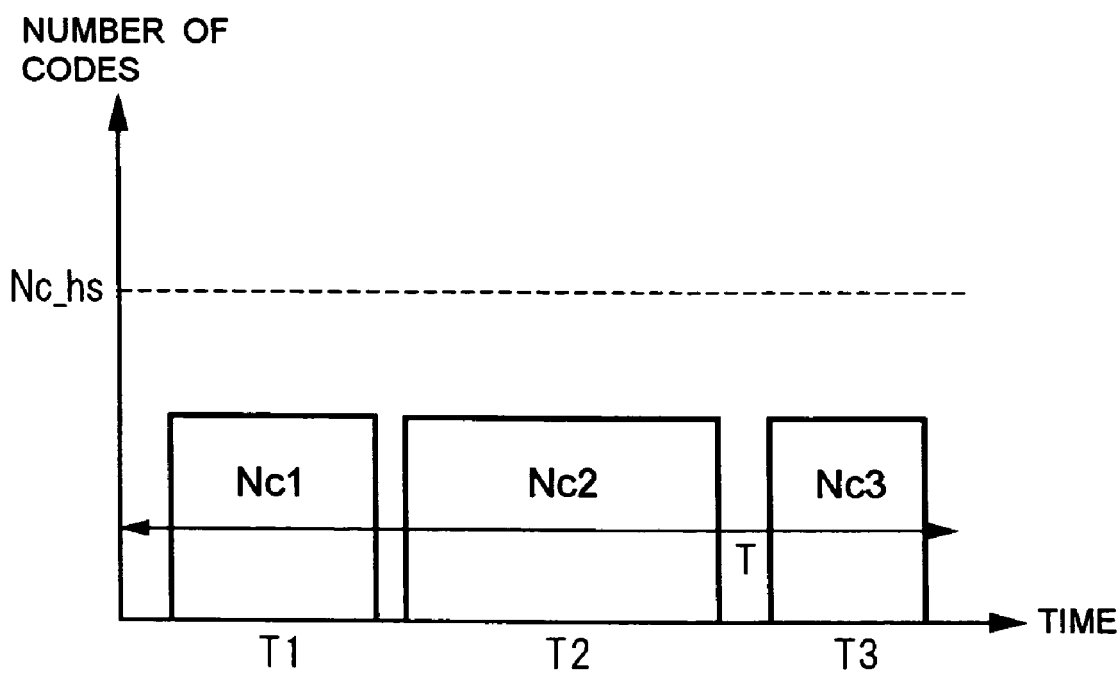

In a second transmission time measurement method, as shown in FIGS. 11A and 11B and FIGS. 12A and 12B, in the case in which the numbers of used codes are Nc1, Nc2, and Nc3, transmission times thereof are T1, T2, and T3, the number of allocated codes from the RNC functional unit 11 to the base station functional unit 12 is Nc_hs, amounts of used power are P1, P2, and P3, transmission times thereof are T1, T2, and T3, allocated power notified from the RNC functional unit 11 to the base station functional unit 12 is P_hs, a measurement time is T, a code threshold value is Th_ftc, and a power threshold value is Th_ftp, a time rate Ft (Full Time Utilization) at which the number of codes or the power used in the HS-PDSCH is equal to or higher than the threshold values Th_ftc and Th_ftp set for the number of codes and the power, respectively, is Ft=(T1+T2)/T in the case of examples shown in FIGS. 11A and 11B, and "Ft=0" in the case of examples shown in FIGS. 12A and 12B.

As described above, the resource use information detection unit 15 calculates a time rate at which the number of codes or the power used in the HS-PDSCH is equal to or higher than the threshold values Th_ftc and Th_ftp set for the number of codes and the power, respectively, or a time when the number of codes or the power used in the HS-PDSCH is equal to or higher than the threshold values, and informs the resource allocation judgment unit 14 of a result of the calculation. In the above-described examples, the time rate is indicated.

It is seen that the HS-PDSCH is used completely in this second transmission time measurement method. For example, at the time of Ft=100% (if time is calculated, "Ft=T"), the resource allocation judgment unit 14 can determine that the system is in a convergence state. However, in the case of examples shown in FIGS. 12A and 12B, the resource allocation judgment unit 14 cannot grasp a congestion state of the system at all.

In a third transmission time measurement method, as shown in FIGS. 13A and 13B and FIGS. 14A and 14B, in the case in which the numbers of used codes are Nc1, Nc2, and Nc3, transmission times thereof are T1, T2, and T3, the number of allocated codes from the RNC functional unit 11 to the base station functional unit 12 is Nc_hs, amounts of used power are P1, P2, and P3, transmission times thereof are T1, T2, and T3, allocated power notified from the RNC functional unit 11 to the base station functional unit 12 is P_hs, and a measurement time is T, a use time rate Ct (Composite Time Utilization) with respect to resources is calculated by an expression shown below.

$$Ct=\mathrm{Sum}[Ti*\mathrm{Max}(Pi/P\_hs,Nci/Nc\_hs)]/T$$

In this expression, Sum (X1 to X3) means that a sum of X1 to X3 (X1+X2+X3) is calculated, and Max (A, B) means that A and B are compared and a larger one is selected.

As described above, the resource use information detection unit 15 calculates a use time ratio of resources according to a method of calculating respective use ratios with respect to respective allocated resources and integrating resources with higher use ratios, and informs the resource allocation judgment unit 14 of a result of the calculation.

With this third code measurement method, it is found if the HS-PDSCH is completely used, and the resource allocation judgment unit 14 can grasp a state of congestion of the system.

First Embodiment

Figure 15:
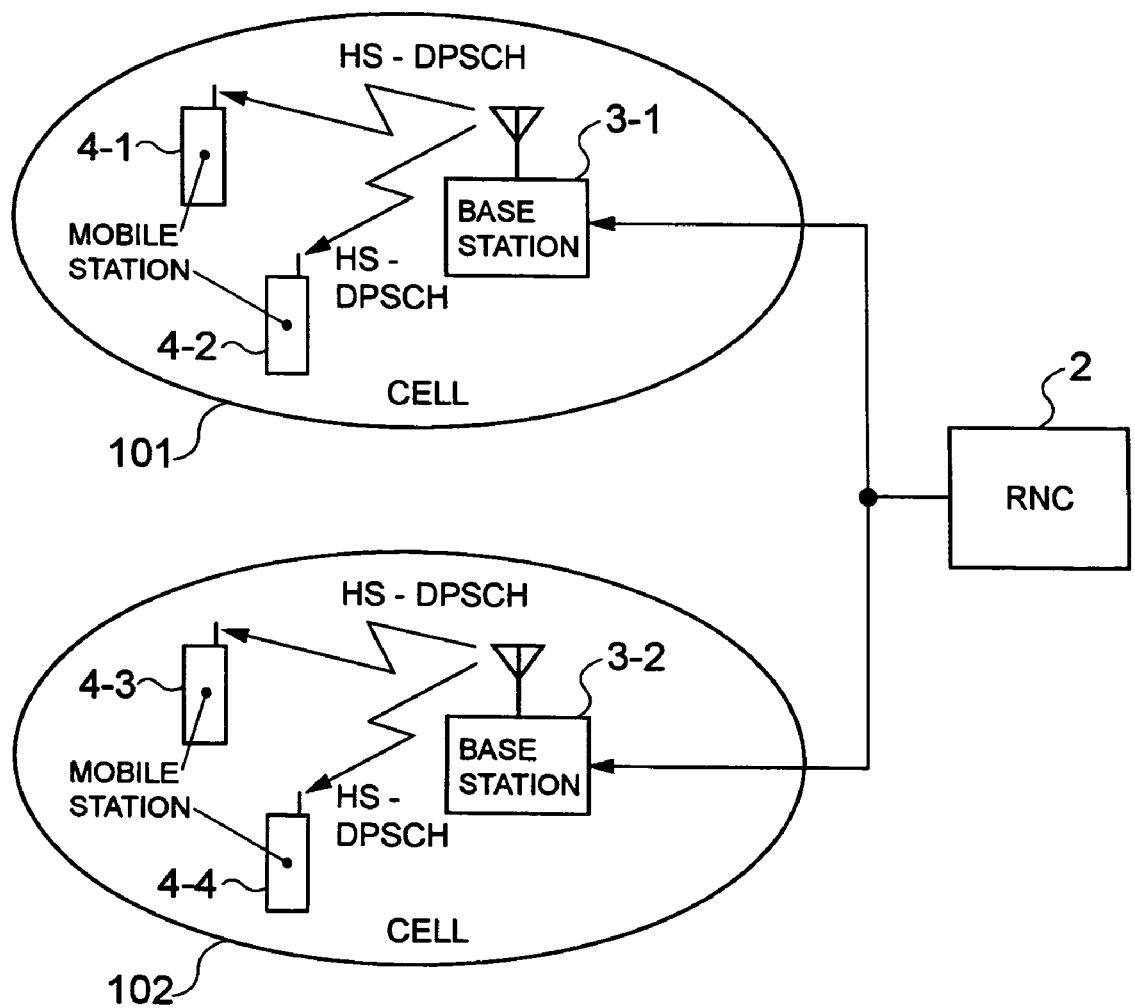
FIG. 15 is a block diagram showing a structure of a mobile communication system according to a first embodiment of the present invention.

FIG. 15 is a block diagram showing a structure of a mobile communication system according to a first embodiment of the present invention. In FIG. 15, a mobile communication system according to the first embodiment of the present invention includes an RNC 2, base stations 3-1 and 3-2, and mobile stations 4-1 to 4-4.

The mobile communication system according to the first embodiment of the present invention is a system such as the W-CDMA system, in which HSDPA (High Speed Downlink Packet Access), which is a high speed downlink transmission system, is used. In the case in which the HSDPA is provided, it is necessary to set an HS-PDSCH and DPCHs in a downstream.

Here, a DPCH is an individual channel for sending control data. In particular, the DPCH, which is set in controlling the HS-PDSCH, is called an Associated DPCH. It is possible to set DPCHs independently, and user data can be sent on the DPCHs. The HS-PDSCH is a channel for sending user data as a packet and is shared by a plurality of users in a time multiplex manner.

The RNC 2 allocates codes to an HS-PDSCH and DPCHs of the base stations 3-1 and 3-2 (e.g., see 3GPP TS25.433 V5.1.0 (2002-06), Chapter 8.2.18"). A code indicates a channelization code which is used for identification of each physical channel in a downlink.

Note that the RNC 2 is connected to the base stations 3-1 and 3-2 through a communication network, and cells 101 and 102 are arranged in the base stations 3-1 and 3-2, respectively, as service areas. In the services areas (the cells 101 and 102) of the respective base stations 3-1 and 3-2, a plurality of mobile stations 4-1 to 4-4 exist. In the figure, for simplification, only the mobile stations 4-1 and 4-2 in the cell 101 of the base station 3-1 and the mobile stations 4-3 and 4-4 in the cell 102 of the base station 3-2 are illustrated.

The respective mobile stations 4-1 to 4-4 set and share a HS-PDSCH for data transmission. In addition, although not illustrated, it is assumed that this mobile communication system includes a large number of other base stations, and a large number of mobile stations exist in the respective cells.

The base stations 3-1 and 3-2 control transmission power of the HS-PDSCH and DPCHs on the basis of transmission power value of the HS-PDSCH notified from the RNC 2. The base stations 3-1 and 3-2 also set the HS-PDSCH among the mobile stations 4-1 to 4-4 using the codes allocated by the RNC 2 (hereinafter referred to as allocated codes) and the transmission power (hereinafter referred to as allocated power). The DPCHs are used for the setting of this HS-PDSCH.

However, although the base stations 3-1 and 3-2 cannot use the allocated code of the HS-PDSCH for the DPCHs, power allocated to the HS-PDSCH can also be used for the DPCHs in the above-described transmission power control. In the case in which the DPCHs use the power allocated to the HS-PDSCH, transmission power of the HS-PDSCH is decreased such that a sum of the transmission power of the HS-PDSCH and transmission power of the DPCHs does not exceed a maximum transmission power of the base stations 3-1 and 3-2.

The transmission power of the respective DPCHs is subjected to a closed loop transmission power control such that a quality of reception of the DPCHs in the mobile stations 4-1 to 4-4 are uniform. The mobile stations 4-1 to 4-4 measure a channel quality using a down channel [CPICH (Common Pilot Channel), etc.] and informs the base stations 3-1 and 3-2 of channel quality information (CQI).

The base stations 3-1 and 3-2 perform control of an AMCS (Adaptive Modulation and Coding Scheme), the number of codes, and the like on the basis of the channel quality information from the mobile stations 4-1 to 4-4. In addition, the base stations 3-1 and 3-2 perform scheduling in sending data on the HS-PDSCH.

The number of allocated codes of the HS-PDSCH indicates a maximum number of codes which the base stations 3-1 and 3-2 can use for the HS-PDSCH. The allocated power of the HS-PDSCH indicates maximum power which the base stations 3-1 and 3-2 can use for the HS-PDSCH in the above-described transmission power control.

By controlling the number of codes and the power allocated to the HS-PDSCH, a TBS (Transport Block Size) is limited, that is, OTA (Over the Air) throughput is limited. The TBS indicates an available transfer data amount which is found from the number of codes, the transmission power, and the channel quality information. The OTA throughput indicates the number of bits which can be sent in a unit time (transmission speed).

If the channel quality information, the number of codes, a modulation system, and a coding rate are determined, the base stations 3-1 and 3-2 can estimate transmission power which is required for satisfying a predetermined PER (Packet Error Rate).

Figure 16:
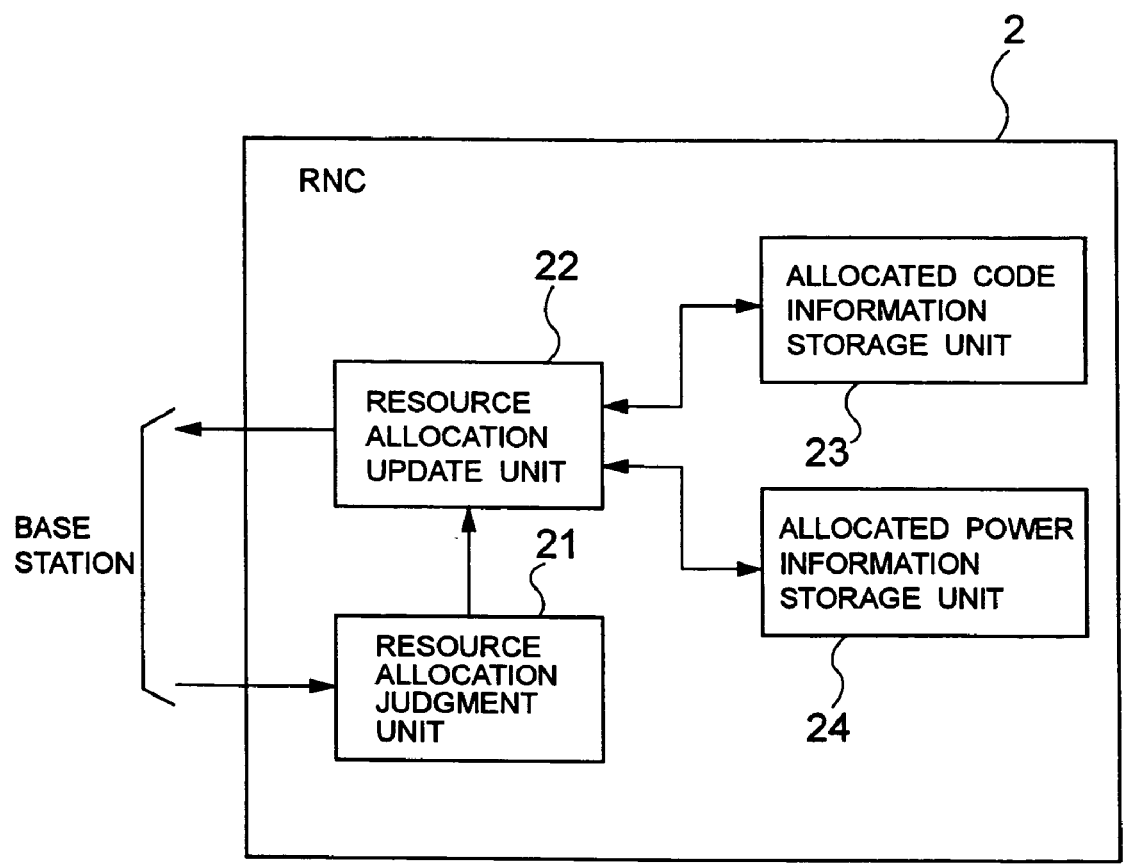
FIG. 16 is a block diagram showing a structure of an RNC of FIG. 14.

FIG. 16 is a block diagram showing a structure of the RNC 2 of FIG. 15. In FIG. 16, the RNC 2 includes a resource allocation judgment unit 21, a resource allocation update unit 22, an allocated code information storage unit 23, and allocated power information storage unit 24.

The resource allocation judgment unit 21 judges whether or not update of allocation of resources is performed on the basis of information on a state of use of resources from the base stations 3-1 and 3-2, and notifies the resource allocation update unit 22 of a result of the judgment. The resource allocation update unit 22 updates allocated resources on the basis of the received result of the judgment and information on allocated resources stored in the allocated code information storage unit 23 and the allocated power information storage unit 24, and notifies the base stations 3-1 and 3-2 of the allocated codes and the allocated power, respectively.

At the same time, the resource allocation update unit 22 stores the updated allocated codes and the updated allocated power in the allocated code information storage unit 23 and the allocated power information storage unit 24, respectively.

Figure 17:
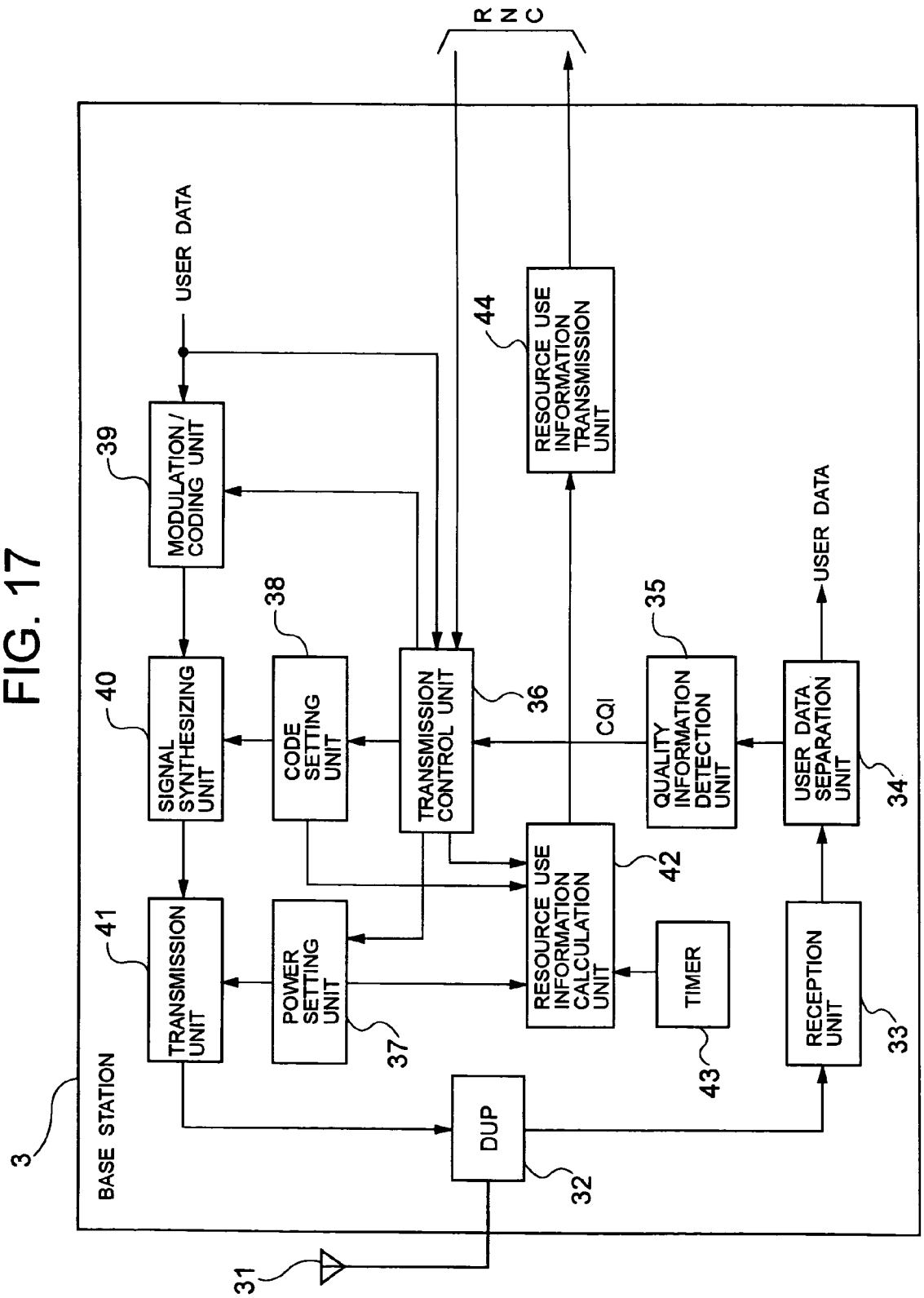
FIG. 17 is a block diagram showing a structure of a base station of FIG. 14.

FIG. 17 is a block diagram showing a structure of the base station 3 of FIG. 15. In FIG. 17, the base station 3 includes an antenna 31, a duplexer (DUP) 32, a reception unit 33, a user data separation unit 34, a quality information detection unit 35, a transmission control unit 36, a power setting unit 37, a code setting unit 38, a modulation/coding unit 39, a signal synthesizing unit 40, a transmission unit 41, a resource use information calculation unit 42, a timer 43, and a resource use information transmission unit 44.

Note that, since publicly known techniques are applicable to a call control portion, a voice input/output portion, and a display portion of the base station 3, descriptions of structures and operations thereof will be omitted. In addition, the base station 3 is a collective representation of the base stations 3-1 and 3-2 of FIG. 15. Although not illustrated, structures and operations of the base stations 3-1 and 3-2 are the same as those of the base station 3.

The reception unit 33 sends a signal [DPCH (UL: Up Link), etc.], which is received via the antenna 31 and the duplexer 32, to the user data separation unit 34. The user data separation unit 34 separates the received signal from the reception unit 33 into user information (a voice signal, an image signal, etc.) and control information [CQI (Channel Quality Indication: Downlink quality information), etc.], sends the user information to the call control portion, the voice input/output portion, the display portion of the base station 3, and sends the control information to the quality information detection unit 35.

The quality information detection unit 35 detects the CQI information out of the control information from the user data separation unit 34 and notifies the transmission control unit 36 of a result of the detection. When the resource allocation information from the RNC 2 is detected, the transmission control unit 36 controls transmission of user data to the mobile stations 4-1 to 4-4 on the basis of a result of the detection, the CQI information from the quality information detection unit 35, and the user data. In that case, the transmission control unit 36 controls the power setting unit 37 and the code setting unit 38 on the basis of the resource allocation information from the RNC 2, and instructs the resource use information calculation unit 42 to calculate resource use information.

The signal synthesizing unit 40 synthesizes the user data, which is modulated and coded by the modulation/coding unit 39, in accordance with a code set by the code setting unit 38, and sends the user data from the antenna 31 via the transmission unit 41 and the duplexer 32. In that case, the transmission unit 41 performs transmission to the mobile stations 4-1 to 4-4 on the basis of power set by the power setting unit 37.

The resource use information calculation unit 42 performs measurement concerning codes, power, congestion of channels on the basis of information from the transmission control unit 36, the power setting unit 37, and the code setting unit 38, and sends a result of the measurement to the RNC 2 via the resource use information transmission unit 44 as resource use information.

Figure 18:
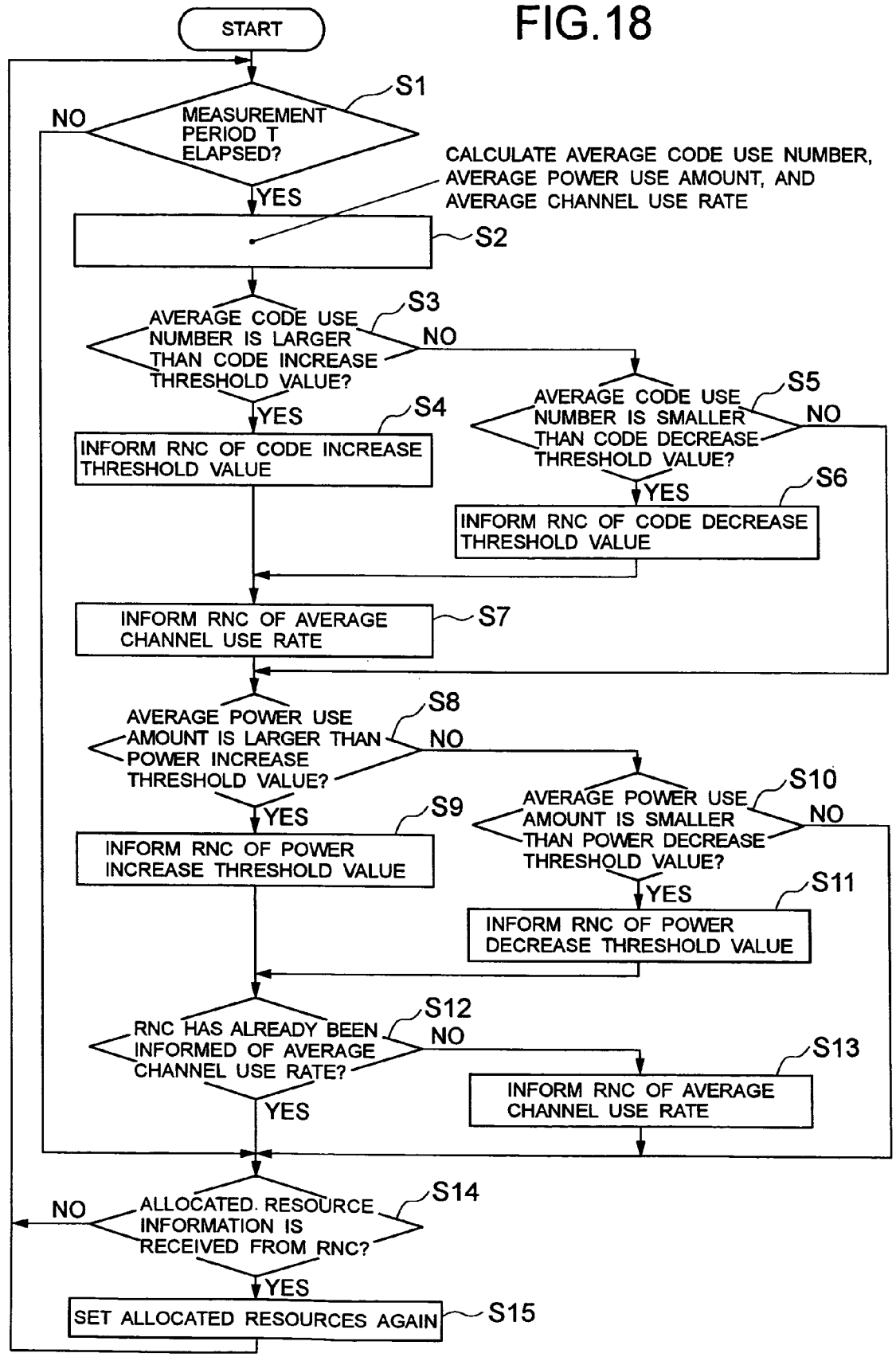
FIG. 18 is a flowchart showing an operation of the base station of FIG. 14.
Figure 19:
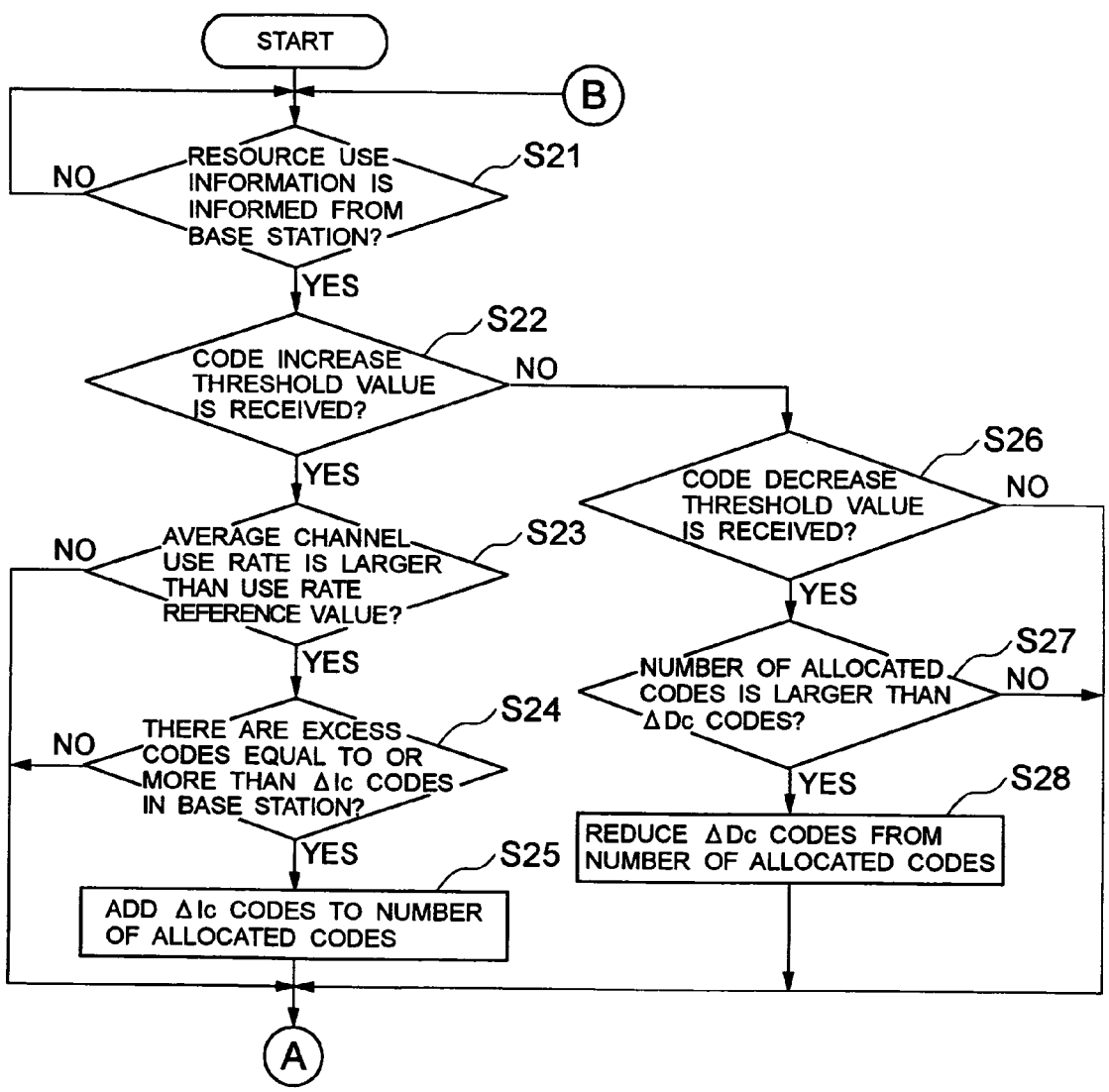
FIG. 19 is a flowchart showing an operation of the RNC of FIG. 14.
Figure 20:
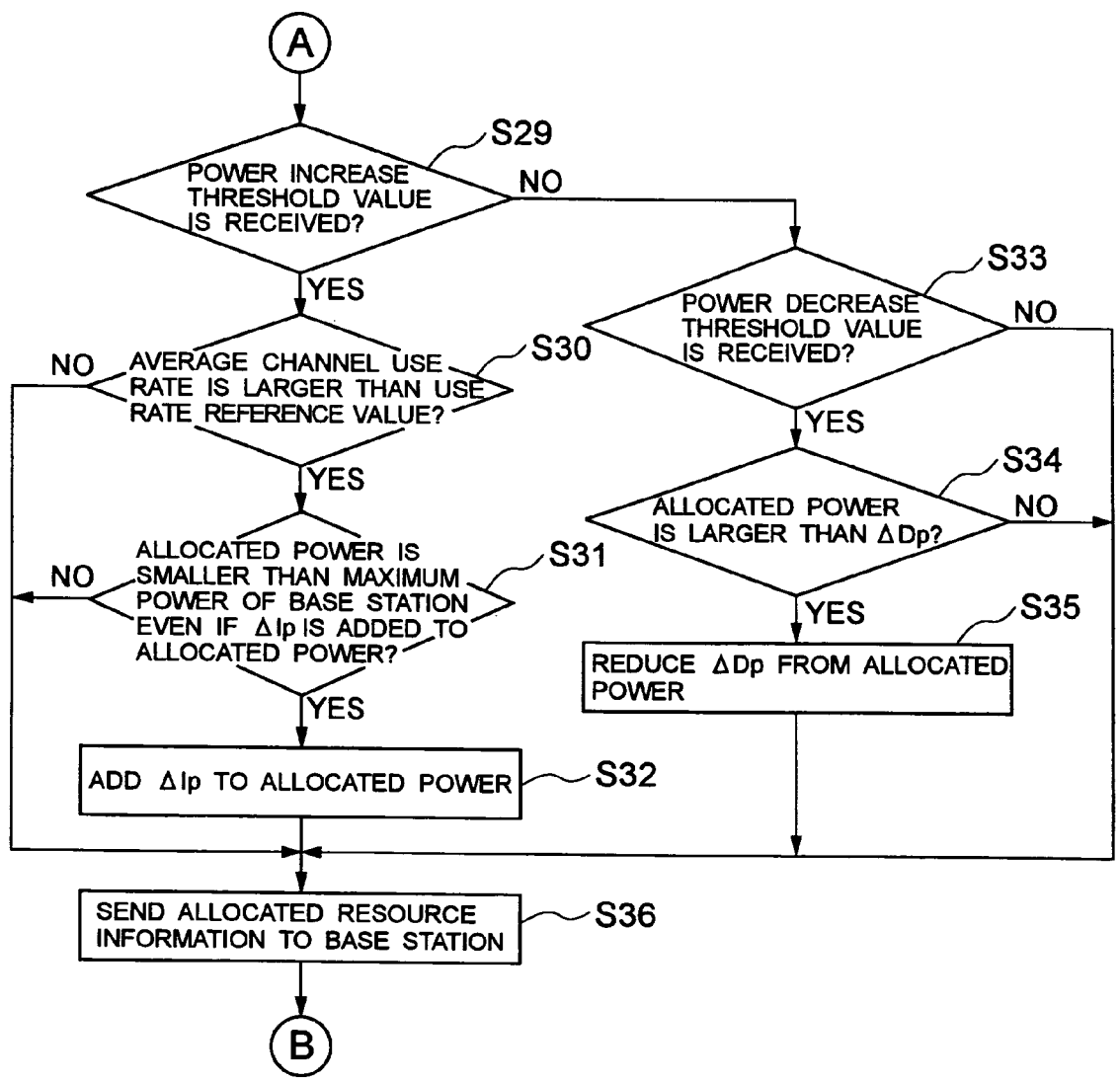
FIG. 20 is a flowchart showing an operation of the RNC of FIG. 14.

FIG. 18 is a flowchart showing an operation of the base stations 3-1 and 3-2 of FIG. 15. FIGS. 19 and 20 are flowcharts showing an operation of the RNC 2 of FIG. 15. An operation of the mobile communication system according to the first embodiment of the present invention will be described with reference to FIGS. 15 to 20. Note that, it is assumed that, in the mobile communication system according to the first embodiment of the present invention, allocation control of resources is performed under the control of the RNC 2 using the first code measurement method, the first power measurement method, and the first transmission time measurement method. Note that, in the following description, the base stations 3-1 and 3-2 are described as the base station 3. In addition, it is assumed that an average number of use to be measured by the first code measurement method, an average amount of use to be measured by the first power measurement method, and a time rate to be measured by the first transmission time measurement method are defined as an "average code use number", an "average power use amount", and an "average channel use rate", respectively.

When elapse of a measurement period T is detected according to timing information from the timer 44 (step S1 in FIG. 18), the base station 3 calculates an average code use number, an average power use amount, and an average channel use rate (step S2 in FIG. 18), and judges whether or not the average code use number is larger than a code increase threshold value (step S3 in FIG. 18).

When it is judged that the average code use number is larger than the code increase threshold value, the base station 3 informs the RNC 2 of the code increase threshold value (step S4 in FIG. 18). In addition, when it is not judged that the average code use number is larger than the code increase threshold value but is judged that the average code use number is smaller than a code decrease threshold value (step S5 in FIG. 18), the base station 3 informs the RNC 2 of the code decrease threshold value (step S6 in FIG. 18).

Thereafter, the base station 3 informs the RNC 2 of the average channel use rate (step S7 in FIG. 18) and, when it is judged that the average power use amount is larger than the power increase threshold value (step S8 in FIG. 18), informs the RNC 2 of the power increase threshold value (step S9 in FIG. 18). On the other hand, when it is not judged that the average power use amount is larger than the power increase threshold value but it is judged that the average power use amount is smaller than the power decrease threshold value (step S10 in FIG. 18), the base station 3 informs the RNC 2 of the power decrease threshold value (step S11 in FIG. 18).

If the RNC 2 has not been informed of the average channel use rate yet (step S12 in FIG. 18), the base station 3 informs the RNC 2 of the average channel use rate (step S13 in FIG. 18). If the RNC 2 has already been informed of the average channel use rate, when allocated resource information is received from the RNC 2 (step S14 in FIG. 18), the base station 3 sets allocated resources again (step S15 in FIG. 18).

On the other hand, when the resource use information is informed from the base station 3 (step S21 in FIG. 19), if the code increase threshold value has been received (step S22 in FIG. 19), the RNC 2 judges whether or not the average channel use rate is larger than the use rate reference value (step S23 in FIG. 19). When it is judged that the average channel use rate is larger than the use rate reference value, if there are excess codes equal to or more than $\Delta$Ic codes in the base station 3 (step S24 in FIG. 19), the RNC 2 adds the $\Delta$Ic codes to the number of allocated codes (step S25 in FIG. 19).

If the code increase threshold value has not been received but the code decrease threshold value has been received (step S26 in FIG. 19), the RNC 2 judges whether or not the number of allocated codes is larger than $\Delta$Dc codes (step S27 in FIG. 19). When it is judged that the number of allocated codes is larger than the $\Delta$Dc codes, the RNC 2 reduces the $\Delta$Dc codes from the number of allocated codes (step S28 in FIG. 19).

Subsequently, the power increase threshold value is received (step S29 in FIG. 20), if the average channel use rate is larger than the use rate reference value (step S30 in FIG. 20) and allocated power is smaller than a maximum power of the base station even if $\Delta$Ip is added (step S31 in FIG. 20), the RNC 2 adds $\Delta$Ip to the allocated power (step S32 in FIG. 20).

The RNC 2 receives the power decrease threshold value (step S33 in FIG. 20) and, if the allocated power is larger than $\Delta$Dp (step S34 in FIG. 20), reduces $\Delta$Dp from the allocated power (step S35 in FIG. 20). Thereafter, the RNC 2 sends allocated resource information to the base station 3 (step S36 in FIG. 20).

The code increase threshold value is a threshold value for adding the number of allocated codes and is set to a value equal to or lower than the number of allocated codes. For example, when it is assumed that the number of allocated codes is eight and the code increase threshold value is six, allocated codes are added in the case in which the average code use rate does not exceed six codes.

In addition, the code decrease threshold value is a threshold value for reducing the number of allocated codes and is set to a value equal to or lower than the number of allocated codes. For example, when it is assumed that the number of allocated codes is eight and the code decrease threshold value is four, the allocated codes are decreased in the case in which the average code use rate is less than four codes.

Moreover, the power increase threshold value is a threshold value for adding allocated power and is set to a value equal to or lower than the allocated power. A unit of the power increase threshold value may be [W] or [dBm]. For example, when it is assumed that the allocated power is 40 [dBm] (=10 [W]) and the power increase threshold value is 39 [dBm] (=7.9 [W]), the allocated codes are added in the case in which the average power use amount exceeds 39 [dBm].

Furthermore, the power decrease threshold value is a threshold value for reducing allocated power and is set to a value equal to or lower than the allocated power. A unit of the power decrease threshold value may be [W] or [dBm]. For example, when it is assumed that the amount of allocated power is 10 [W] and the power decrease threshold value is 5 [W], the allocated power is decreased in the case in which the average power use amount is less than 5 [W].

A function for updating the code increase threshold value, the code decrease threshold value, the power increase threshold value, and the power decrease threshold value may be provided in the base station 3 or the RNC 2. In the case in which the number of allocated codes and the allocated power are updated, the RNC 2 updates the threshold values and notifies the base station 3 of the update. In this case, the "number of allocated codes" to be updated and the "allocated power" to be updated are added to allocated resource information to be received from the RNC 2, and the code increase threshold value, the code decrease threshold value, the power increase threshold value, and the power decrease threshold value are also included in the allocated resource information.

In addition, in the case in which the number of allocated codes and the allocated power are set again, the base station 3 updates the threshold values according to notification from the RNC 2. As a method of updating the code increase threshold value, the code decrease threshold value, the power increase threshold value, and the power decrease threshold value, there are examples described below.

As an example of updating the code increase threshold value, there are the following examples:
 1) Number of allocated codes−2, and
 2) INT (number of allocated codes×90%).
In the case in which the number of allocated codes is nine,
 1) Code increase threshold value=9−2=7, and
 2) Code increase threshold value=INT (9×90%)=INT (8.1)=8. In addition, as an example of the code decrease threshold value, there are the following examples:
 1) Max (number of allocated codes−4, 2), and
 2) Max {INT (number of allocated codes×50%), 2}.
In the case in which the number of allocated codes is nine,
 1) Code decrease threshold value=Max (5, 2)=5
 2) Code decrease threshold value=Max {INT (9×50%), 2}=INT (4, 5)

In the above examples, INT (X) means the real number X is transformed into an integer. In the case in which X is a positive value, it is assumed that decimals are omitted.

In the RNC 2, in the case in which allocated power is added, it is confirmed whether or not the average channel use rate is also larger than the channel use rate threshold value. For example, in the case in which the channel use rate is 90% and the channel use rate threshold value is 80[%], since the relation "channel use rate>channel use rate threshold value" is satisfied, it becomes possible to increase the number of allocated codes and allocated power.

This is because, in the case in which the channel use rate is small (e.g., 10%), since the HS-PDSCH channel is hardly used, it is highly likely that efficiency of use of resources is extremely deteriorated if the number of allocated codes and allocated power are added.

In this embodiment, it is assumed that an increase step and a decrease step of the number of allocated codes are ΔIc and ΔDc, respectively. For example, ΔIc is one code and ΔDc is two codes (Ic: Increase Code, Dc: Decrease Code).

Similarly, in this embodiment, it is assumed that an increase step and a decrease step of allocated power are ΔIp and ΔDp, respectively (Ic: Increase Power, Dc: Decrease Power).

In the RNC 2, in the case in which allocated codes are added, it is necessary to confirm if codes to be allocated to the HS-PDSCH are left in the base station 3. In addition, in the RNC 2, in the case in which allocated power is added, it is necessary to confirm that the allocated power of the HS-PDSCH does not exceed maximum transmission power of the base station 3 even if ΔIp is added to the allocated power.

In this way, in this embodiment, a state of use of codes is confirmed to increase allocated codes appropriately. Thus, an average TBS of a transmission packet can be increased without deteriorating efficiency of use of the allocated codes. Therefore, in this embodiment, throughput of the HS-PDSCH can be improved.

In addition, in this embodiment, a state of use of codes is confirmed to decrease allocated codes appropriately. Thus, efficiency of use of the allocated codes can be improved without deteriorating throughput of the base station 3. Moreover, since the number of codes which can be allocated to channels other than the HS-PDSCH increases, users of the Associated DPCH can be increased, and throughput of the HS-PDSCH can be improved. At the same time, since codes can be allocated to the channels other than the Associated DPCH, throughput of the entire base station 3 can be improved.

On the other hand, in this embodiment, a state of use of power is confirmed to increase allocated power appropriately. Thus, an average TBS of a transmission packet can be increased without deteriorating efficiency of use of the allocated power. Therefore, in this embodiment, throughput of the HS-PDSCH can be improved.

In addition, in this embodiment, a state of use of power is confirmed to decrease allocated power appropriately. Thus, efficiency of use with respect to the allocated power can be improved without deteriorating the throughput of the base station 3. Moreover, since power which can be allocated to channels other than the HS-PDSCH increases, users of the Associated DPCH can be increased, and throughput of the HS-PDSCH can be improved. At the same time, since power can be allocated to the channels other than the Associated DPCH, throughput of the entire base station 3 can be improved.

In this embodiment, a state of congestion of the system is measured and, in the case in which it is judged that a system capacity is limited due to a code or power, allocated codes or allocated power is added on the basis of a result of measurement concerning a state of use of codes and power. Thus, occurrence of convergence can be prevented.

Second Embodiment

Figure 21:
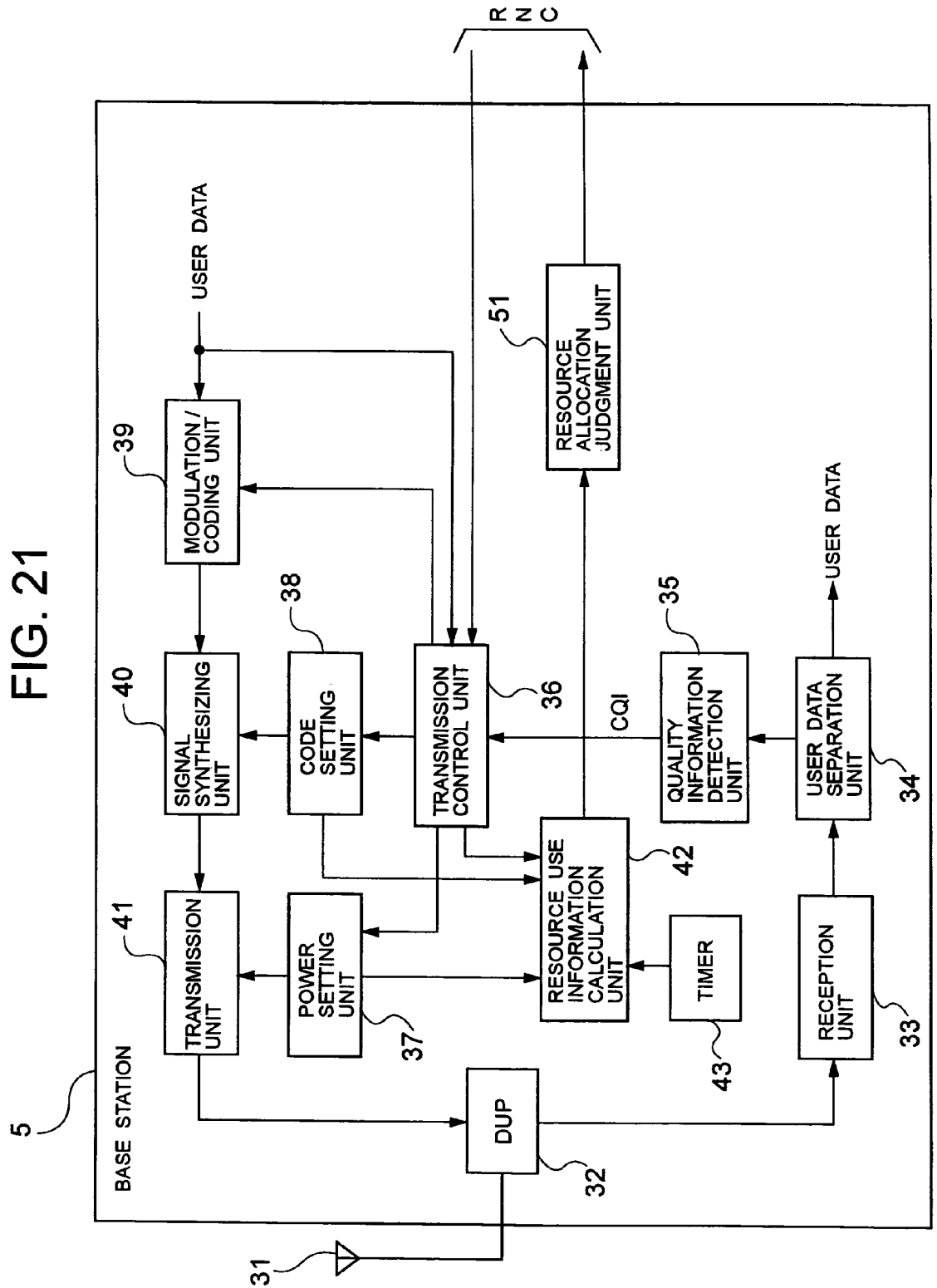
FIG. 21 is a block diagram showing a structure of a base station according to a second embodiment of the present invention.

FIG. 21 is a block diagram showing a structure of a base station according to a second embodiment of the present invention. In FIG. 21, a base station 5 has the same structure as the base station 3 according to the first embodiment of the present invention shown in FIG. 17 except that a resource allocation judgment unit 51 is provided instead of the resource use information transmission unit 44. Thus, the identical components are denoted by the identical reference numerals. In addition, operations of the identical components are the same as those of the base station 3 according to the first embodiment of the present invention.

Whereas the resource allocation judgment unit is provided in the RNC 2 in the first embodiment of the present invention, it is provided in the base station 5 in the second embodiment of the present invention. An operation of the resource allocation judgment unit in the second embodiment is the same as the operation at the time when it is provided in the RNC 2. Note that the resource allocation judgment unit 51 performs judgment of resource allocation and sends a result of the judgment to the RNC 2.

Figure 22:
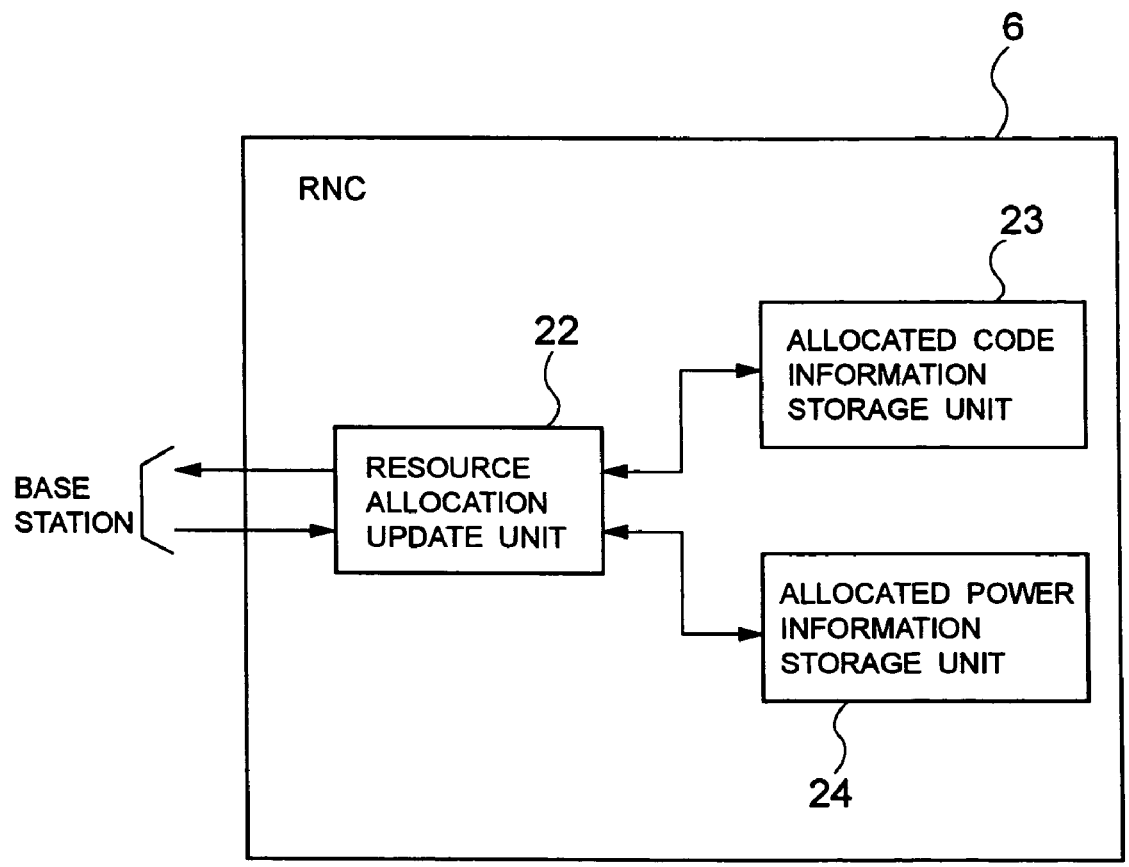
FIG. 22 is a block diagram showing a structure of an RNC according to the second embodiment of the present invention.

FIG. 22 is a block diagram showing a structure of an RNC according to the second embodiment of the present invention. In FIG. 22, an RNC 6 has the same structure as the RNC 2 according to the first embodiment of the present invention shown in FIG. 16 except that the resource allocation judgment unit is removed. Thus, the identical components are denoted by the identical reference numerals. In addition, operations of the identical components are the same as those of the RNC 2 according to the first embodiment of the present invention.

Figure 23:
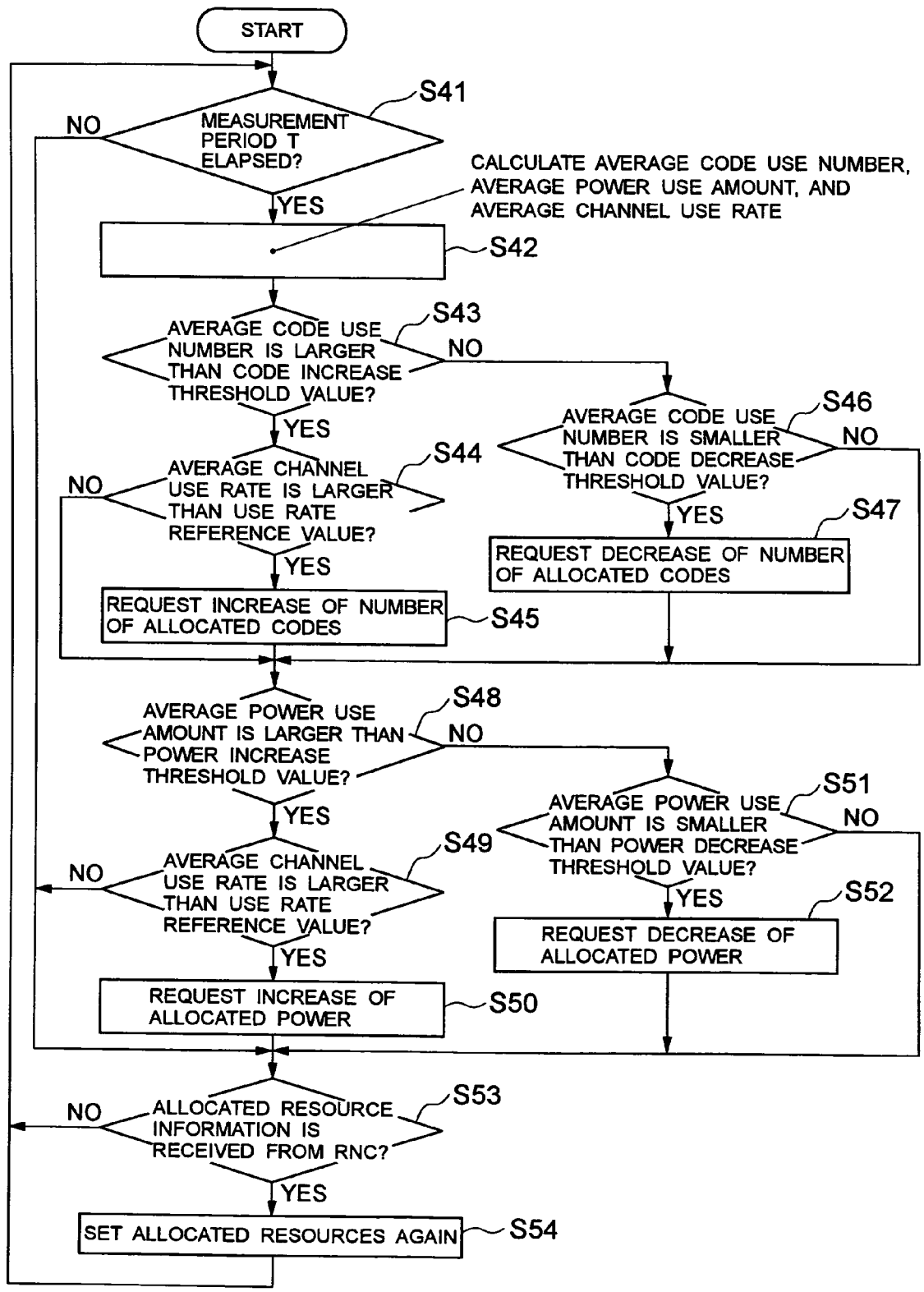
FIG. 23 is a flowchart showing an operation of the base station according to the second embodiment of the present invention.
Figure 24:
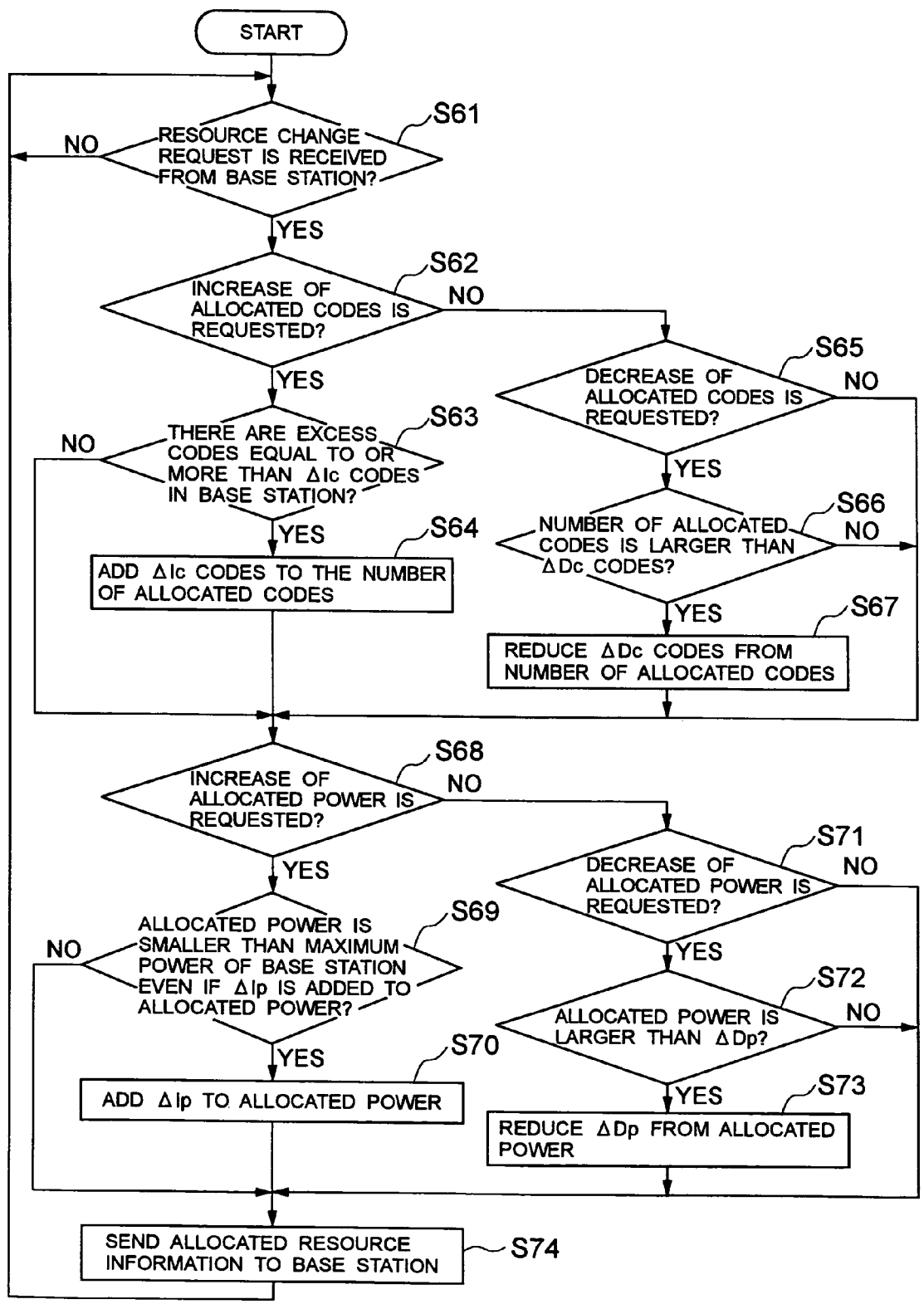
FIG. 24 is a flowchart showing an operation of the RNC according to the second embodiment of the present invention.

FIG. 23 is a flowchart showing an operation of the base station 5 according to the second embodiment of the present invention. FIG. 24 is a flowchart showing an operation of the RNC 6 according to the second embodiment of the present invention. Operations of the mobile communication system according to the second embodiment of the present invention will be described with reference to FIGS. 21 to 24. Note that it is assumed that, in the mobile communication system according to the second embodiment of the present invention, allocation control of resources is performed under the control of the base station 5 using the first code measurement method, the first power measurement method, and the first transmission time measurement method. In addition, it is assumed that an average number of use to be measured by the first code measurement method, an average amount of use to be measured by the first power measurement method, and a time rate to be measured by the first transmission time measurement method are defined as an "average code use number", an "average power use amount", and an "average channel use rate", respectively.

In the first embodiment of the present invention, the base station 3 measures states of use of codes and power of the HS-PDSCH and informs the RNC 2 of the states of use, and the RNC updates allocated codes and power with reference to the information. However, in the second embodiment of the present invention, the base station 5 measures a state of use of resources to calculate codes and power, and performs judgment on whether or not resource allocation is performed on the basis of a value of the calculation, and the RNC 6 updates allocated codes and power according to a result of the judgment from the base station 5.

When elapse of a measurement period T is detected according to timing information from the timer 43 (step S41 in FIG. 23), the base station 5 calculates the average code use number, the average power use amount, and the average channel use rate (step S42 in FIG. 23) and judges whether or not the average code use number is larger than a code increase threshold value (step S43 in FIG. 23).

When it is judged that the average code use number is larger than the code increase threshold value, if the average channel use rate is larger than a use rate reference value (step S44 in FIG. 23), the base station 5 requests the RNC 6 to increase the number of allocated codes (step S45 in FIG. 23).

When it is judged that the average code use number is not larger than the code increase threshold value, if the average code use number is smaller than the code decrease threshold value (step S46 in FIG. 23), the base station 5 requests the RNC 6 to decrease the number of allocated codes (step S47 in FIG. 23).

Thereafter, if the average power use amount is larger than the power increase threshold value (step S48 in FIG. 23) and the average channel use rate is larger than the use rate reference value (step S49 in FIG. 23), the base station 5 requests the RNC 6 to increase the allocated power (step S50 in FIG. 23).

If the average power use amount is not larger than the power increase threshold value (step S48 in FIG. 23) and the average power use amount is smaller than the power decrease threshold value (step S51 in FIG. 23), the base station 5 requests the RNC 6 to decrease the allocated power (step S52 in FIG. 23). Thereafter, when allocated resource information is received from the RNC 6 (step S53 in FIG. 23), the base station 5 sets the allocated resources again (step S54 in FIG. 23).

When a resource change request is received from the base station 5 (step S61 in FIG. 24), the RNC 6 is requested to increase the allocated codes (step S62 in FIG. 24) and, if there are excess codes equal to or more than ΔIc codes in the base station 5 (step S63 in FIG. 24), adds the ΔIc codes to the number of allocated codes (step S64 in FIG. 24).

The RNC 6 is requested to decrease the allocated codes (step S65 in FIG. 24) and, if the number of allocated codes is larger than ΔDc codes (step S66 in FIG. 24), reduces the ΔDc codes from the number of allocated codes (step S67 in FIG. 24).

In addition, the RNC 6 is requested to increase the allocated power (step S68 in FIG. 24) and, if the allocated power is smaller than a maximum power of the base station 5 even if ΔIp is added to the allocated power (step S69 in FIG. 24), adds ΔIp to the allocated power (step S70 in FIG. 24).

The RNC 6 is requested to decrease the allocated power (step S71 in FIG. 24) and, if the allocated power is larger than ΔDp (step S72 in FIG. 24), reduces ΔDp from the allocated power (step S73 in FIG. 24). Thereafter, the RNC 6 sends the allocated resource information obtained in the above-described processing to the base station 5 (step S74 in FIG. 24).

Consequently, in this embodiment, the same effect as the first embodiment of the present invention can be obtained.

Third Embodiment

Figure 25:
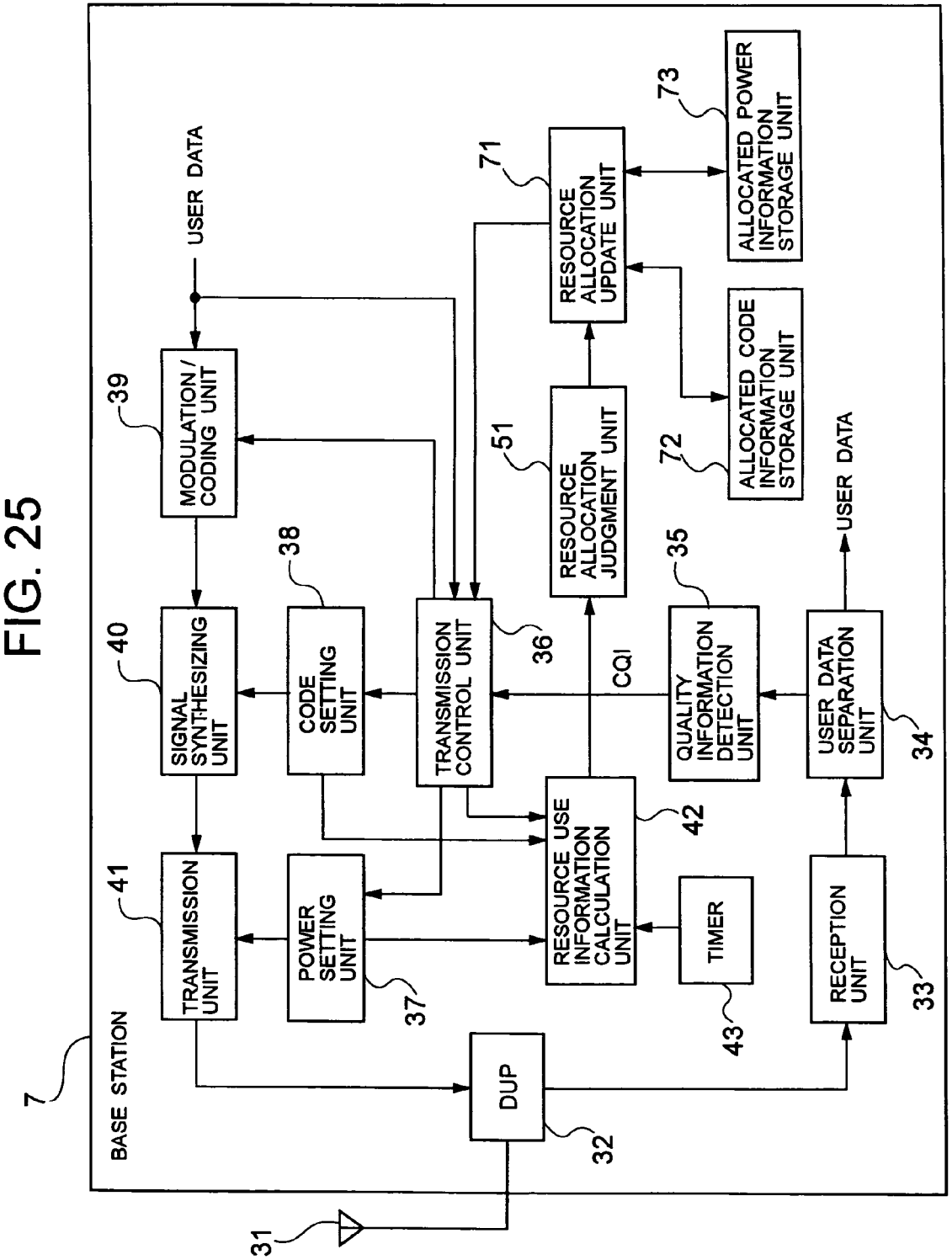
FIG. 25 is a block diagram showing a structure of a base station according to a third embodiment of the present invention.

FIG. 25 is a block diagram showing a structure of a base station according to a third embodiment of the present invention. In FIG. 25, a base station 7 has the same structure as the base station 5 according to the second embodiment of the present invention shown in FIG. 21 except that a resource allocation update unit 71, an allocated code information storage unit 72, and allocated power information storage unit 73 are provided. Thus, the identical components are denoted by the identical reference numerals. In addition, operations of the identical components are the same as those in the base station 5 according to the second embodiment of the present invention.

In the first embodiment of the present invention, the resource allocation update unit, the allocated code information storage unit, and the allocated power information storage unit are provided in the RNC 2. However, in the third embodiment of the present invention, these units are provided in the base station 7, and operations thereof are the same as those at the time when the units are provided in the RNC 2.

Figure 26:
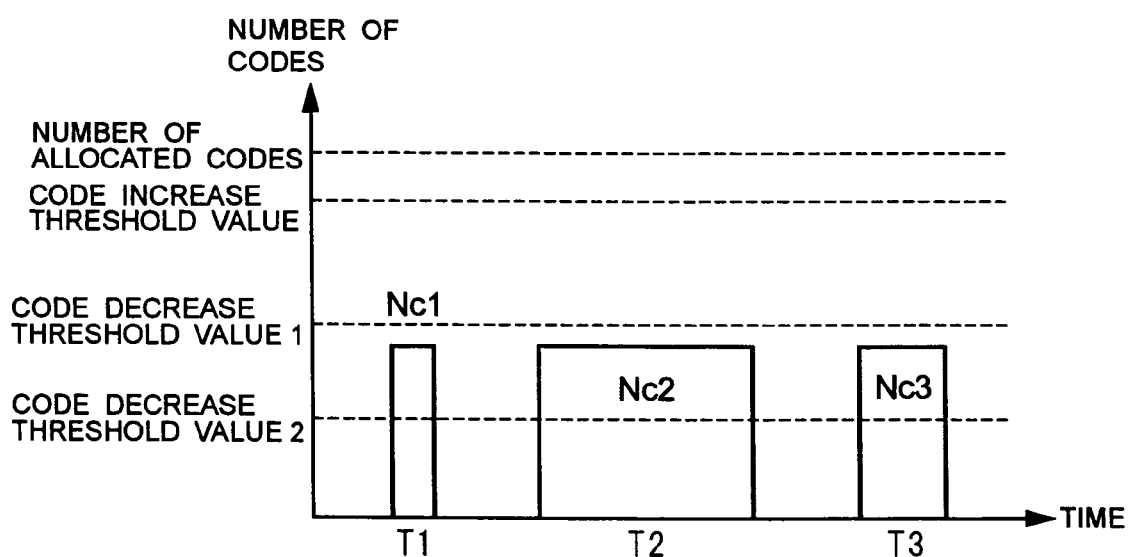
FIG. 26 is a diagram for explaining resource allocation control according to the third embodiment of the present invention.

FIG. 26 is a diagram for explaining resource allocation control according to the third embodiment of the present invention. FIG. 26 shows images of a code increase threshold value, a code decrease threshold value 1, and a code decrease threshold value 2 which are set in advance such that the base station according to the third embodiment of the present invention performs the resource allocation control. In this case, a threshold value of power for the base station according to the third embodiment of the present invention performing the resource allocation control is also the same as that in the above-described case of codes.

When a use rate to be measured by the second code measurement method is defined as a "threshold value code use rate", threshold value code use rates of the respective threshold values shown in FIG. 26 are 0% for the code increase threshold value, 0% for the code decrease threshold value 1, and 100% for the code decrease threshold value 2.

Therefore, when it is assumed that the code increase reference value is 85% and the code decrease reference value is 50%, in the case of this embodiment, since the relation "threshold value code use rate<code decrease reference value" concerning the code decrease threshold value 1 is satisfied, the number of allocated codes is updated (decreased) to the code decrease threshold value 1.

In this embodiment, allocated power is also the same as that in the above-described algorithm of allocated codes. The base station updates the code increase threshold value, the code decrease threshold value 1, the code decrease threshold value 2, the code increase reference value, and the code decrease reference value. An update algorithm therefor is the same as that in the first embodiment of the present invention.

For example, the update algorithm is as described below.
Code increase threshold value=Max (number of allocated codes−2, 5)
Code decrease threshold value 1=Max (number of allocated codes−2, 3)
Code decrease threshold value 2=Max (number of allocated codes−4, 2)
Code increase reference value=85% (meaning that the "threshold value code use rate" is 85%)
Code decrease reference value=40% (meaning that the "threshold value code use rate" is 40%)

In this case, the allocated power is set in the same manner as the allocated codes.

Figure 27:
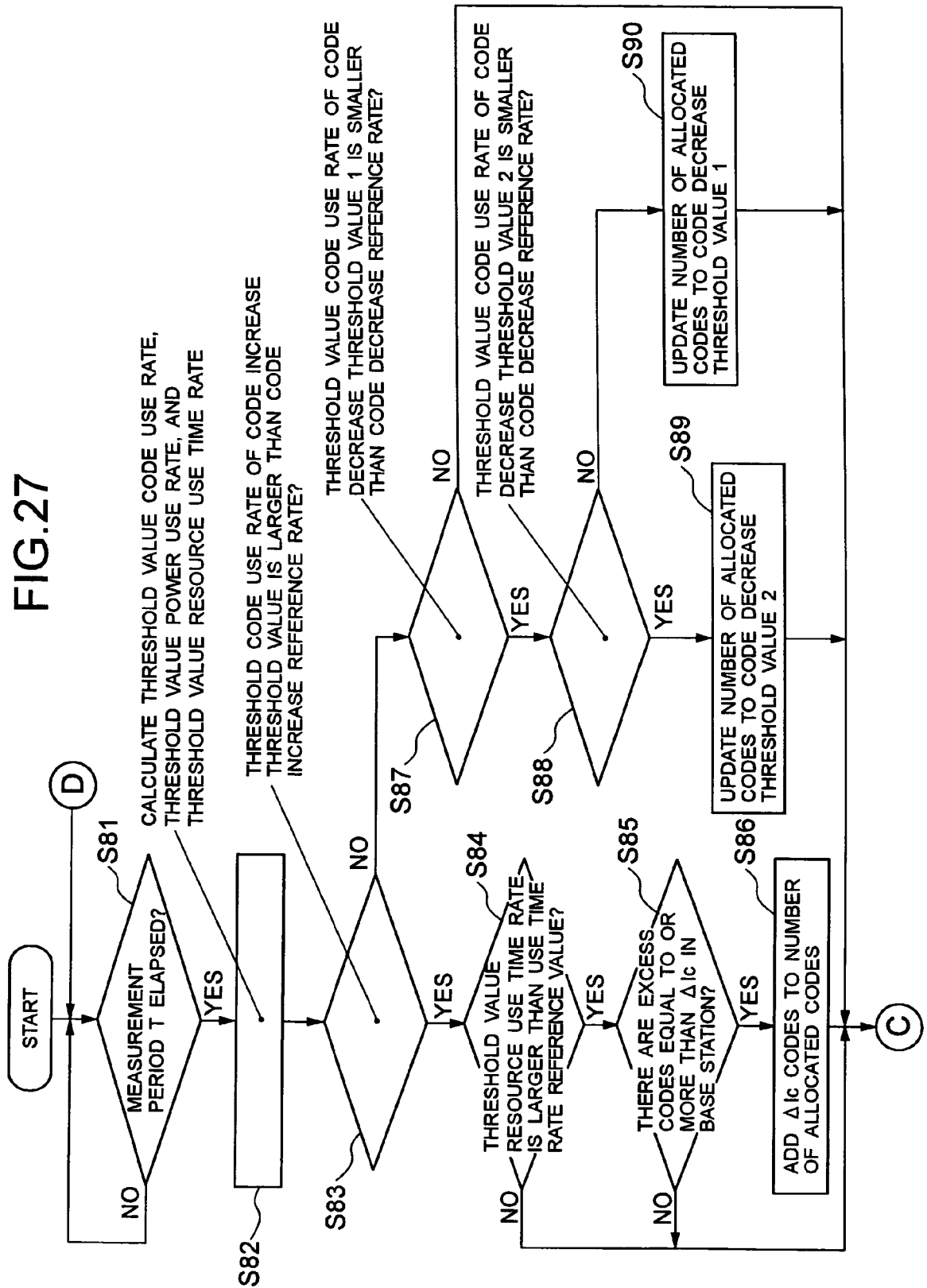
FIG. 27 is a flowchart showing an operation of the base station according to the third embodiment of the present invention.
Figure 28:
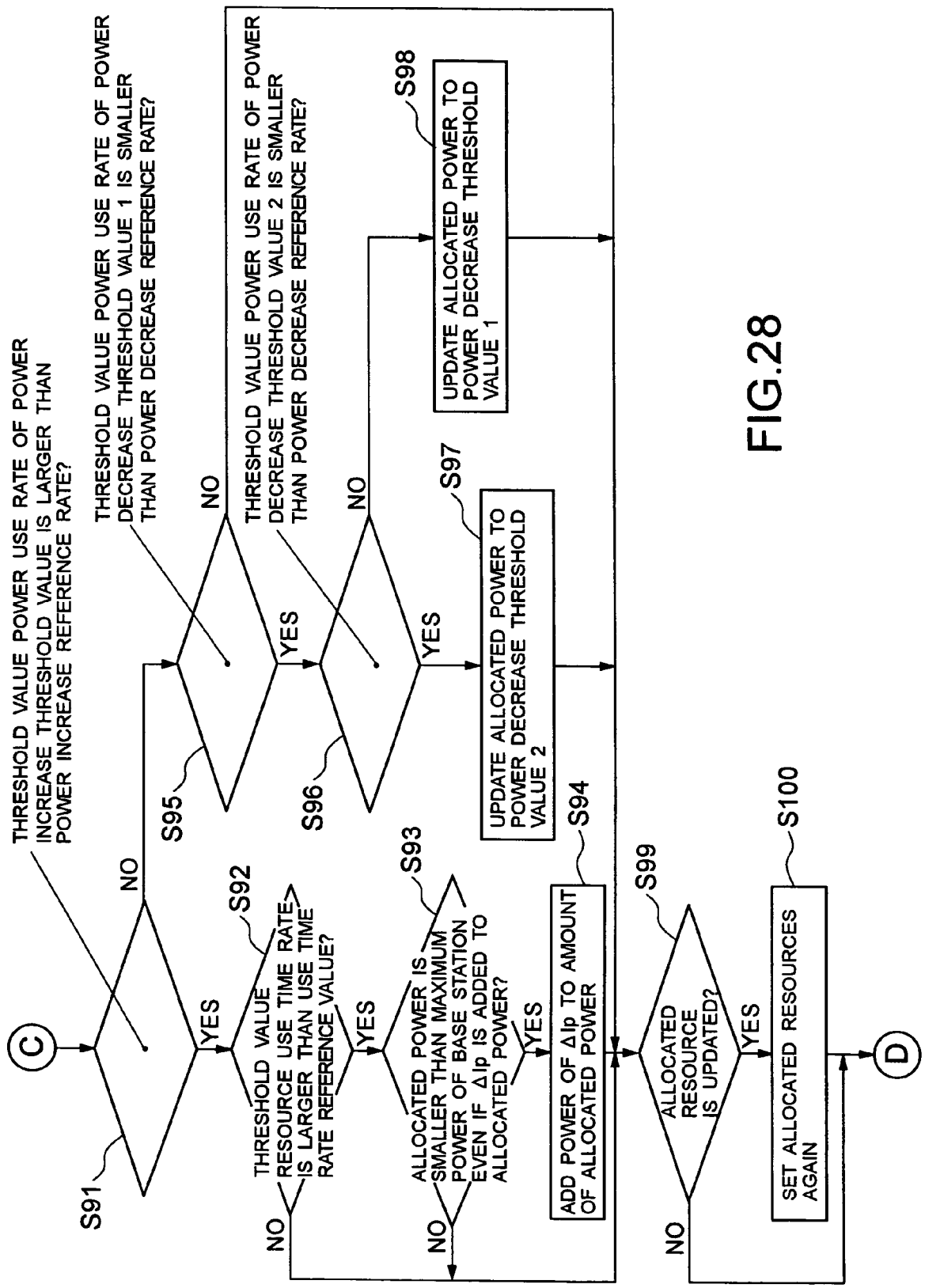
FIG. 28 is a flowchart showing an operation of the base station according to the third embodiment of the present invention.

FIGS. 27 and 28 are flowcharts showing an operation of the base station 7 according to the third embodiment of the present invention. The operation of the base station 7 according to the third embodiment of the present invention will be described with reference to FIGS. 25 to 28. Note that it is assumed that, in the base station 7 according to the third embodiment of the present invention, allocation control of resources is performed so as to be completed in the base station using the second code measurement method, the second power measurement method, and the second transmission time measurement method. In addition, it is assumed that a use rate to be measured by the second power measurement method and a time rate to be measured by the second transmission time measurement method are defined as a "threshold value power use rate" and a "threshold value resource use time rate", respectively.

When elapse of the measurement period T is detected according to timing information from the timer (step S81 in FIG. 27), the base station 7 calculates the threshold value code use rate, the threshold value power use rate, and the threshold value resource use time rate (step S82 in FIG. 27) and judges whether or not the threshold value code use rate of the code increase threshold value is larger than the code increase reference rate (step S83 in FIG. 27).

When it is judged that the threshold value code use rate of the code increase threshold value is larger than the code increase reference rate, if the threshold value resource use time rate is larger than the use time rate reference value (step S84 in FIG. 27) and if there are excess codes equal to or more than ΔIc codes in the base station (step S85 in FIG. 27), the base station 7 adds the ΔIc codes to the number of allocated codes (step S86 in FIG. 27).

When it is judged that the threshold value code use rate of the code increase threshold value is not larger than the code increase reference rate, if the threshold value code use rate of the code decrease threshold value 1 is smaller than the code decrease reference rate (step S87 in FIG. 27) and if the threshold value code use rate of the code decrease threshold value 2 is smaller than the code decrease reference rate (step S88 in FIG. 27), the base station 7 updates the number of allocated codes to the code decrease threshold value 2 (step S89 in FIG. 27).

In addition, if the threshold value code use rate of the code decrease threshold value 2 is not smaller than the code decrease reference rate (step S88 in FIG. 27), the base station 7 updates the number of allocated codes to the code decrease threshold value 1 (step S90 in FIG. 27).

Next, the base station 7 judges whether or not the threshold power use rate of the power increase threshold value is larger than the power increase reference rate (step S91 in FIG. 28). When it is judged that the threshold value power use rate of the power increase threshold value is larger than the power increase reference rate, if the threshold value resource use time rate is larger than the use time rate reference value (step S92 in FIG. 28) and if the allocated power is smaller than the maximum power of the base station 7 even if ΔIp is added to the allocated power (step S93 in FIG. 28), the base station 7 adds power of ΔIp to the amount of allocated power (step S94 in FIG. 28).

When it is judged that the threshold value power use rate of the power increase threshold value is not larger than the power increase reference rate, if the threshold power use rate of the power decrease threshold 1 is smaller than the power decrease reference rate (step S95 in FIG. 28) and if the threshold power use rate of the power decrease threshold value 2 is smaller than the power decrease reference rate (step S96 in FIG. 28), the base station 7 updates the allocated power to the power decrease threshold value 2 (step S97 in FIG. 28).

In addition, if the threshold value power use rate of the power decrease threshold value 2 is smaller than the power decrease reference rate (step S96 in FIG. 28), the base station 7 updates the allocated power to the power decrease threshold value 1 (step S98 in FIG. 28). Thereafter, if update of the allocated resources is performed in the above-described processing (step S99 in FIG. 28), the base station 7 sets the allocated resources again (step S100 in FIG. 28).

Consequently, in this embodiment, the same effect as the first embodiment of the present invention can be obtained.

Fourth Embodiment

Figure 29:
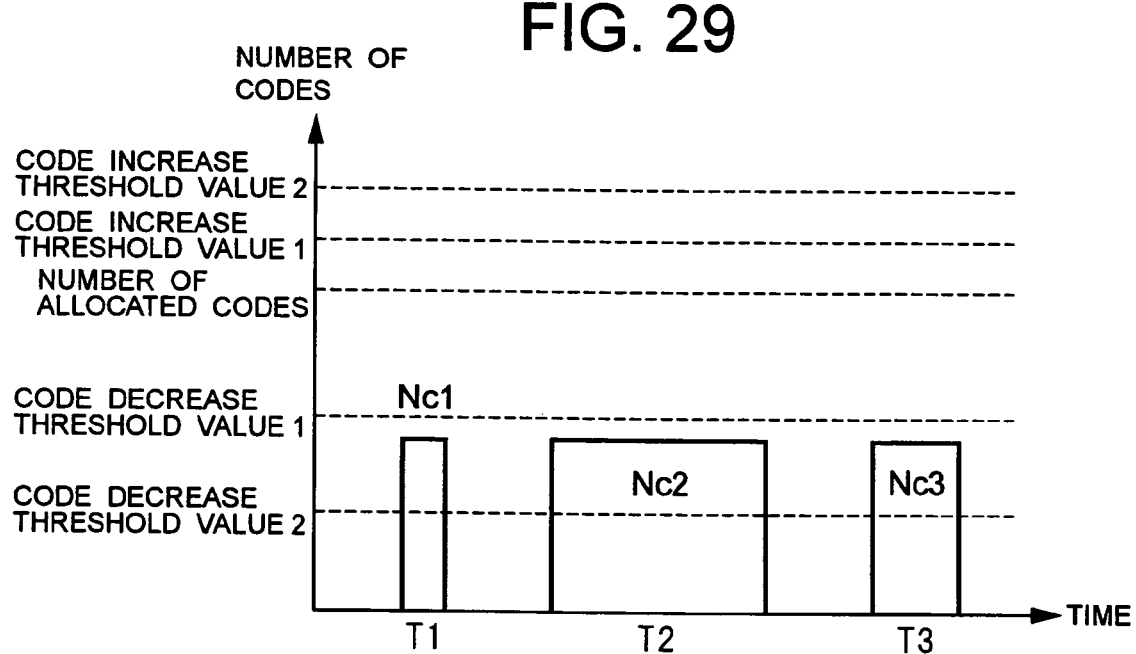
FIG. 29 is a diagram for explaining resource allocation control according to a fourth embodiment of the present invention.

FIG. 29 is a diagram for explaining resource allocation control according to a fourth embodiment of the present invention. FIG. 29 shows images of a code increase threshold value 1, a code increase threshold value 2, a code decrease threshold value 1, and a code decrease threshold value 2 which are set in advance such that an RNC according to the fourth embodiment of the present invention performs the resource allocation control. In this case, a threshold value of power for the RNC according to the fourth embodiment of the present invention performing the resource allocation control is also the same as that in the above-described case of codes.

FIGS. 30 to 33 are flowcharts showing an operation of a base station according to the fourth embodiment of the present invention. FIGS. 34 to 37 are flowcharts showing an operation of the RNC according to the fourth embodiment of the present invention. An operation of a mobile communication system according to the fourth embodiment of the present invention will be described with reference to FIGS. 30 to 37. Note that it is assumed that, in the mobile communication system according to the fourth embodiment of the present invention, allocation control of resources is performed under the control of the RNC using the second code measurement method and the third code measurement method, the second power measurement method and the third power measurement method, and the third transmission time measurement method.

Here, it is assumed that a ratio to be measured by the third code measurement method, a ratio to be measured by the third power measurement method, and a ratio to be measured by the third transmission time measurement method are defined as a "threshold value code request rate", a "threshold value power request rate", and a "resource use time rate", respectively.

Figure 30:
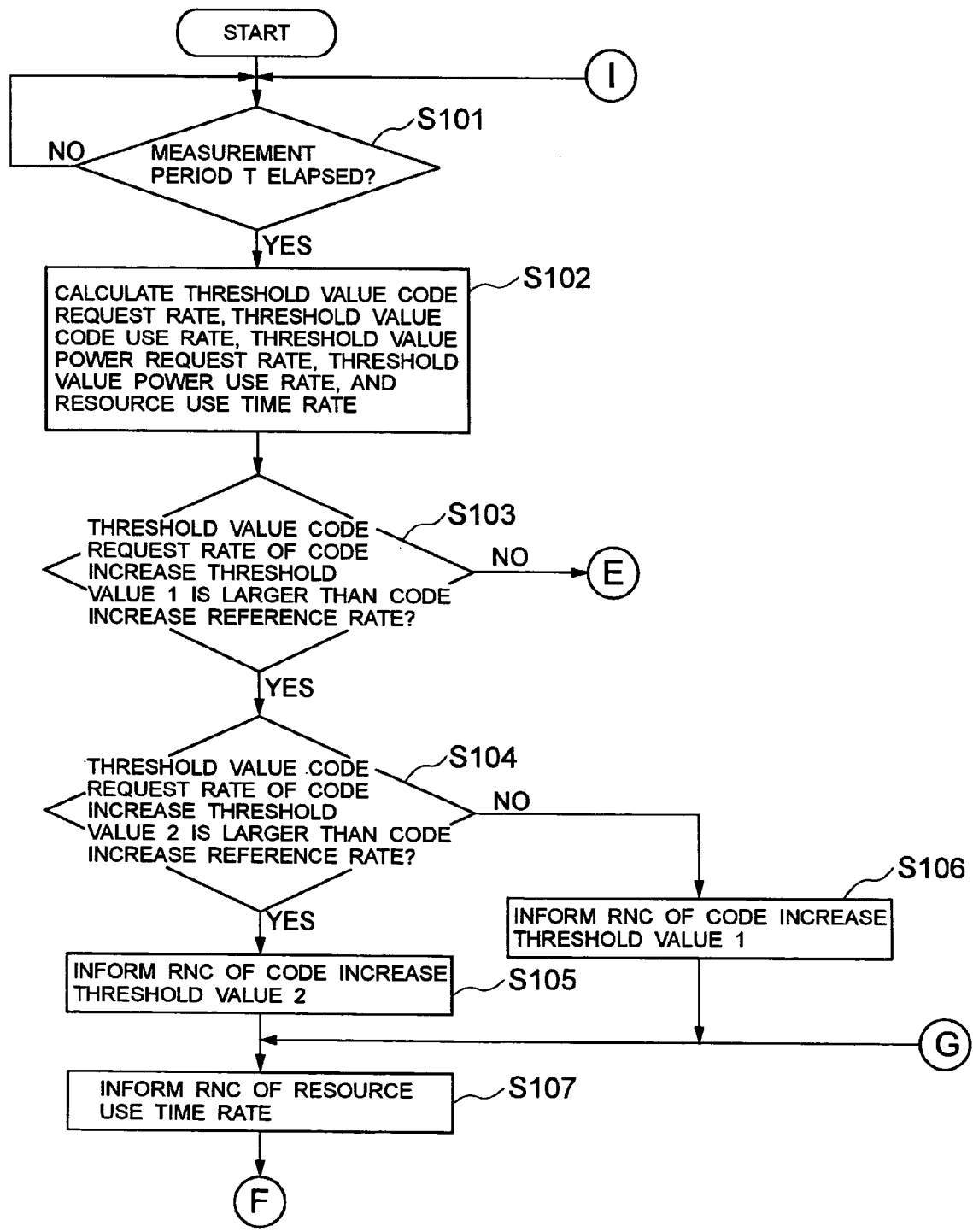
FIG. 30 is a flowchart showing an operation of a base station according to the fourth embodiment of the present invention.

When elapse of the measurement period T is detected according to timing information from the timer (step S101 in FIG. 30), the base station calculates the threshold value code request rate, the threshold value code use rate, the threshold power request rate, the threshold value power use rate, and the resource use time rate (step S102 in FIG. 30) and judges whether or not the threshold value code request rate of the code increase threshold value 1 is larger than the code increase reference rate (step S103 in FIG. 30).

When it is judged that the threshold value code request rate of the code increase threshold value 1 is larger than the code increase reference rate, if the threshold value code request rate of the code increase threshold value 2 is larger than the code increase reference rate (step S104 in FIG. 30), the base station informs the RNC of the code increase threshold value 2 (step S105 in FIG. 30).

In addition, if the threshold value code request rate of the code increase threshold value 2 is not larger than the code increase reference rate (step S104 in FIG. 30), the base station informs the RNC of the code increase threshold value 1 (step S106 in FIG. 30).

Figure 31:
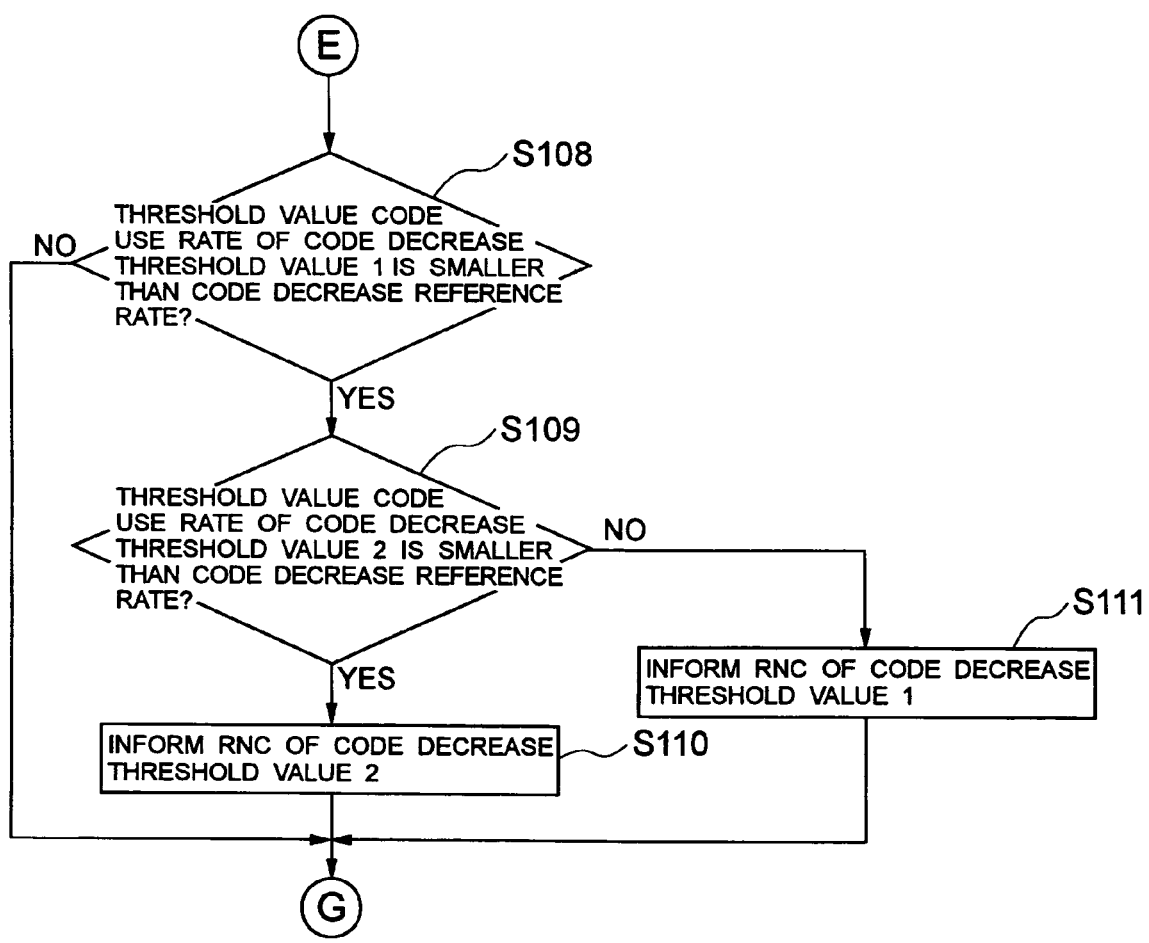
FIG. 31 is a flowchart showing an operation of the base station according to the fourth embodiment of the present invention.

On the other hand, when it is judged that the threshold value code request rate of the code increase threshold value 1 is not larger than the code increase reference rate, if the threshold value code use rate of the code decrease threshold value 1 is smaller than the code decrease reference rate (step S108 in FIG. 31) and if the threshold value code use rate of the code decrease threshold value 2 is smaller than the code decrease reference rate (step S109 in FIG. 31), the base station informs the RNC of the code decrease threshold value 2 (step S110 in FIG. 31).

In addition, if the threshold value code use rate of the code decrease threshold value 2 is smaller than the code decrease reference rate (step S109 in FIG. 31), the base station informs the RNC of the code decrease threshold value 1 (step S111 in FIG. 31). Thereafter, the base station informs the RNC of the resource use time rate (step S107 in FIG. 30).

Figure 32:
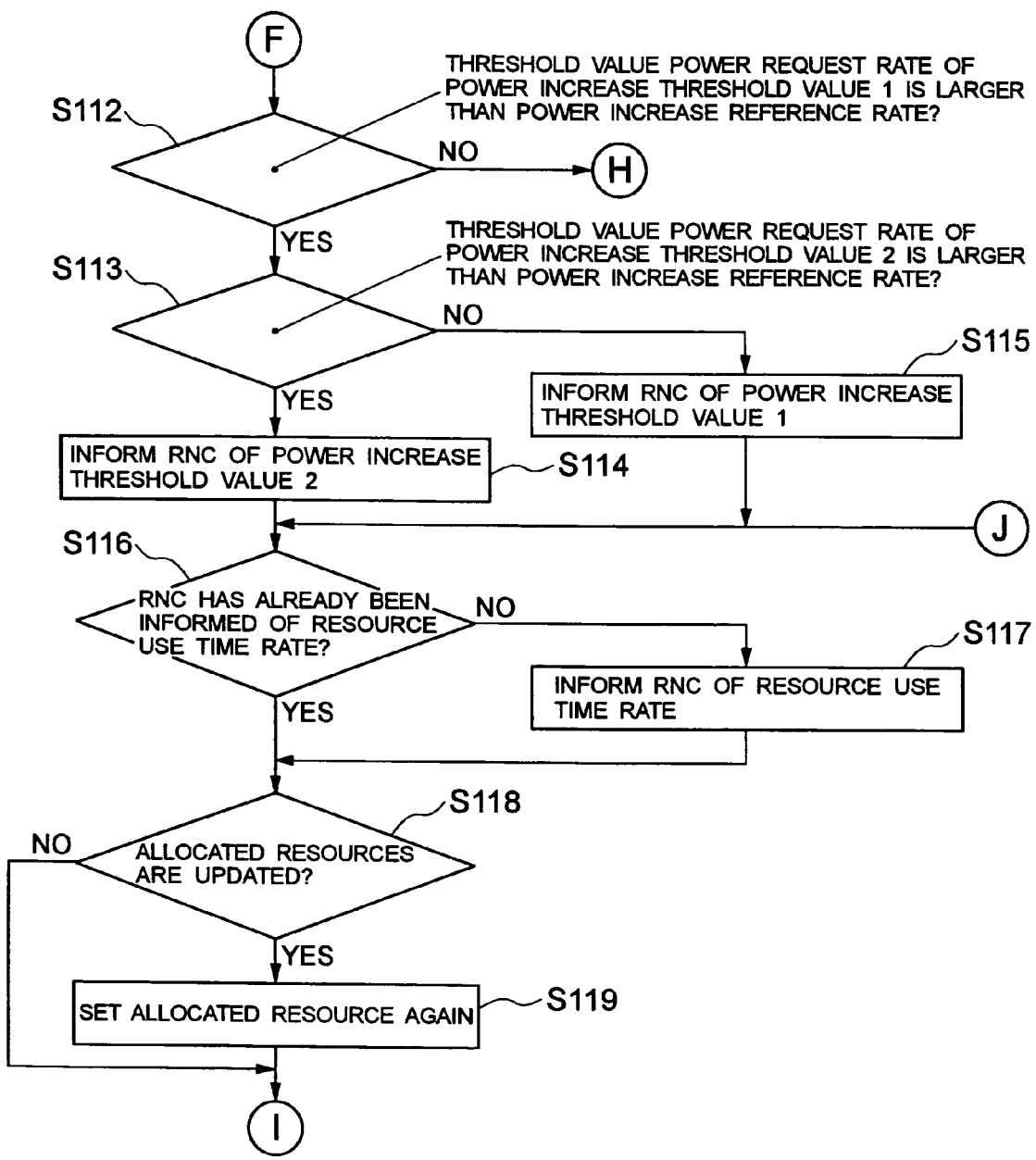
FIG. 32 is a flowchart showing an operation of the base station according to the fourth embodiment of the present invention.

On the other hand, if the threshold value power request rate of the power increase threshold value 1 is larger than the power increase reference rate (step S112 in FIG. 32) and if the threshold value power request rate of the power increase threshold value 2 is larger than the power increase reference rate (step S113 in FIG. 32), the base station informs the RNC of the power increase threshold value 2 (step S114 in FIG. 32).

In addition, if the threshold value power request rate of the power increase threshold value 2 is not larger than the power increase reference rate (step S113 in FIG. 32), the base station informs the RNC of the power increase threshold value 1 (step S115 in FIG. 32).

Figure 33:
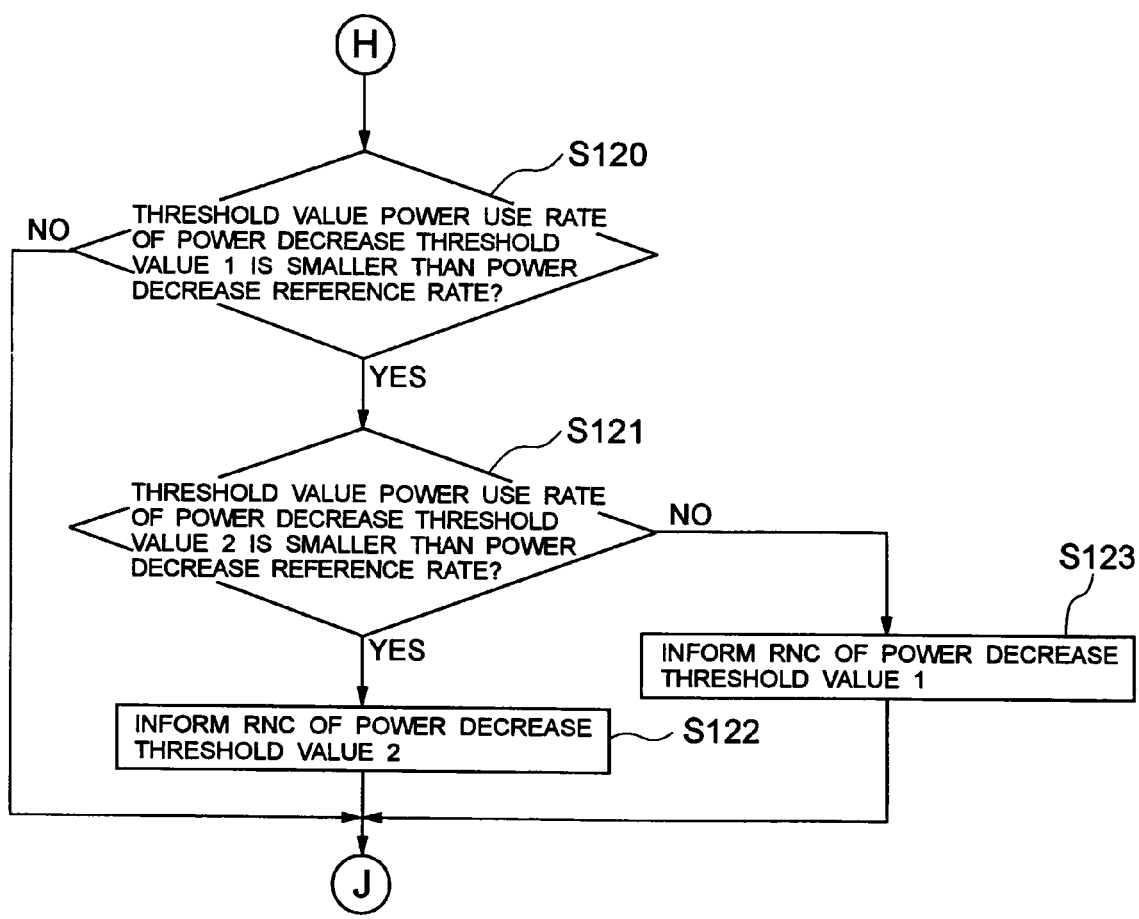
FIG. 33 is a flowchart showing an operation of the base station according to the fourth embodiment of the present invention.

On the other hand, in the case in which the threshold value power request rate of the power increase threshold value 1 is not larger than the power increase reference rate (step S112 in FIG. 32), if the threshold value power use rate of the power decrease threshold value 1 is smaller than the power decrease reference rate (step S120 in FIG. 33) and if the threshold value power use rate of the power decrease threshold value 2 is smaller than the power decrease reference rate (step S121 in FIG. 33), the base station informs the RNC of the power decrease threshold value 2 (step S122 in FIG. 33).

In addition, if the threshold value power use rate of the power decrease threshold value 2 is not smaller than the power decrease reference rate (step S121 in FIG. 33), the base station informs the RNC of the power decrease threshold value 1 (step S123 in FIG. 33).

Thereafter, if the RNC has not been informed of the resource use time rate yet (step S116 in FIG. 32), the base station informs the RNC of the resource use time rate (step S117 in FIG. 32). When the RNC instructs update of the allocated resources (step S118 in FIG. 32), the base station sets the allocated resources again (step S119 in FIG. 32).

Figure 34:
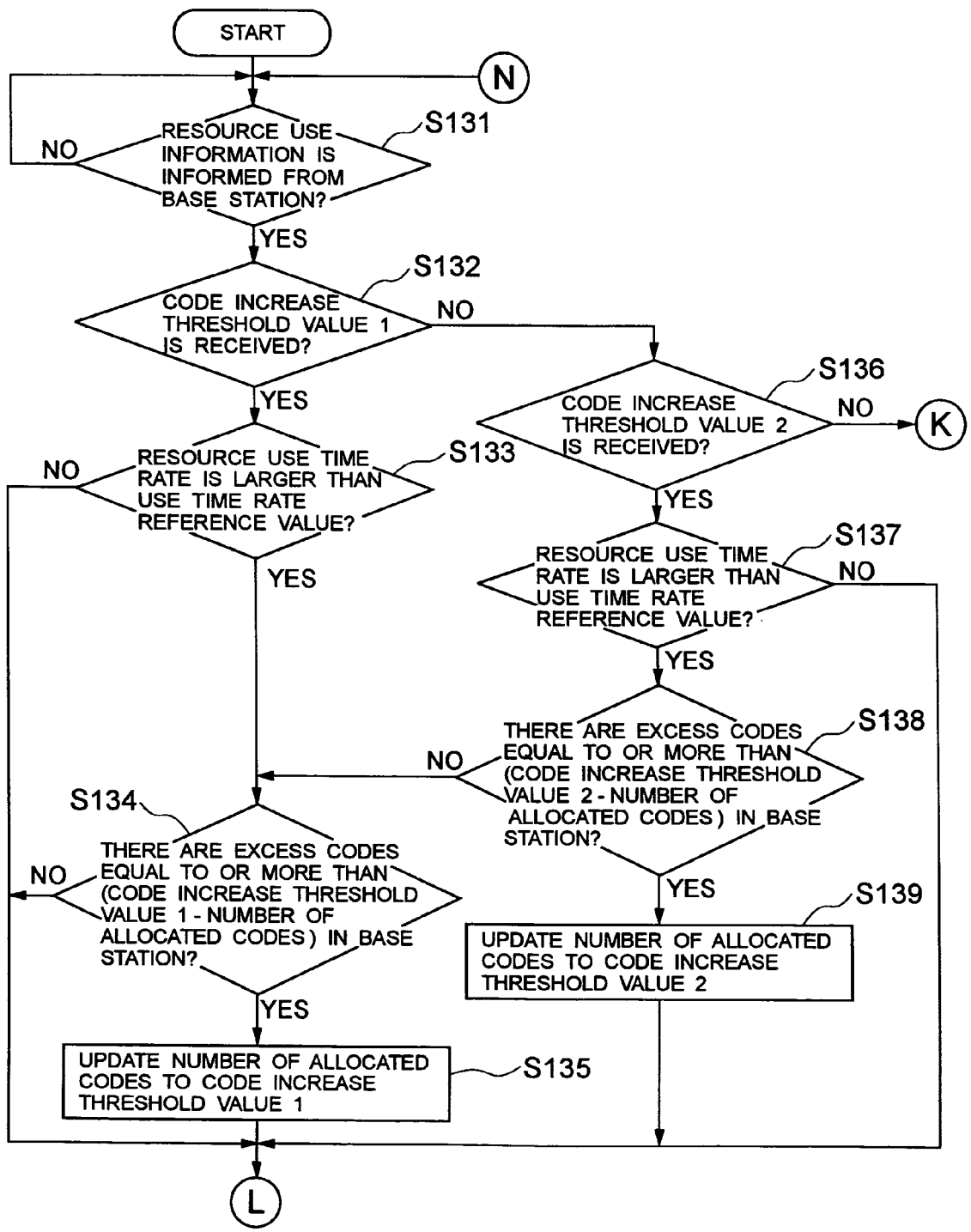
FIG. 34 is a flowchart showing an operation of an RNC according to the fourth embodiment of the present invention.

When the resource use information is informed by the base station (step S131 in FIG. 34), the RNC judges whether or not the code increase threshold value 1 has been received (step S132 in FIG. 34). In the case in which the code increase threshold value 1 has been received, if the resource use time rate is larger than the use time rate reference value (step S133 in FIG. 34) and if there are excess codes equal to or more than (the code increase threshold value 1—the number of allocated codes) in the base station (step S134 in FIG. 34), the RNC updates the number of allocated codes to the code increase threshold value 1 (step S135 in FIG. 34).

On the other hand, if the code increase threshold value 1 has not been received, the RNC judges whether or not the code increase threshold value 2 has been received (step S136 in FIG. 34). In the case in which the code increase threshold value 2 has been received, if the resource use time rate is larger than the use time rate reference value (step S137 in FIG. 34) and if there are excess codes equal to or more than (the code increase threshold value 2–the number of allocated codes) in the base station (step S138 in FIG. 34), the RNC updates the number of allocated codes to the code increase threshold value 2 (step S139 in FIG. 34).

Figure 35:
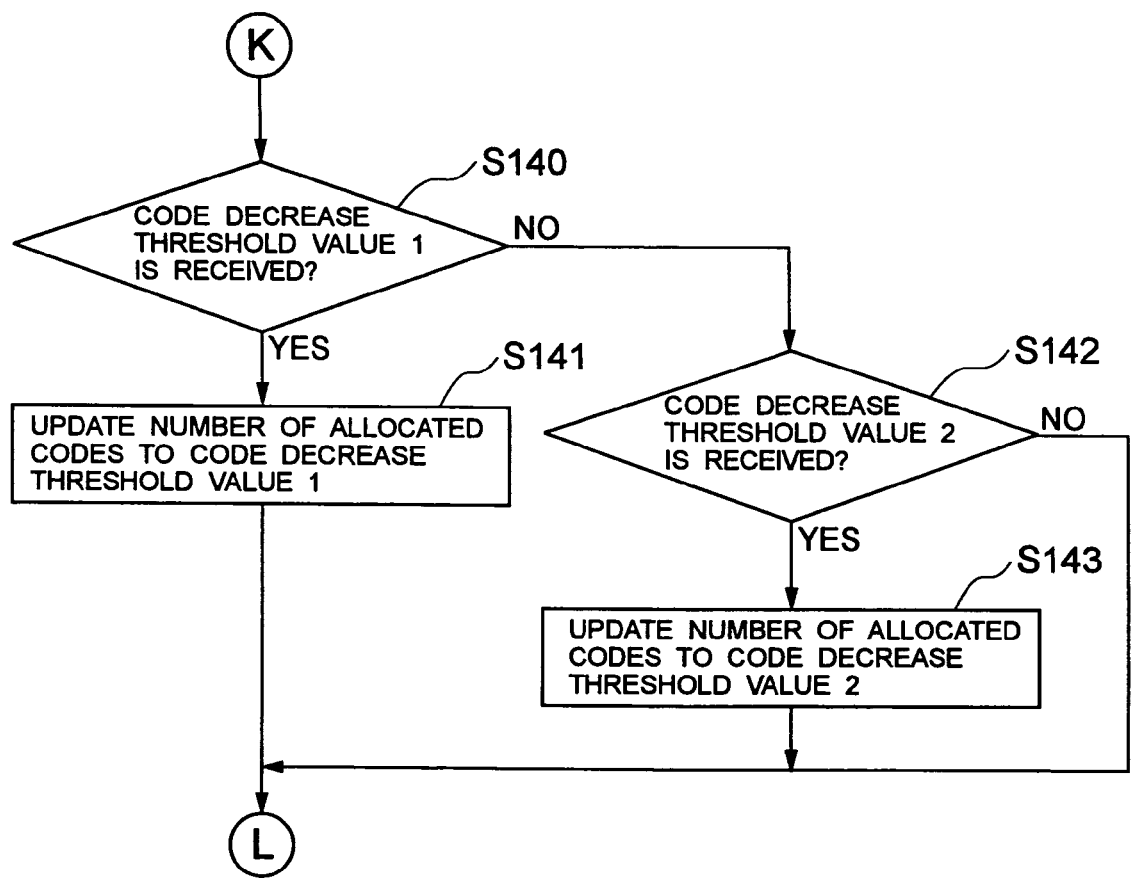
FIG. 35 is a flowchart showing an operation of the RNC according to the fourth embodiment of the present invention.

If the code increase threshold value 2 has not been received but the code decrease threshold value 1 has been received (step S140 in FIG. 35), the RNC updates the number of allocated codes to the code decrease threshold value 1 (step S141 in FIG. 35). In addition, if the code decrease threshold value 1 has not been received but the code decrease threshold value 2 has been received (step S142 in FIG. 35), the RNC updates the number of allocated codes to the code decrease threshold value 2 (step S143 in FIG. 35).

Figure 36:
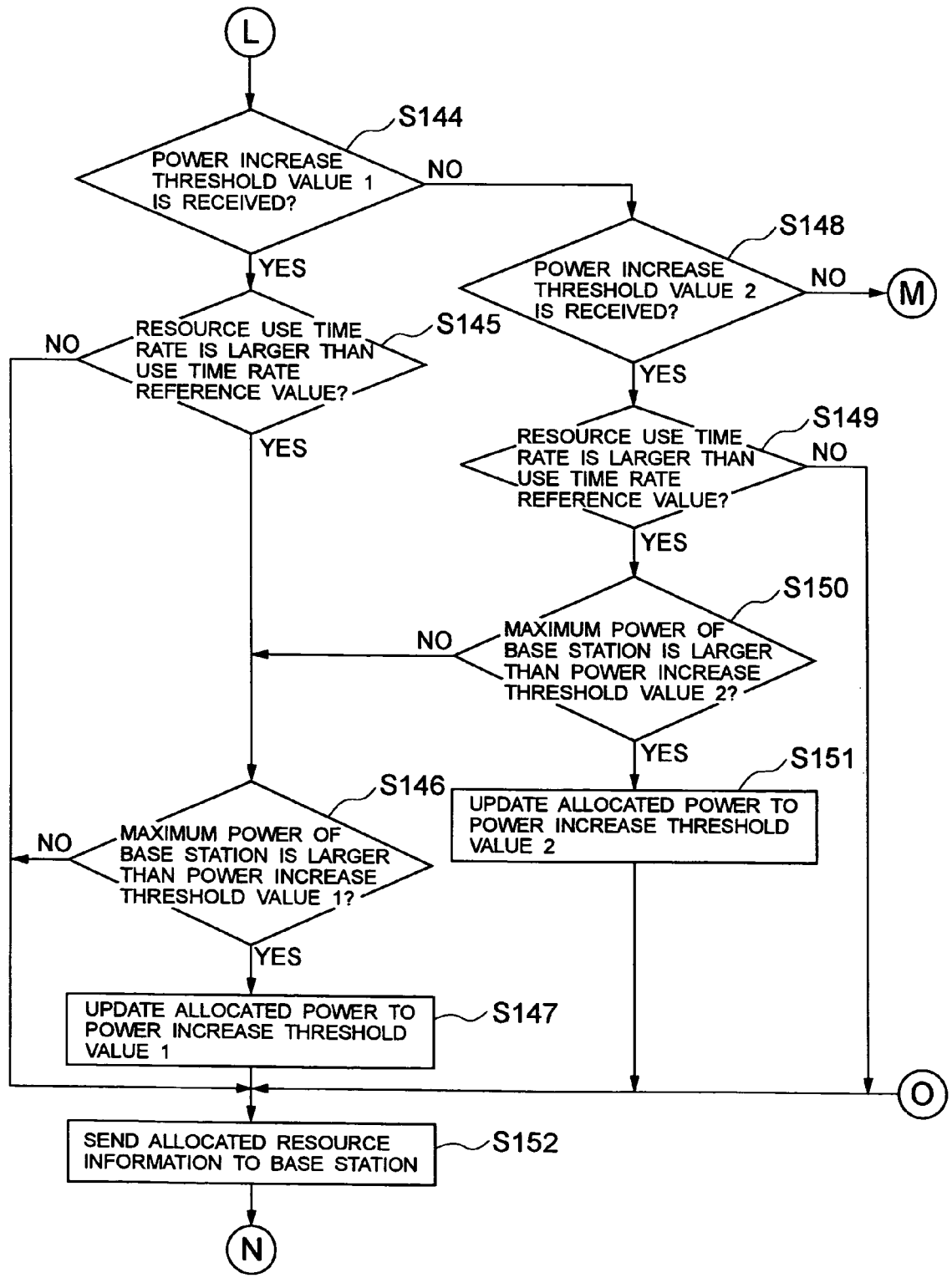
FIG. 36 is a flowchart showing an operation of the RNC according to the fourth embodiment of the present invention.

On the other hand, if the power increase threshold value 1 is received (step S144 in FIG. 36), if the resource use time rate is larger than the use time rate reference value (step S145 in FIG. 36) and if a maximum power of the base station is larger than the power increase threshold value 1 (step S146 in FIG. 36), the RNC updates the allocated power to the power increase threshold value 1 (step S147 in FIG. 36).

When the power increase threshold value 1 is not received (step S144 in FIG. 36) and when the power increase threshold value 2 is received (step S148 in FIG. 36), if the resource use time rate is larger than the use time rate reference value (step S149 in FIG. 36) and if the maximum power of the base station is larger than the power increase threshold value 2 (step S150 in FIG. 36), the RNC updates the allocated power to the power increase threshold value 2 (step S151 in FIG. 36).

Figure 37:
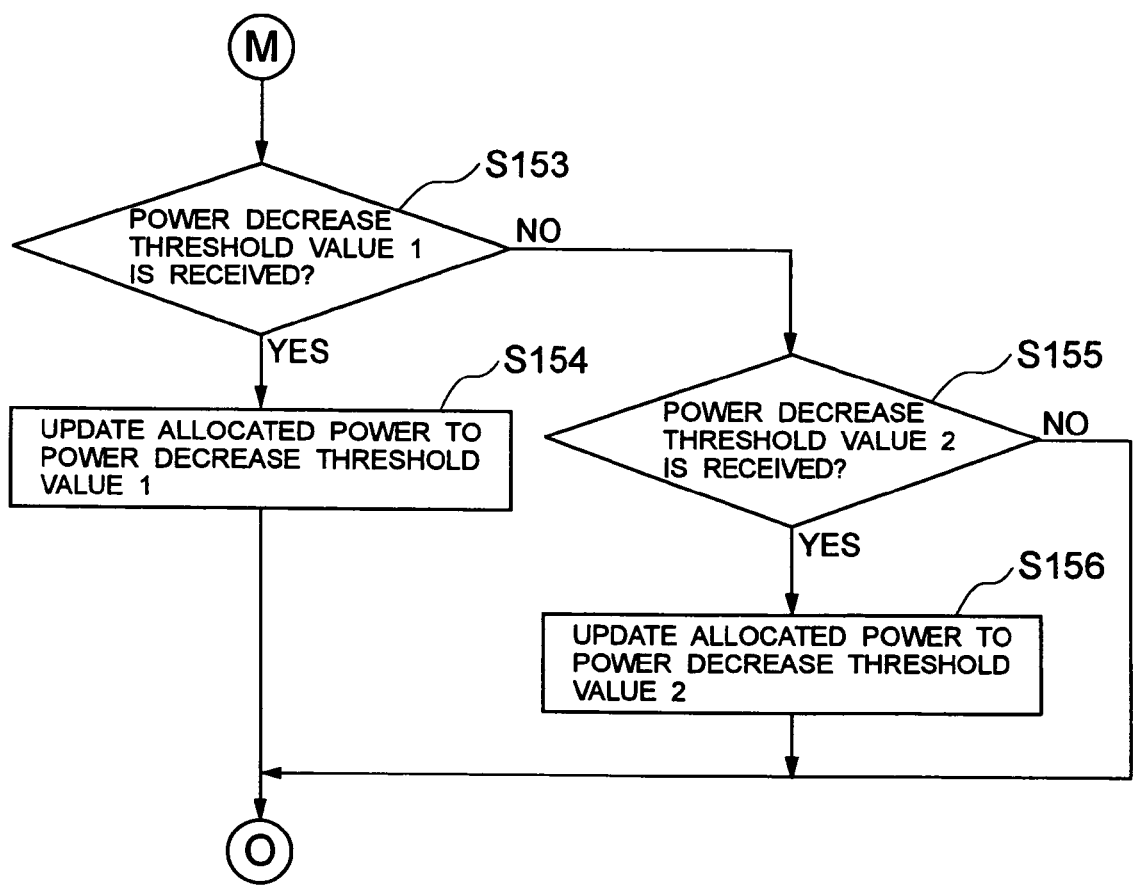
FIG. 37 is a flowchart showing an operation of the RNC according to the fourth embodiment of the present invention.

On the other hand, in the case in which the power increase threshold value 2 is not received (step S148 in FIG. 36), when the power decrease threshold value 1 is received (step S153 in FIG. 37), the RNC updates the allocated power to the power decrease threshold value 1 (step S154 in FIG. 37). In addition, when the power decrease threshold value 1 is not received (step S153 in FIG. 37) and when the power decrease threshold value 2 is received (step S155 in FIG. 37), the RNC updates the allocated power to the power decrease threshold value 2 (step S156 in FIG. 37). Thereafter, the RNC sends allocated resource information, which has been updated in the above-described processing, to the base station (step S152 in FIG. 36).

Consequently, in this embodiment, the same effect as the first embodiment of the present invention can be obtained. Note that, in the present invention, the combinations of the code measurement method, the power measurement method, and the transmission time measurement method or the arrangement positions of the resource allocation control unit, the resource use information calculation unit, and the resource use information detection unit are described in the respective embodiments. However, the present invention is also applicable to combinations or arrangement positions other than the above and is not limited to these.

As described above, in the present invention, a state of use of codes is confirmed to increase allocated codes appropriately, whereby an average TBS of a transmission packet can be increased without deteriorating efficiency of use of the allocated codes. Thus, throughput of the HS-PDSCH can be improved.

In addition, in the present invention, a state of use of codes is confirmed to decrease allocated codes appropriately, whereby efficiency of use with respect to the allocated codes can be improved without deteriorating throughput of the base station.

Further, in the present invention, since the number of codes, which can be allocated to channels other than the HS-PDSCH, increases, user of the Associated DPCH can be increased, and throughput of the HS-PDSCH can be improved. At the same time, since codes can be allocated to channels other than the Associated DPCH, throughput of the entire base station can be improved.

On the other hand, in the present invention, a state of use of power is confirmed to increase allocated power appropriately, whereby an average TBS of a transmission packet can be increased without deteriorating efficiency of use of the allocated power. Thus, throughput of the HS-PDSCH can be improved.

In addition, in the present invention, a state of use of power is confirmed to decrease allocated power appropriately, whereby efficiency of use with respect to the allocated power can be improved without deteriorating throughput of the base station.

Further, in the present invention, since power, which can be allocated to channels other than the HS-PDSCH, increases, users of the Associated DPCH can be increased, and throughput of the HS-PDSCH can be improved. At the same time, since power can be allocated to channels other than the Associated DPCH, throughput of the entire base station can be improved.

In the present invention, a state of congestion of the system is measured and, in the case in which a system capacity is limited due to codes or power, allocated codes or allocated power is increased on the basis of a result of measurement concerning a state of use of codes and power, whereby occurrence of convergence can be prevented.

What is claimed is:

1. A mobile communication system for performing resource management including allocation of codes and transmission power control to form a high speed data transfer path for a mobile station, the mobile communication system comprising:
    calculation means which calculates average values with respect to the number of use of the codes and an amount of use of the transmission power on the basis of a data transfer time to the data transfer path, the number of use of codes being measured during the data transfer time; and
    control means which performs the resource management on the basis of the average values,
    wherein said calculation means calculates whether a ratio of used codes becomes equal to or higher than a threshold value set in advance or calculates a time at which the number of used codes become equal to or higher than the threshold value.

2. The mobile communication system according to claim 1, wherein the data transfer time is a transmission time at the time when a data transfer amount, which is sent when an available transfer data amount to be found from the number of allocation of codes, the transmission power, and channel quality information, becomes substantially the maximum, becomes substantially the same as the available transfer data amount.

3. The mobile communication system according to claim 1, wherein the data transfer time is a transmission time at the time when the transmission power is in the vicinity of transmission power amount which is set for the data transfer path in advance.

4. The mobile communication system according to claim 1, wherein said calculation means calculates the data transfer time or a ratio thereof in a measurement period set in advance.

5. A mobile communication system for performing resource management including allocation of codes and transmission power control to form a high speed data transfer path for a mobile station, the mobile communication system comprising:
    calculation means which calculates average values with respect to the number of use of the codes and an amount of use of the transmission power on the basis of a data transfer time to the data transfer path, the number of use of codes being measured during the data transfer time; and
    control means which performs the resource management on the basis of the average values,
    wherein said calculation means calculates a data transfer time in which the number of codes or the transmission power becomes equal to or higher than a threshold value set in advance in a measurement period set in advance.

6. A mobile communication system for performing resource management including allocation of codes and transmission power control to form a high speed data transfer path for a mobile station, the mobile communication system comprising:
    calculation means which calculates average values with respect to the number of use of the codes and an amount of use of the transmission power on the basis of a data transfer time to the data transfer path, the number of use of codes being measured during the data transfer time; and
    control means which performs the resource management on the basis of the average values,
    wherein said calculation means integrates use rates of the codes and the transmission power in a measurement period set in advance to calculate a use time rate of resources.

7. The mobile communication system according to claim 6, wherein said calculation means calculates a ratio of the number of codes at the time when whole allocated transmission power is used becoming equal to or higher than a threshold value set in advance or a time in which the number of codes becomes equal to or higher than the threshold value.

8. The mobile communication system according to claim 6, wherein said calculation means calculates a ratio of the transmission power becoming equal to or higher than a threshold value set in advance or a time in which the transmission power becomes equal to or higher than the threshold value.

9. The mobile communication system according to claim 6, wherein said calculation means calculates a ratio of transmission power amount at the time when all allocated codes are used becoming equal to or higher than a threshold value set in advance or a time in which the transmission power amount becomes equal to or higher than the threshold value.

10. A resource allocation control method for a mobile communication system which performs resource management including allocation of codes and transmission power control to form a high speed data transfer path for a mobile station, the resource allocation control method comprising, on a management side performing the resource management:
    processing for calculating average values with respect to the number of use of the codes and an amount of use of the transmission power on the basis of a data transfer time to the data transfer path, the number of use of the codes being measured during the data transfer time; and
    processing for performing the resource management on the basis of the average values,
    wherein said processing for calculating average values calculates whether a ratio of used codes becomes equal to or higher than a threshold value set in advance or calculates a time at which the number of used codes become equal to or higher than the threshold value.

11. The resource allocation control method according to claim 10,
    wherein the data transfer time is a transmission time at the time when a data transfer amount, which is sent when an available transfer data amount to be found from the number of allocation of codes, the transmission power, and channel quality information, becomes substantially the maximum, becomes substantially the same as the available transfer data amount.

12. The resource allocation control method according to claim 10,
    wherein the data transfer time is a transmission time at the time when the transmission power is in the vicinity of transmission power amount which is set for the data transfer path in advance.

13. The resource allocation control method according to claim 10,
    wherein said processing for calculating average values calculates a ratio of the number of codes at the time when whole allocated transmission power is used becoming equal to or higher than a threshold value set in advance or a time in which the number of codes becomes equal to or higher than the threshold value.

14. The resource allocation control method according to claim 10,
    wherein said processing for calculating average values calculates a ratio of transmission power amount at the time when all allocated codes are used becoming equal to or higher than a threshold value set in advance or a time in which the transmission power amount becomes equal to or higher than the threshold value.

15. The resource allocation control method according to claim 10,
    wherein said processing for calculating average values calculates the data transfer time or a ratio thereof in a measurement period set in advance.

16. A resource allocation control method for a mobile communication system which performs resource management including allocation of codes and transmission power control to form a high speed data transfer path for a mobile station, the resource allocation control method comprising, on a management side performing the resource management:
    processing for calculating average values with respect to the number of use of the codes and an amount of use of the transmission power on the basis of a data transfer time to the data transfer path, the number of use of the codes being measured during the data transfer time; and
    processing for performing the resource management on the basis of the average values,
    wherein said processing for calculating average values calculates a data transfer time in which the number of used codes or the transmission power becomes equal to or higher than a threshold value set in advance in a measurement period set in advance.

17. A resource allocation control method for a mobile communication system which performs resource management including allocation of codes and transmission power control to form a high speed data transfer path for a mobile station, the resource allocation control method comprising, on a management side performing the resource management:
    processing for calculating average values with respect to the number of use of the codes and an amount of use of the transmission power on the basis of a data transfer time to the data transfer path, the number of use of the codes being measured during the data transfer time; and
    processing for performing the resource management on the basis of the average values,
    wherein said processing for calculating average values integrates use rates of the codes and the transmission power in a measurement period set in advance to calculate a use time rate of resources.

* * * * *